United States Patent [19]

Yamada

[11] Patent Number: 5,608,541
[45] Date of Patent: Mar. 4, 1997

[54] IMAGE PROCESSING METHOD AND APPARATUS WHICH OUTPUTS DIAGONAL IMAGES

[75] Inventor: Masanori Yamada, Kawasaki, Japan

[73] Assignee: Canon Kabushiki Kaisha, Tokyo, Japan

[21] Appl. No.: 384,216

[22] Filed: Feb. 6, 1995

Related U.S. Application Data

[63] Continuation of Ser. No. 45,361, Apr. 13, 1993, abandoned.

[30] Foreign Application Priority Data

Apr. 14, 1992 [JP] Japan ................................. 4-094098

[51] Int. Cl.$^6$ ................................. H04N 1/40; H04N 1/343
[52] U.S. Cl. ........................ 358/448; 358/449; 358/450; 358/451; 358/453; 382/296; 382/298
[58] Field of Search .................................. 358/450, 451, 358/452, 453, 449, 444, 404, 448, 296; 382/296, 298, 297, 294; 395/137

[56] References Cited

U.S. PATENT DOCUMENTS

| | | | |
|---|---|---|---|
| 3,976,982 | 8/1976 | Eiselen | 382/297 |
| 4,618,991 | 10/1986 | Tabata et al. | 382/46 |
| 4,788,599 | 11/1988 | Sugishima | 358/296 |
| 4,947,269 | 8/1990 | Yamada | 358/451 |
| 4,975,977 | 12/1990 | Kurosu et al. | 382/296 |
| 5,050,225 | 9/1991 | Itoh | 382/296 |
| 5,153,737 | 10/1992 | Kobayashi | 358/450 |
| 5,204,916 | 4/1993 | Hamilton, Jr. et al. | 382/46 |
| 5,231,516 | 7/1993 | Kamon et al. | 358/444 |

OTHER PUBLICATIONS

Lotus (sideways) Dec. 1990 vol. 6 No. 12 p. 57(7).

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A technology for outputting an image, which has been subjected to a diagonal process, in such a manner that said image can be included within a recording paper sheet. Specifically, an inputted image of an original document is subjected to an enlargement (or a contraction) process and a diagonal process, followed by changing the read start address to be read from a shift memory in accordance with the size of the output recording paper sheet and that of a diagonal image to output a portion of the diagonal image, that protrudes the output recording paper sheet, into a marginal portion of the output recording paper sheet.

40 Claims, 61 Drawing Sheets

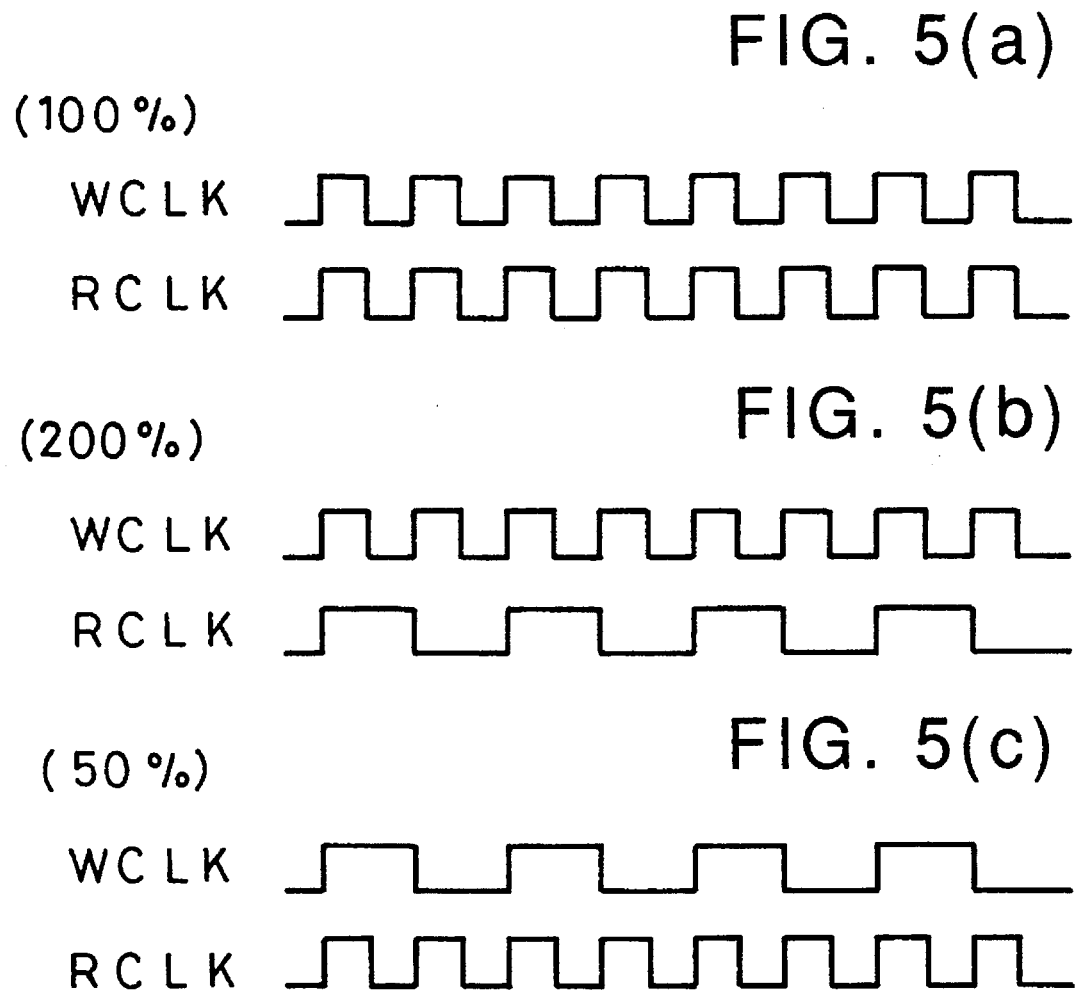

(ORIGINAL DOCUMENT A)

(COPY C)

FIG. 19(a)
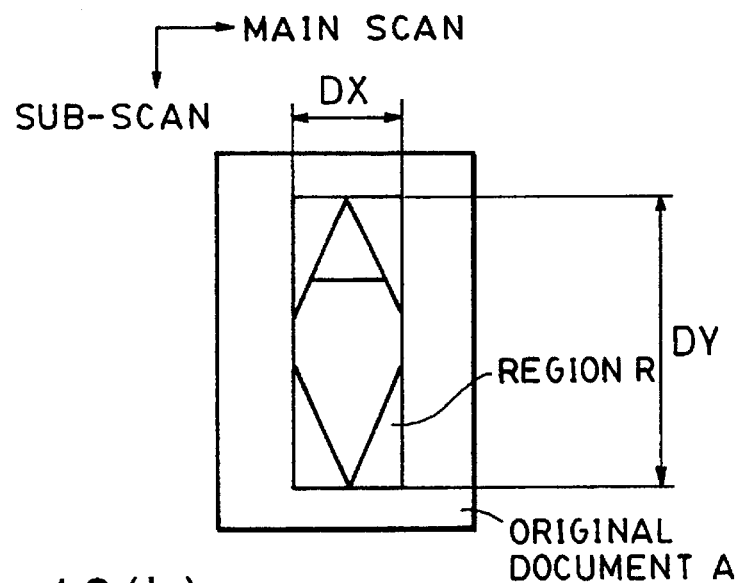
FIG. 19(b)
FIG. 19(c)
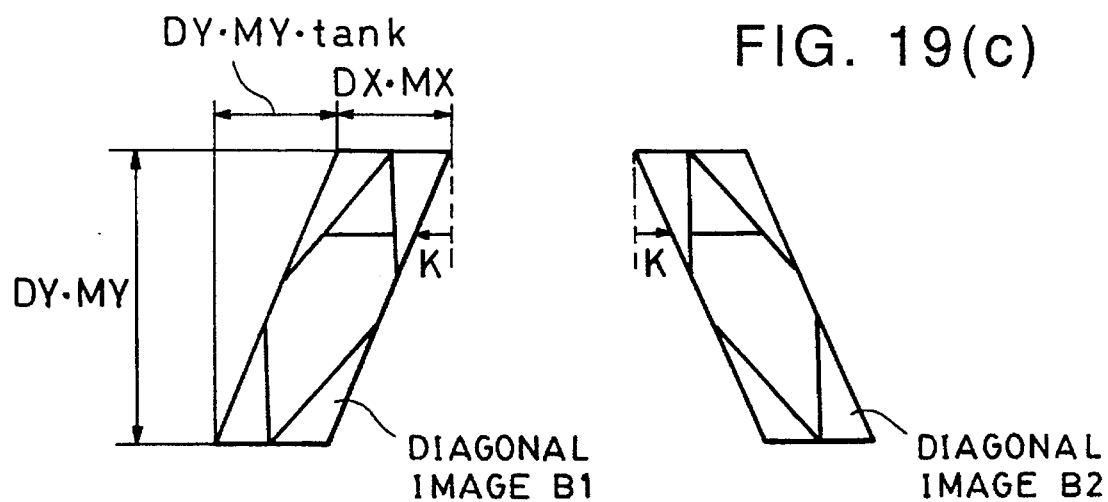

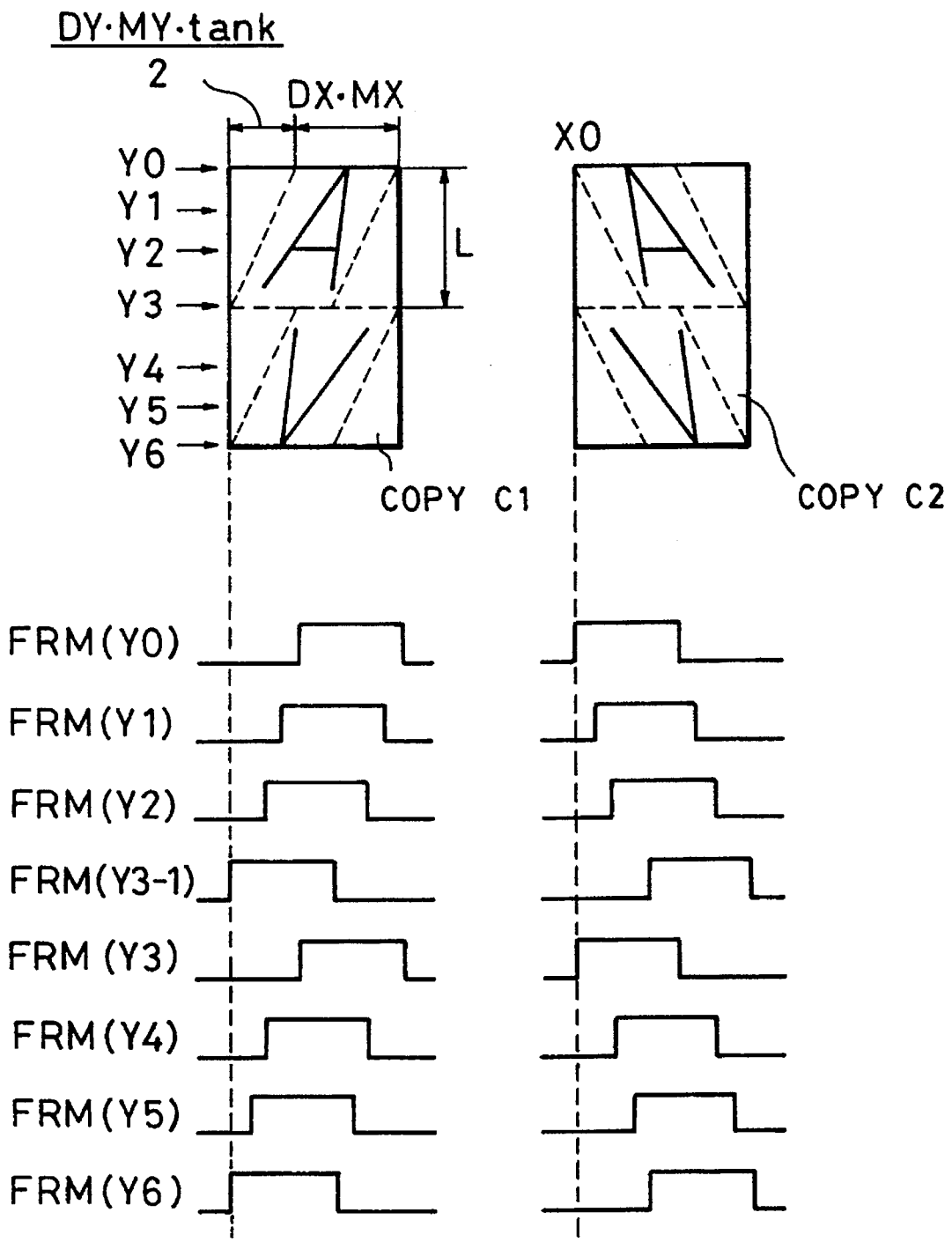

$L1=(X2-X1)\cdot MX+(Y2-Y1)\cdot MY\cdot \tan k$ $L2=(X4-X3)\cdot MX+(Y4-Y3)\cdot MY\cdot \tan k$ $$\tan k' = \frac{EY \cdot \tan k / MX}{EY/MY} = \tan k (MY/MX)$$

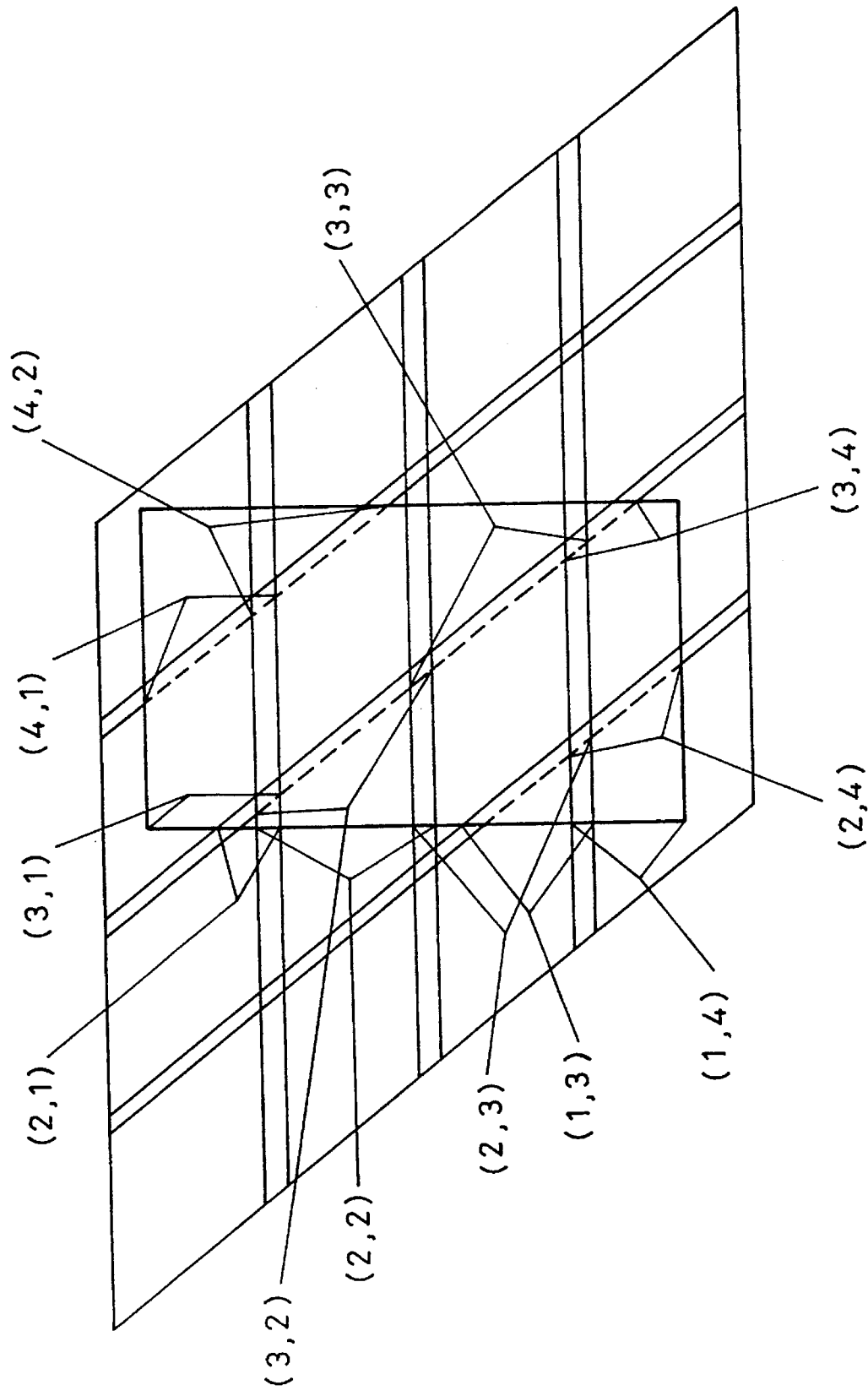

(ORIGINAL DOCUMENT A)

(COPY 1)

(COPY 2)

(COPY 3)

(COPY 4)

(ORIGINAL DOCUMENT D)

(COPY 1)

(COPY 2)

IMAGE PROCESSING METHOD AND APPARATUS WHICH OUTPUTS DIAGONAL IMAGES

This application is a continuation, of application Ser. No. 08/045,361 filed Apr. 13, 1993, now abandoned.

BACKGROUND OF THE INVENTION

1. Field of the Invention

The present invention relates to an image processing method for generating an image by editing the image and an apparatus therefor.

2. Related Art

A portion of conventional digital copying machines has a so-called diagonal function, as shown in FIGS. 62(a), 62(b)1 62(c) and 62(d), which is capable of outputting a copy B formed by inclining an original document A shown in FIG. 62(a) by an arbitrary angle K.

Even if the original is inclined by the same angle as the angle K, the conventional technology sometimes encounters wanting of, or omits, a portion of the inclined image as can be understood from a copy C shown in FIG. 62(c) when the paper sheet is too small. If a paper sheet having the same size as that for the copy B shown in FIG. 62(b) is used, a portion of the inclined image encounters wanting, or is omitted, as can be seen from a copy D shown in FIG. 62(d) when the angle K is too large. If a portion of the diagonal image encounters wanting, or is omitted, as described above, a desired image region cannot be obtained. This leads to a fact that the copying operations must be repeatedly performed while shifting the original document in an original document reading portion of the digital copying machine until a desired copy of the original document is obtained. Therefore, there arises a problem in that a long time is taken and the cost cannot be reduced.

SUMMARY OF THE INVENTION

An object of the present invention is to provide an image processing method and an apparatus therefor arranged to edit an image in such a manner that an inclined image can be completely included within a recording medium by preventing omission of a portion of the inclined image due to the size of the original document, the size of the recording medium, the magnification and the angle of the inclination and the like so that an image without omission can be outputted.

An object of the present invention is to provide an image processing method comprising the steps of: reading an image of an original document; converting the image of the original document read in the reading step into a diagonal image; and outputting the diagonal image by performing control to cause the diagonal image to be included within a recording medium in accordance with an angle of inclination of the diagonal image and the size of the recording medium.

Another object of the present invention is to provide an image processing apparatus comprising: reading means for reading an image of an original document; conversion means for converting the image of the original document read by the reading means into a diagonal image; control means for performing control to cause the diagonal image to be included within a recording medium in accordance with an angle of inclination of the diagonal image and the size of the recording medium; and output means for outputting the diagonal image to the recording medium in accordance with the control performed by the control means.

Yet another object of the present invention is to provide an image processing apparatus comprising: reading means for reading an image of an original document; division means for dividing the image written on the original document into a plurality of image regions; conversion means for converting each of the plurality of the image regions divided by the division means into a plurality of diagonal images; control means for performing control to cause a plurality of the diagonal images to be included within a recording medium in accordance with an angle of inclination of the diagonal images and the size of the recording medium; and output means for outputting a plurality of the diagonal images to the recording medium in accordance with the control performed by the control means.

Still another object of the present invention is to provide an image processing apparatus comprising: reading means for reading an image of an original document; conversion means for converting the image of the original document read by the reading means into a diagonal image; control means for performing control to cause the overall body of the diagonal image to be included within a plurality of recording mediums in accordance with an angle of inclination of the diagonal images and the size of the recording mediums; and output means for outputting each portion of the diagonal image in a divided manner to a plurality of the recording mediums in accordance with the control performed by the control means.

Another object of the present invention is to provide an image processing apparatus for performing an image process in such a manner that an image of an original document is converted into a diagonal image in accordance with a given angle of inclination to output the diagonal image to a recording medium, the image processing apparatus comprising: reading means for reading an image of an original document; division means for dividing the image written on the original document into a plurality of image regions; conversion means for converting each of a plurality of the image regions divided by the division means into a plurality of diagonal images in accordance with the angle of inclination; control means for performing control to cause the overall body of a plurality of the diagonal images to be included within a plurality of the recording mediums in accordance with the angle of inclination and the size of the recording mediums; and output means for outputting each of a plurality of the diagonal images to a plurality of the recording mediums in accordance with the control performed by the control means.

Other and further objects, features and advantages of the invention will be appear more fully from the following description.

BRIEF DESCRIPTION OF THE DRAWINGS

FIGS. 5(a), 5(b) and 5(c) are time charts which illustrate the relationship between write clock (WCLK) and read clock (RCLK) in accordance with the enlargement ratio;

FIGS. 19(a), 19(b) and 19(c) illustrate the outline of the diagonal process according to a third embodiment;

FIGS. 20(a) and 20(b) illustrate the outline of the diagonal process according to a third embodiment;

FIG. 41 illustrates a state of a read start address control relating the overall divided regions according to the sixth embodiment;

DESCRIPTION OF THE PREFERRED EMBODIMENTS

First, the structure of a digital full-color copying machine which is commonly used in eight embodiments to be described below will now be described prior to sequentially describing the eight embodiments.

COMMON APPARATUS (SEE FIGS. 1 TO 5)

Figure 1:
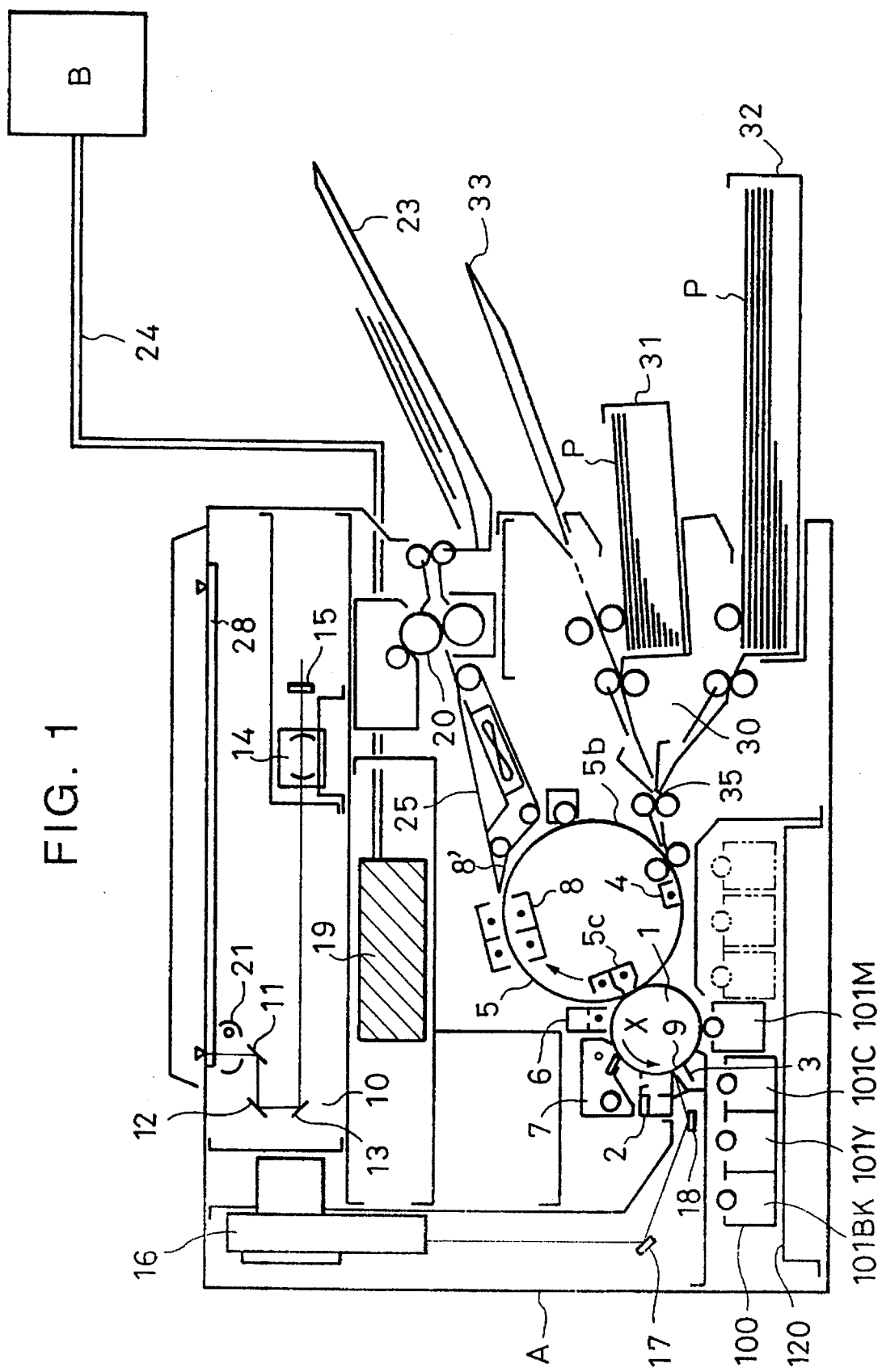
FIG. 1 is a cross sectional view which illustrates a digital full-color copying machine for use as a common apparatus in eight embodiments of the present invention.

FIG. 1 is a cross sectional view of a digital full-color copying machine A used commonly in the eight embodiments to be described later. Referring to FIG. 1, reference numeral 1 represents a photosensitive drum, 2 represents a primary charger, and 3 represents a surface potentiometer for measuring the surface potential of the photosensitive drum 1. In the portions around the photosensitive drum 1, a developing unit 100 incorporates a carrier car 120 which is movable in the lateral direction. A plurality of developing units 101M, 101C, 101Y and 101Bk are mounted on the carrier car 120, and the developing units 101M, 101C, 101Y and 101Bk use a two-component developer containing toner and a carrier mixed therein. Furthermore, a transferring drum 5, a pre-decharger 6, and a cleaning device 7 are disposed around the photosensitive drum.

An optical system 10 comprises an original-document irradiating lamp 21, a first mirror 11, a second mirror 12, a third mirror 13, an imaging lens 14, a CCD 15 having R, B and G filters, a laser scanner unit 16, and two fixed mirrors 17 and 18. A lamp 21 and the first mirror 11 scan the original document placed on an original-document retaining glass 28 at a speed two times the moving speed of the second and the third mirrors 12 and 13. Light reflected from the original document is imaged on the CCD 15 via the lens 14. The image of the original document is color-decomposed by the CCD having the R, B and G filters, and then it is converted into electric signal. Then, the electric signal is imagewise processed in an image processing portion 19, and then it is transmitted to a laser driver disposed in a laser scanner unit 16. A laser beam oscillated in response to the image signal passes through a polygonal scanner and mirrors 17 and 18 disposed in the laser scanner unit 16, following by forming a latent image 9 on the photosensitive drum 1.

A fixing device 20 and a paper supply device 30 are disposed on the right of the copying machine. Further, transfer-paper conveyance systems 25 and 35 are disposed between the foregoing devices 20, 30 and the transferring drum 5. The photosensitive drum 1 is subjected to charging, exposing, developing, transferring and cleaning processes for each of the developing colors M (magenta), C (cyan), Y (yellow) and B (black) by the primary charger 2, the optical system 10, the developing device 100, the transferring drum 5 and the cleaning device 7.

The transferring drum 5 adsorbs transfer paper P supplied from a transfer-paper sheet cassette 31 or 32 via the conveyance system 35 to a transfer sheet 5b by the adsorption charger 4 disposed in the transferring drum 5. Then, the transfer drum 5 rotates and conveys the transfer paper P to transfer a visible image for each developing color on the photosensitive drum 1. A transferring charger 5c is disposed in the transfer region.

The transfer paper P, to which the toner image of each developing color is transferred, is separated from the transfer sheet 5b by a separation charger 8 and a separation claw 8'. Then, the transfer paper P is sent to the fixing device 20 by the conveyance system 25. A toner image on the transfer paper P is fixed on the transfer paper P by the fixing device 20, followed by discharging the transfer paper P onto a tray 23.

The image processing portion 19 is, via a video cable 24, supplied with an image signal from external equipment B, such as a host computer, as well as the signal indicating the image of the original document supplied from the CCD 15, followed by printing the image signal by the foregoing electrophotographic process.

The transfer paper sheets may be sequentially supplied from a manual paper feeding portion 33 as an alternative to the supply made from the transfer paper cassette 31 or 32.

Figure 2:
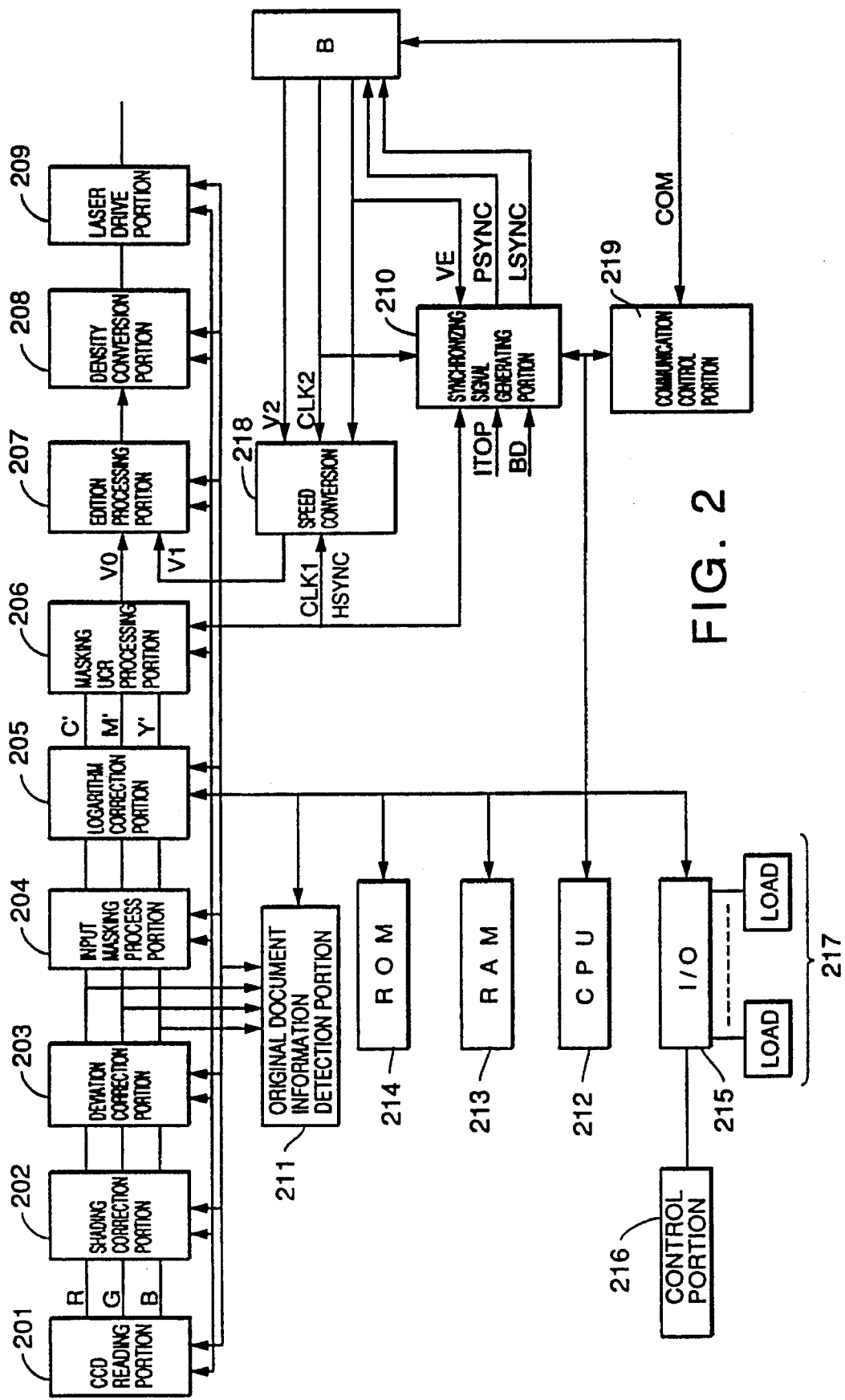
FIG. 2 is a block diagram which illustrates the structure of an image processing portion 19 of the apparatus shown in FIG. 1.

FIG. 2 is a block diagram which illustrates the structure of the image processing portion 19.

A CCD reading portion 201 includes a color sensors for individually obtaining individual red, green and blue analog color signals, an amplifier for amplifying each color signal, and an A/D converter for converting an amplification signal supplied from the amplifier into an 8-bit digital signal. A signal shading-corrected for each color in a shading correction portion 202 is supplied to a deviation correction portion 203 composed of FIFO buffers for a plurality of main scanning lines so that deviations between colors and between pixels are corrected. Then, the filter characteristics of the color sensors are corrected by an input masking processing portion 204, followed by conversions of light quantity signals (R, G and B) into density signals (C', M' and Y') by a logarithmic correction portion 205.

A masking/UCR processing portion 206 generates a black signal (Bk') in accordance with an equation Bk'=min (M', C' and Y'). Then, the toner density characteristics of M', C', Y' and Bk' are corrected, resulting in generations of density signals M, C, Y and Bk from which the base colors have been removed. Then, a color V0 to be developed is outputted to an edition processing portion 207. The edition processing portion 207 performs edition processes, such as a magnification variation process, a movement process and a trimming process to be described later. The edited image signal is supplied to a density conversion portion 208 in which the density characteristics of the electrophotographic process are corrected so that the density is converted into a desired density. Then, the converted signal is supplied to a laser drive portion 209 to emit a laser beam.

A synchronizing signal generating portion 210 generates synchronizing signals, such as pixel synchronizing signal CLK 1 and a horizontal synchronizing signal HSYNC, in response to a rotation standard signal ITOP of the transferring drum and a rotation standard signal BD of the polygonal scanner. An original-document information detection portion 211 detects the position, the size, the density and the color of the original document in response to a necessary signal among the R, G and B signals, the synchronizations of which between the colors and the pixels have been established. A CPU 212 includes a timer circuit and an interruption control circuit in addition to a microprocessor to control a control portion 216 and a plurality of loads 217 via the foregoing processing portions and an I/O portion 215 by using a RAM 213 in accordance with a program stored in a ROM 214.

The external equipment B outputs image signal V2 together with pixel synchronizing signal CLK 2 and image effective signal VE in synchronization with vertical synchronizing signal PSYNC and horizontal synchronization signal LSYNC. A speed conversion portion 218 converts the speed of the image signal V2 supplied with clock CLK 2 of the external equipment B into the speed of clock CLK 1 of the copying machine A, followed by transmitting the image signal to the edition processing portion 207. The edition processing portion 207, to be described later, is able to selectively edit a CCD image V0 or externally supplied image V1 or their synchronized image. A communication control portion 219 controls a serial or parallel communication (COM) between the external equipment B and the copying machine A.

Figure 3:
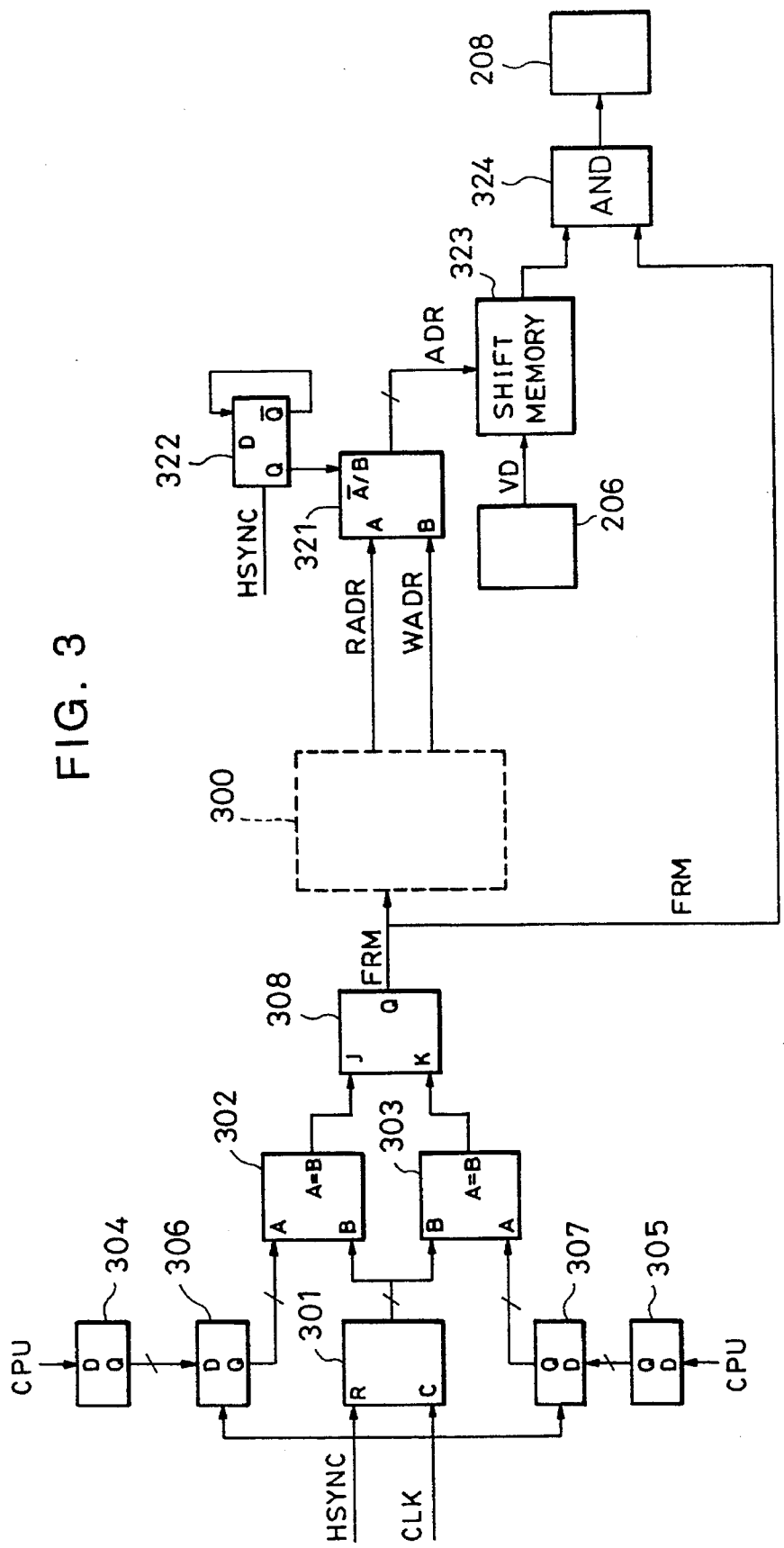
FIG. 3 is a block diagram which illustrates the structure of an edition processing portion 207 of the image processing portion 19 shown in FIG. 2.

FIGS. 3 and 4 are block diagrams which illustrate the detailed structure of the edition processing portion 207 shown in FIG. 2. The operation of the edition processing portion 207 will now be described.

A 13-bit counter 301 is reset in synchronization with the horizontal synchronizing signal (HSYNC), and the count of the 13-bit counter 301 is increased in synchronization with pixel synchronizing clock (CLK). Information of the count is supplied to comparators 302 and 330 to be subjected to respective comparisons with the contents of latches 306 and 307. If the count and the latched value are the same, a coincidence signal is supplied to a JK flip-flop 308. Output signal FRM from the flip-flop 308 is "1" in response to the coincidence signal transmitted from the comparator 302, while the same is "0" in response to the coincidence signal transmitted from the comparator 303. The contents of the latches 306 and 307 are updated to the values of the latches 304 and 305 in synchronization with the signal HSYNC. The contents of the latches 304 and 305 are written by the CPU 212. Therefore, the CPU 212 is able to arbitrarily control the FRM signal with respect to the signal HSYNC for each main scanning line.

Figure 4B:
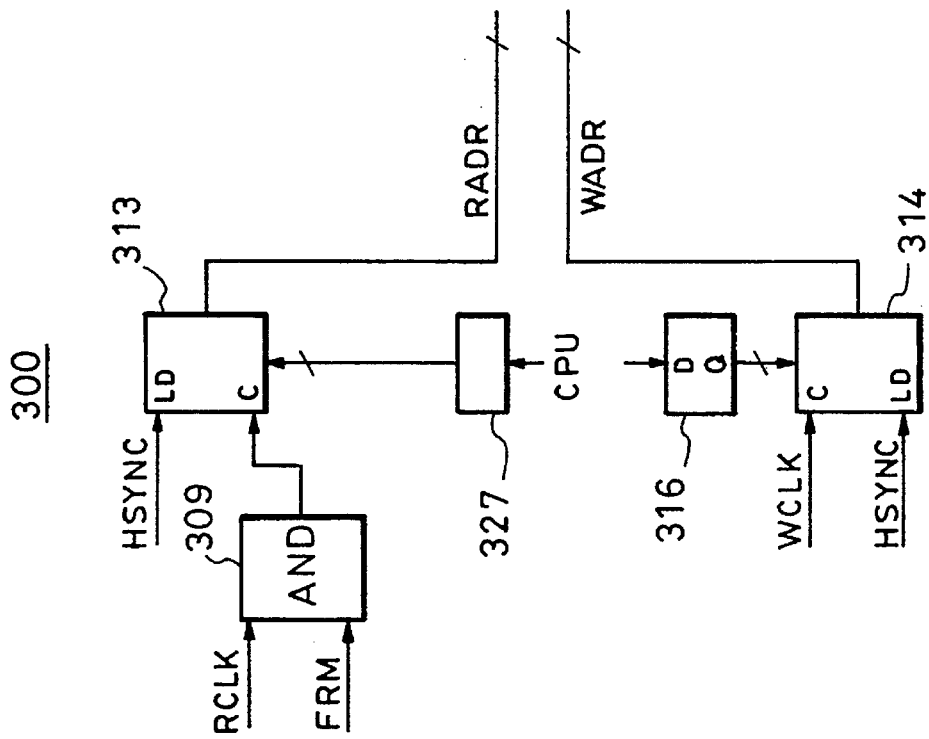
FIGS. 4(a) and 4(b) are block diagrams which illustrates the structure of a circuit of a region 300 of the image processing portion 19 shown in FIG. 3 that is surrounded by a dashed line.
Figure 4A:
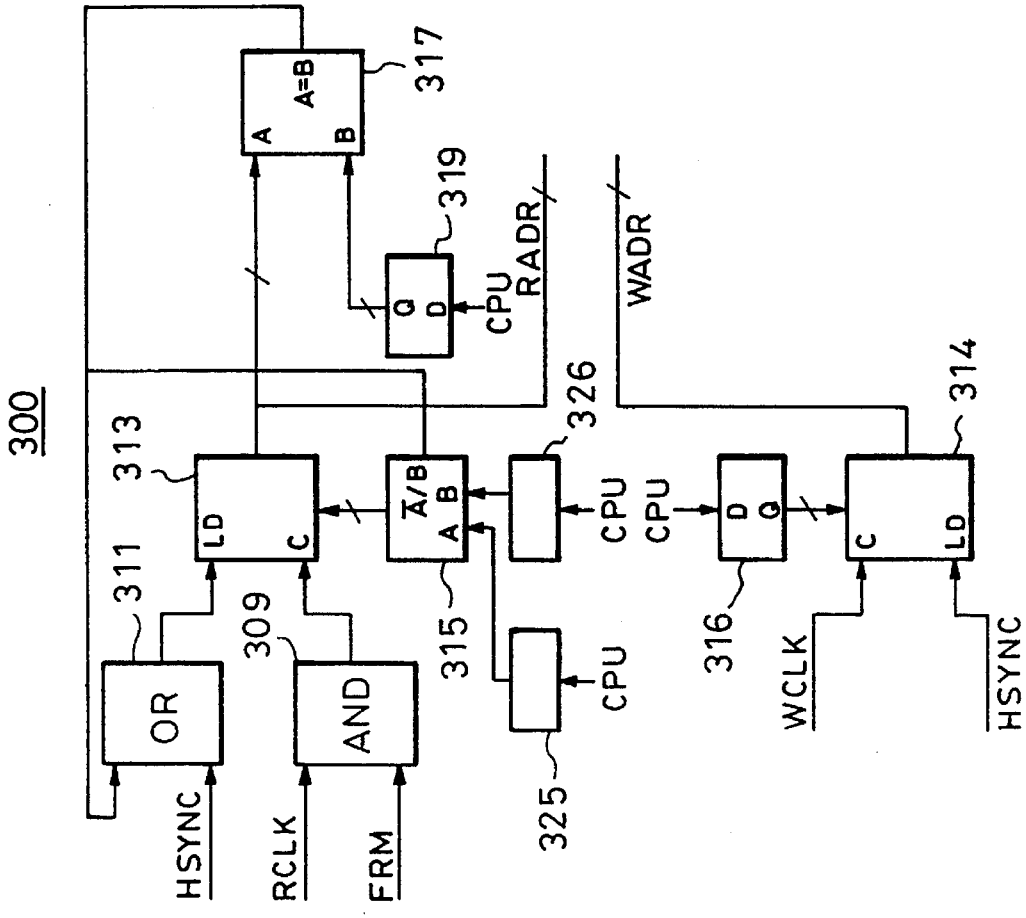

A circuit in a region 300 surrounded by a dashed line in FIG. 3 will now be described with reference to FIG. 4. A circuit, the structure of which is shown in FIG. 4(a), is used in the first to fourth embodiments of the present invention. A circuit, the structure of which is shown in FIG. 4(b), is used in fifth to eighth embodiments of the present invention.

First, the circuit, the structure of which is shown in FIG. 4(a) will now be described.

Counters 313 and 314 are 13-bit up-counters for respectively counting the read address and the write address of a shift memory 323. In accordance with write address WADR transmitted from the counter 314, image data (V0) transmitted from the masking/UCR processing portion 206 is written on the shift memory 323. In accordance with read address RADR transmitted from the counter 313, image data read from the shift memory 323 is transmitted to the density conversion portion 208. Two shift memories 323 are provided in the structure according to this embodiment, from one of which, image data is read when image data is written to the residual one. The foregoing shift is performed for each main scanning line.

A count start address (hereinafter called a "read start address") at which the counter 313 starts counting is previously written to the latch 325 by the CPU 212, the count start address being loaded on the counter 313 via a selector 315 in synchronization with HSYNC. In synchronization with the read clock (RCLK) and an AND signal transmitted from an AND gate 309 with the foregoing FRM signal, the count of the counter 313 is increased. Therefore, the count is not increased if the FRM signal is "0".

On the other hand, the output (RADR) from the counter 313 is transmitted to the comparator 317 to be subjected to a comparison with a value set by the CPU 212. A coincidence signal is a load signal of the counter 313 via an OR gate 311. At this time, the selector 315 loads to the latch 326 a value previously written by the CPU 212. That is, counting is started at the value of the latch 325, and counting may be skipped to the value of the latch 326 when the value is the same as that of the latch 319.

The value previously written by the CPU 212 to the latch 316 is loaded to the write address counter 314 in response to HSYNC, followed by increasing the count of the write address with clock (WCLK). The read clock (RCLK), which is the count clock of the read address counter 313, and the write clock (WCLK), which is the count clock of the write address counter 314, are controlled with the magnification of the main scan.

Next, the circuit, the structure of which is shown in FIG. 4B, will now be described.

The counters 313 and 314 are 13-bit up-counters for respectively counting the read address and the write address of the shift memory 323. In accordance with write address WADR transmitted from the counter 314, image data (V0) transmitted from the masking/UCR processing portion 206 is written on the shift memory 323. In accordance with read address RADR transmitted from the counter 313, image data read from the shift memory 323 is transmitted to the density conversion portion 208. Two shift memories 323 are provided in the structure according to this embodiment, from one of which, image data is read when image data is written to the residual one. The foregoing shift is performed for each main scanning line.

A count start address (hereinafter called a "read start address") at which the counter 313 starts counting is previously written to the latch 327 by the CPU 212, the count start address being loaded on the counter 313 in synchronization with HSYNC. In synchronization with the read clock (RCLK) and the foregoing AND signal transmitted from the AND gate 309 with the foregoing FRM signal, the count of the counter 313 is increased. Therefore, the count is not increased if the FRM signal is "0".

The value previously written by the CPU 212 to the latch 316 is loaded to the write address counter 314 in response to HSYNC, followed by increasing the count of the write address with clock (WCLK). The read clock (RCLK), which is the count clock of the read address counter 313, and the write clock (WCLK), which is the count clock of the write address counter 314, are controlled with the magnification of the main scan.

Regardless of the fact that the circuit structure of the region 300 is as shown in FIG. 4A or FIG. 4B, the RADR and WADR which respectively are outputs from the counters 313 and 314 alternately serve the address (ADR) of the shift memory 323 for each main scanning line by the address selector 321 and the flip-flop 322.

A predetermined region of image data read from the shift memory 323 as described above is forcibly substituted to signal "0" in response to the FRM signal by the AND gate 324, followed by transmission to the density processing portion 208.

Next, the relationship between the write clock (WCLK) and the read clock (RCLK) will now be described.

FIG. 5 is a time chart which illustrates the relationship between the write clock (WCLK) and the read clock (RCLK) in accordance with three magnifications of the main scan (100% 200% and 50%). If the magnification of the main scan is 100%, that is, in the equal magnification mode, the period of the write clock (WCLK) and that of the read clock (RCLK) are the same as shown in FIG. 5(a). Further, the counting speed of the write address and that of the read address are the same. In an enlargement mode, the frequency of the read clock (RCLK) is made lower than that of the write clock (WCLK) to lower the speed at which the read address is counted from the shift memory 323. If the magnification of the main scan is 200%, the frequency of the read clock (RCLK) is made to be the half of the frequency of the write clock (WCLK) as shown in FIG. 5(b). In a contraction mode, the frequency of the write clock (WCLK) is made lower than that of the read clock (RCLK) to lower the speed at which the write address of the shift memory 323 is counted. If the magnification of the main scan is 50% for example, the frequency of the write clock (WCLK) is, as shown in FIG. 5(c), made to be the half of the read clock (RCLK).

PRINCIPLE OF DIAGONAL PROCESS (SEE FIGS. 6 AND 7)

The principle of a diagonal process to be executed in the embodiments to be described later will now be described with reference to FIGS. 6 and 7.

Figure 6:
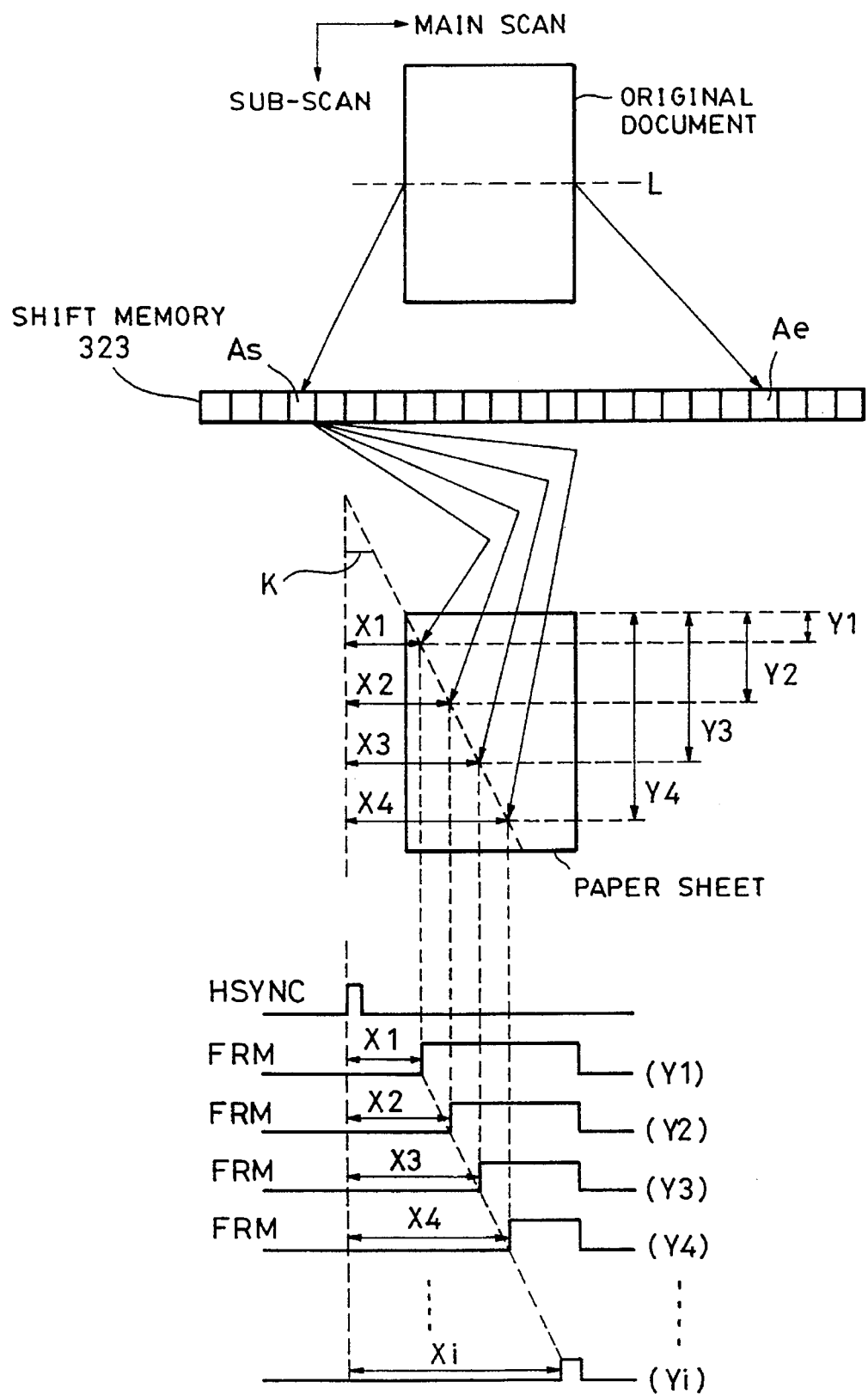
FIG. 6 illustrates the principle of a diagonal process.

FIG. 6 illustrates the principle of the diagonal process. As shown in FIG. 6, the image of an original document read by a main scanning line L at an arbitrary sub-scanning position is written between predetermined addresses As and Ae of the shift memory 323 for one line. With proceeding of the sub-scan from line Y1, Y2, Y3, Y4 and so forth, the timing at which the reading start timing signal (FRM) for reading the address As from the shift memory 323 is turned on is deviated from the standard signal HSYNC by a degree corresponding to the time corresponding to X1, X2, X3 and X4. As a result, the image is inclined. As for the angle of inclination, Xi is so controlled that tan $(K)=(Xi-Xj)/(Yi-Yj)$ is met. In the case shown in FIG. 6, Xi is enlarged with proceeding of the sub-scan, resulting in a rearward inclination of the image with respect to the main scan. If Xi is reduced with proceeding of the sub-scan, the image is inclined forwards with respect to the main scan. Since the read start address from the shift memory 323 is fixed to As regardless of the sub-scanning position, the foregoing control is effective for both the contraction and the enlargement.

In contrast with FIG. 6 which illustrates the control for inclining the image by changing the timing, at which the timing signal (FRM) for reading the image from the shift memory 323 is turned on, for each line, the diagonal process may be executed so that the read start timing signal (FRM) for reading an image from the shift memory 323 is fixed but the read start address for reading the shift memory 323 is changed.

Figure 7:
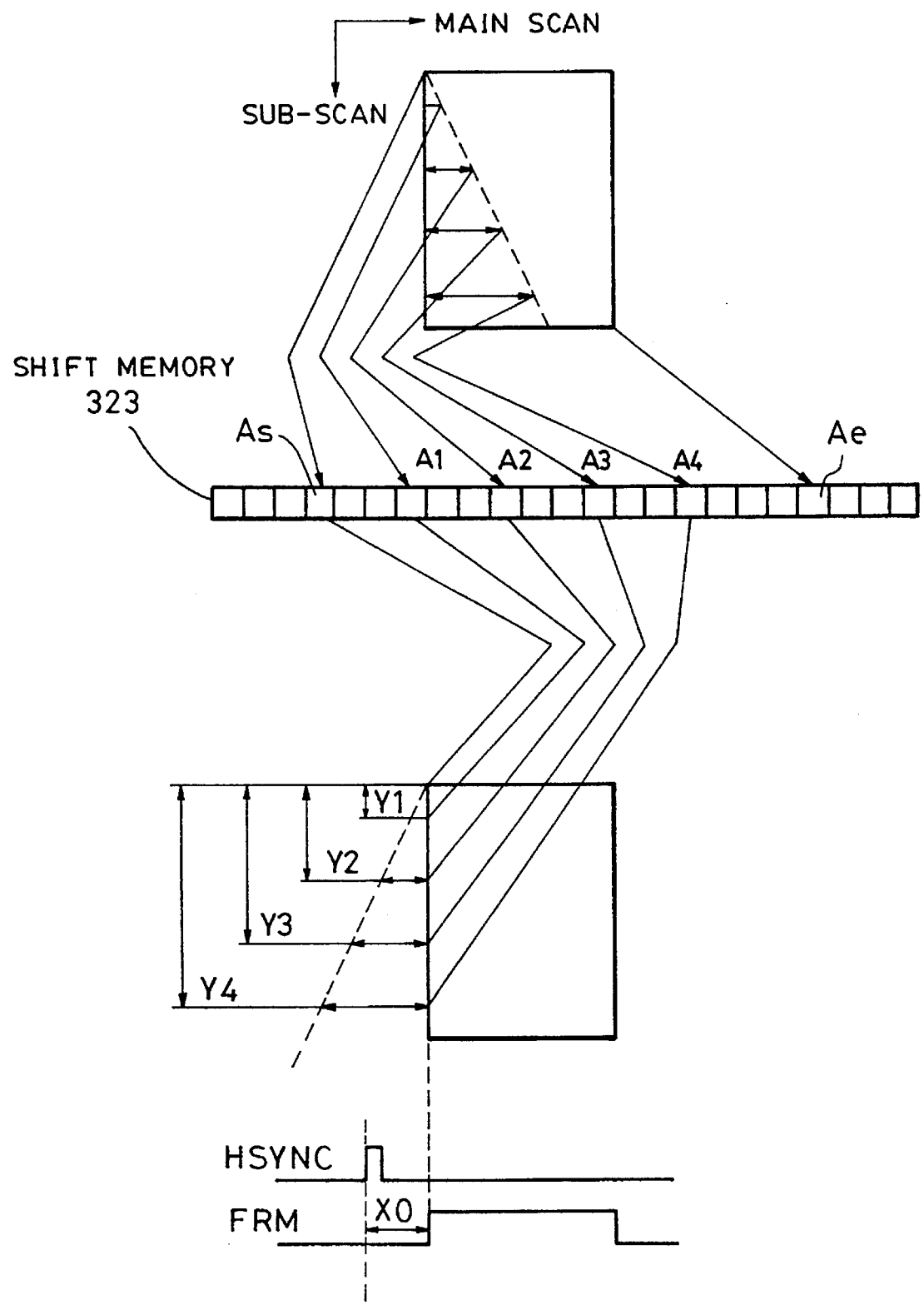
FIG. 7 illustrates a diagonal process to be performed in a direction that is different from that of the diagonal process shown in FIG. 6.

By shifting, in this case, the read start address as A1, A2, A3, A4 and so forth as shown in FIG. 7 from the shift memory 323 with proceeding of the sub-scan as line Y1, Y2, Y3, Y4 and so forth, the image is inclined. During the sub-scan, the relationship between the read start timing signal (FRM) and the standard signal (HSYNC) is not changed. In the equal mode and the contraction mode, the read start address Ai is so controlled that tan $(K)=(Ai-Aj)/(Yi-Yi)$ is met. If Ai is enlarged with proceeding of the sub-scan, the image is inclined forward with respect to the main scan. If Ai is reduced with proceeding of the sub-scan, the image is inclined rearwards with respect to the main scan.

Then, eight embodiments for executing the diagonal process by using the foregoing digital full color copying machine in accordance with the foregoing principle will be described sequentially.

FIRST EMBODIMENT (SEE FIGS. 8 TO 12)

Figure 8A:
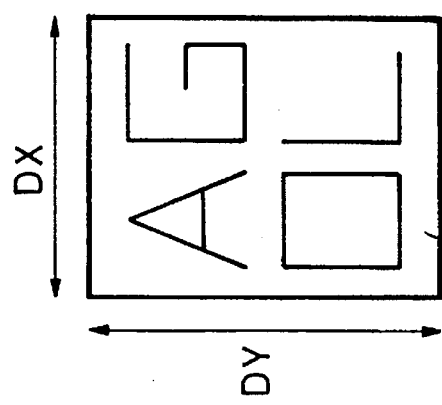
FIGS. 8(a) and 8(b) illustrate a copy output resulted from the diagonal process according to the first embodiment.
Figure 8B:
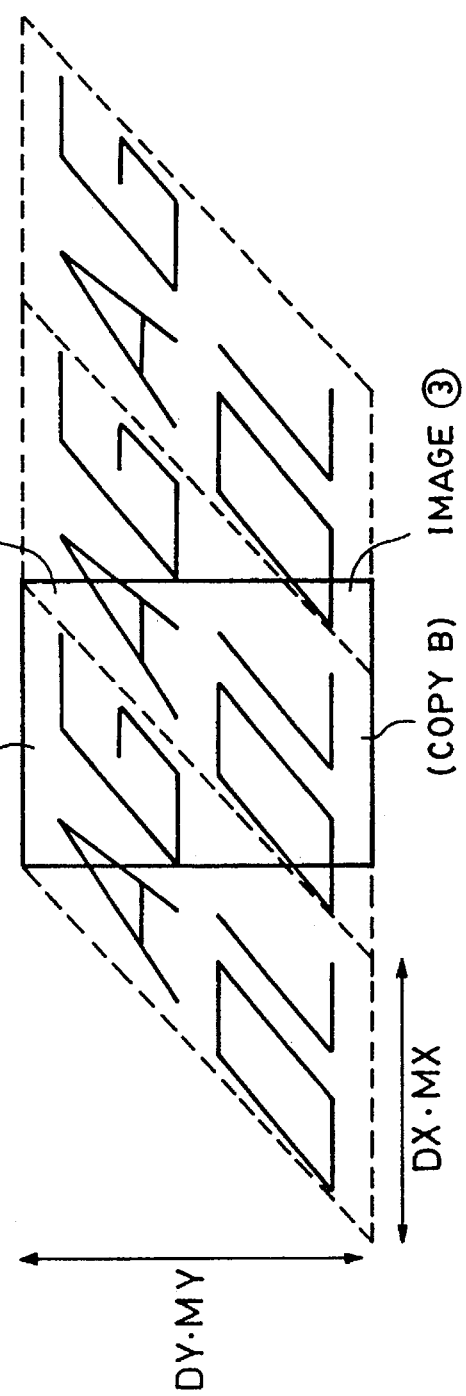
Figure 9:
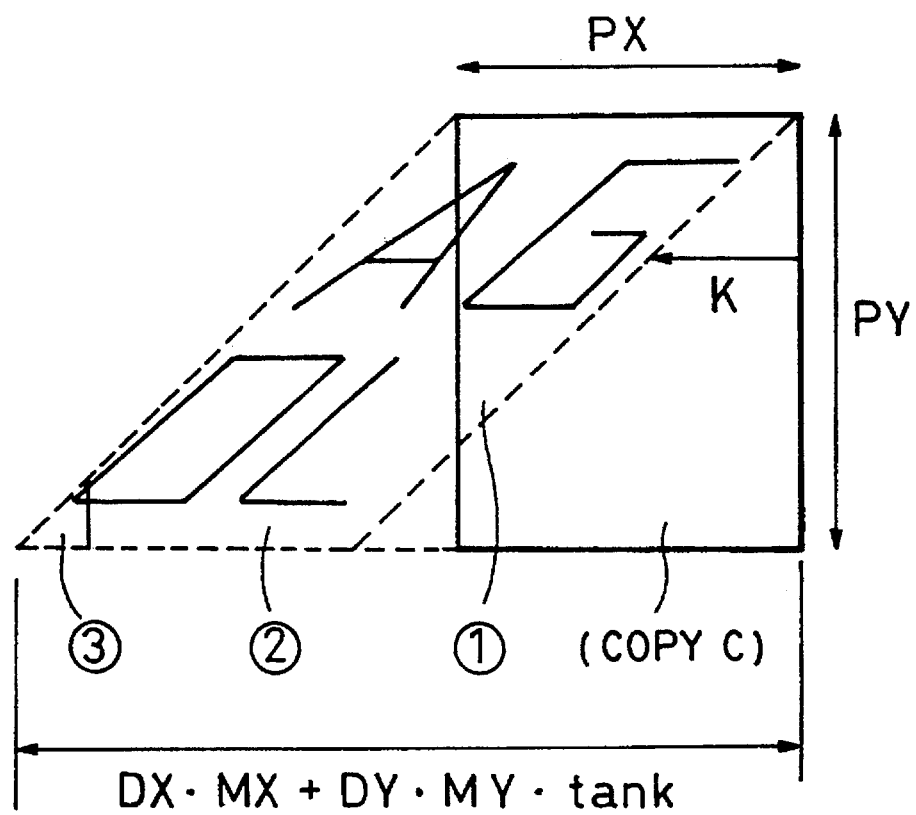
FIG. 9 illustrates an imaginary diagonal image resulted from the diagonal process according to the first embodiment.

FIG. 8 illustrates an example of a copy resulted from the diagonal process according to the fist embodiment. The output of an original document A shown in FIG. 8(a) that results from the diagonal copying performed according to the conventional example lacks a major portion, that is included in the original document A, as is shown in copy C shown in FIG. 9. However, this embodiment enables a copy like copy B shown in FIG. 8(b) to be obtained. According to this embodiment, the inclined image is divided into three portions, images (1), (2) and (3), followed by rearranging them on the copying paper sheet so that a diagonal copy without any omitted portion is obtained.

Assuming that the size of the original document is DX×DY, the magnification is MX (lateral direction) and MY (longitudinal direction), and the size of the paper sheet is PX×PY as shown in FIG. 8, the size of the image after the magnification has been varied is (DX·MX) in the lateral direction and (DY·MY) in the longitudinal direction. The phenomenon that lacking of the image occurring due to the fact that the inclined image cannot be included within the paper sheet is, with reference to FIG. 9, DX·MX+ DY·MY·tan (K)>PX or DY·MY>PY. If PX≧DX·MX and as well as PY≧DY·MY, the area of the inclined image is smaller or equal to the area of the paper sheet regardless of the angle of the inclination. Therefore, an inclined image that cannot be included within the paper sheet can be included within the paper sheet if it is divided.

Figure 10:
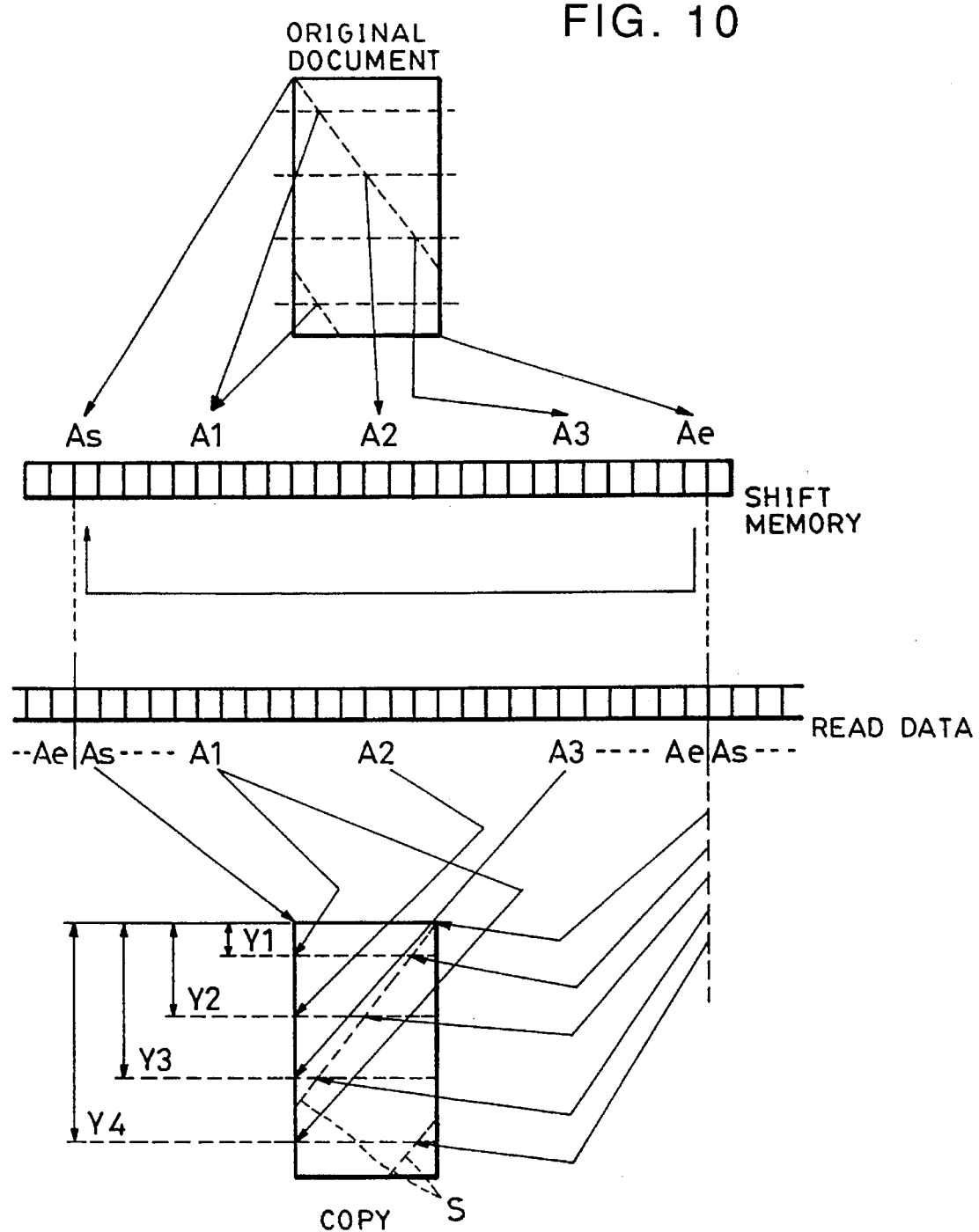
FIG. 10 illustrates the diagonal process according to the first embodiment in such a manner that addressing of the shift memory 323 is paid attention.

The copy B shown in FIG. 8(b) is generated in accordance with a principle shown in FIG. 10. When data about the image of an original document written from the address As to Ae of the shift memory 323 is read, the read address is so controlled by the latch 319 and the comparator 317 shown in FIG. 4(a) that As is read after Ae has been read. With proceeding of the sub-scan as the line Y1, line Y2 and line Y3, the read start address is shifted rearwards as A1, A2 and A3. Diagonal line S shown in FIG. 10 is equivalent to a position at which the data reading address from the shift memory 323 is changed from the address Ae to As. The timing, at which the diagonal line S coincides with the leading end of the main scan, is a timing at which the read start address is Ae. Therefore, the rearward changing of the read start address from As is repeated thereafter. For example, the read start address for the sub-scan line Y4 shown in FIG. 10 is again made to be A1.

Figure 11:
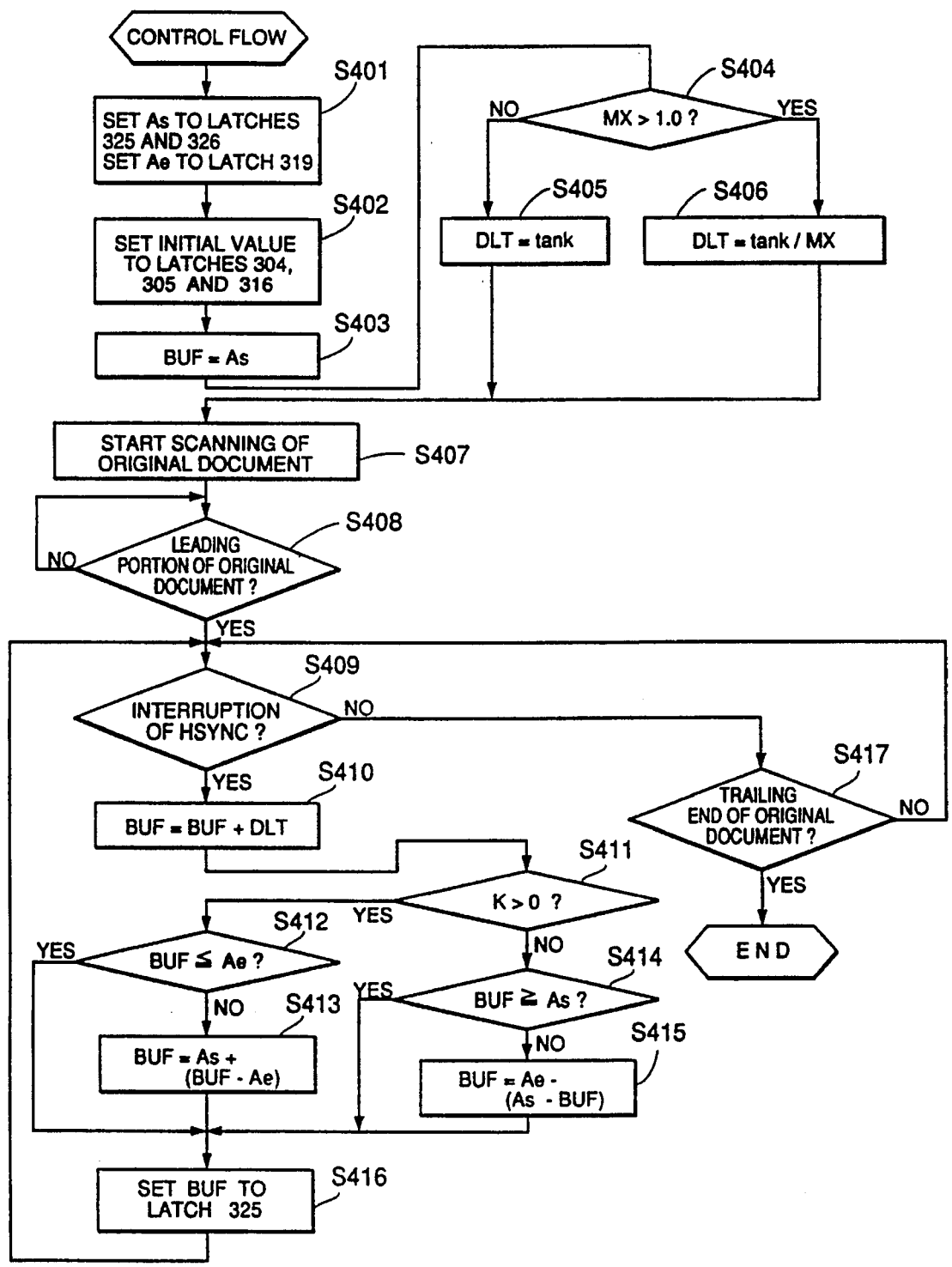
FIG. 11 is a flow chart which illustrates the diagonal process according to the first embodiment.

The diagonal process according to this embodiment will now be described with reference to a flow chart shown in FIG. 11. In step S401, the initial value (As) of the read start address is set to the latches 325 and 326, while the read address counter comparator value (Ae) is set to the latch 319. In next step S402, a predetermined value is set to each of the other latches shown in FIGS. 3 and 4(a). In step S403, the initial value (As) is saved in an area BUF of the RAM 213.

In step S404, an examination is made as to whether or not the main scanning magnification (MX) is larger than 1.0. If MX≦1.0 (that is, contraction) is resulted, the flow proceeds to step S405 in which the value of tan (K) is set to area DLT of the RAM 213. If MX>1.0 is resulted (that is, enlargement), the flow proceeds to step S406 in which the value of tan (K)/MX is set to the area DLT of the RAM 213. If the angle (K) is a negative value, the value of DLT is a negative value.

In next step S407, scanning of the original document by the optical system is started, followed by a confirmation that the scan by the optical system reaches the leading portion of the original document. Then, the flow proceeds to step S409 in which whether or not the CPU 212 is interrupted by the HSYNC signal has been made is examined. If the interruption of the HSYNC signal has been made, the flow proceeds to step S410 in which the contents of the area DLT of the RAM 213 is added to the contents of the area BUF of the RAM 213, followed by storing the result of the addition in the BUF.

In next step S411, a discrimination is made that the diagonal angle (K) is positive or negative. If the angle is a positive value, the flow proceeds to step S412 in which an examination is made as to whether the contents of the BUF has been larger than the address Ae that corresponds to the trailing end of the main scan of the original document image. If BUF>Ae resulted in step S412, the flow proceeds to step S413 in which the difference between the contents of the BUF and the address Ae is added to the address As that corresponds to the leading end of the main scan, followed by the result is again stored in the BUF. If BUF≦Ae is resulted, the flow skips step S413 and proceeds to step S416.

If the value of the diagonal angle (K) is negative, the flow proceeds to step S414 in which an examination is made as to whether or not the contents of the BUF has been made smaller than the address A. If BUF<A, the flow proceeds to step S415 in which the difference between the address As and the contents of the BUF is subtracted from the address Ae, followed by storing the result in the BUF. If BUF≧As is resulted, the flow skips step S415 and proceeds to step S416.

By setting the contents of the area BUF of the RAM 213 as the result of the subtraction to the latch 325 in step S416, the foregoing FRM signal is moved forwards or rearwards with respect to the HSYNC signal in synchronization with the next HSYNC signal, resulting in a copy of the diagonal image.

The foregoing interruption process in step S409 to S416 is repeated to reach the trailing end of the original document. If there is no interruption of the HSYNC signal to the CPU 212, the flow proceeds to step S417 in which a confirmation is made that the scan has reached the trailing end of the original document, resulting in a completion of scanning for one color.

Therefore, according to this embodiment, an image inclined in an arbitrary direction by an arbitrary angle can be outputted in a spiral form to a paper sheet. Therefore, lacking or omission of a portion of a diagonal image due to the fact that the image cannot be included in the paper sheet can be prevented although a conditional limit is present. Hence, a diagonal copy of a desired image portion can be obtained while eliminating a necessity of repeating copying while shifting the position of the original document.

Figure 12A:
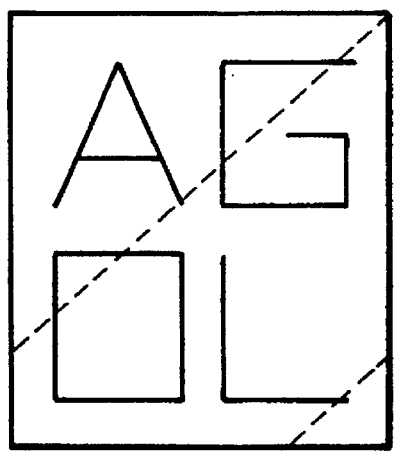
FIGS. 12(a) and 12(b) illustrate a copy output resulting when the angle of inclination according to the first embodiment is changed.
Figure 12B:
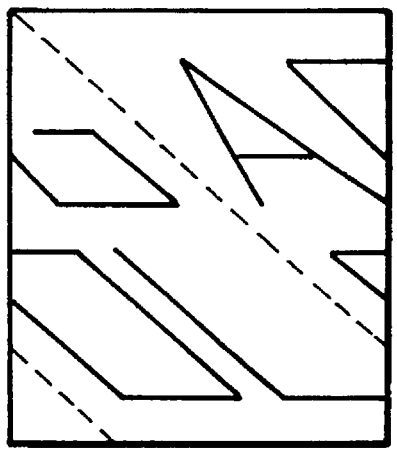

The foregoing condition is PX≧DX·MX and as well as PY≧DY·MY, which is met in the case where the equal magnification copying operation is performed by using a paper sheet having the same size as that of the original document. Therefore, the foregoing method can be called a general method because the diagonal copy can be obtained regardless of the angle of the inclination if the foregoing condition is met. Furthermore, the change of the read start address from Ae to As for each line in a direction inverse to that shown in FIG. 10 will enable a copy C (see FIG. 12(b)) to be obtained which is an output formed into a spiral invert to that shown in FIG. 9.

SECOND EMBODIMENT (SEE FIGS. 13 TO 18)

When the diagonal copy is obtained in the first embodiment, the FRM signal is not changed with respect to HSYNC during the sub-scan and only the read start address from the shift memory is changed. This embodiment has an arrangement that, if the main scanning length of the output image is shorter than the main scanning length of the paper sheet and the main scan must be provided with a margin at the time of output, the FRM signal and the read start address are changed over during the sub-scan to realize the diagonal copy.

Figure 13A:
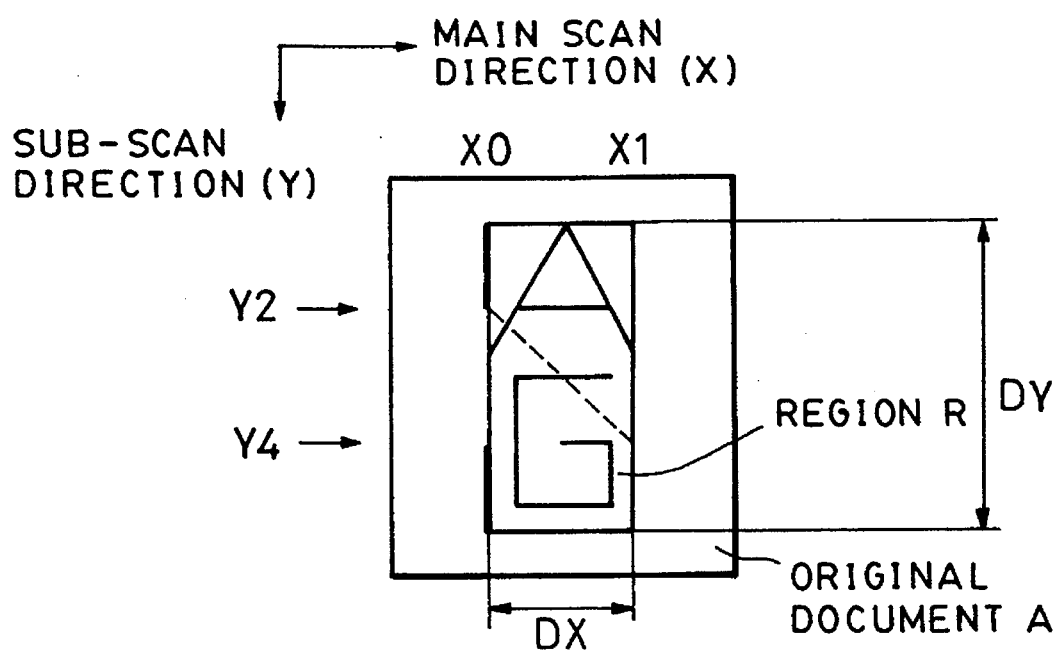
FIGS. 13(a) and 13(b) illustrate the outline of a diagonal process according to the second embodiment.
Figure 13B:
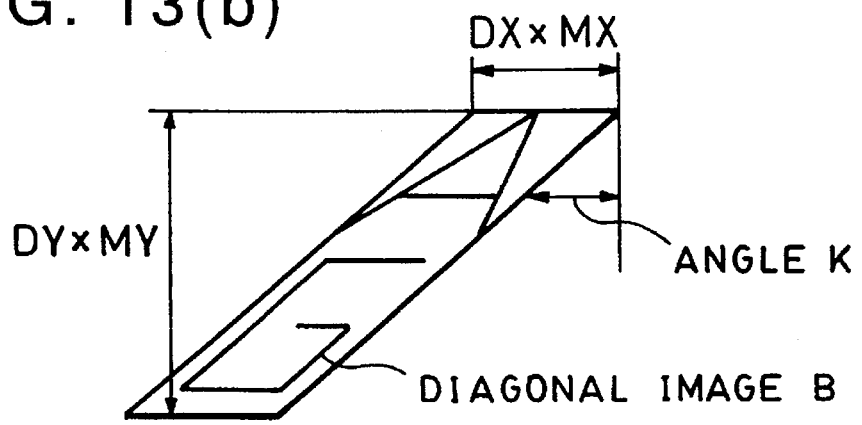
Figure 14:
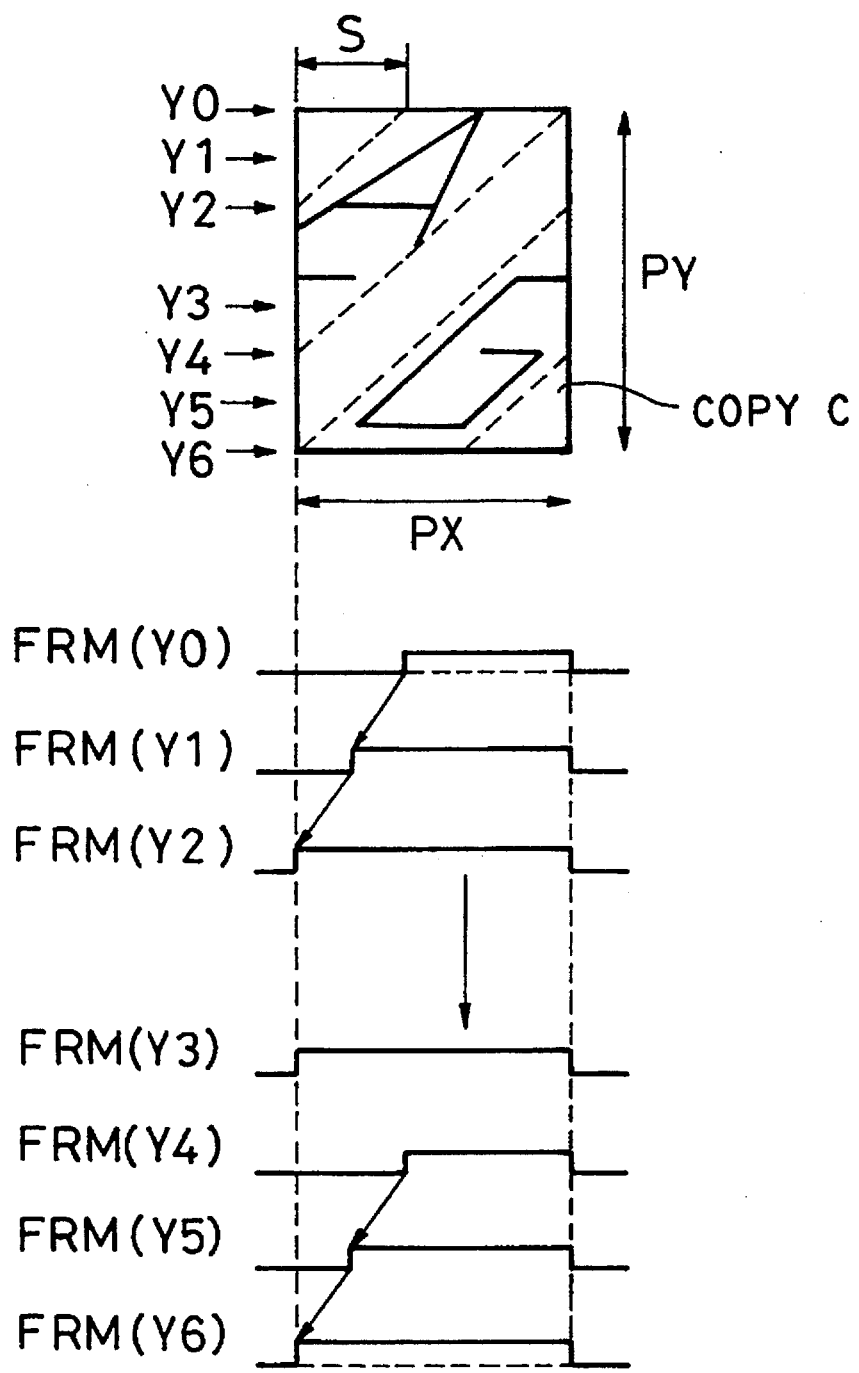
FIG. 14 illustrates the outline of the diagonal process according to the second embodiment.

FIGS. 13 and 14 illustrate a concept of the diagonal process according to this embodiment.

The diagonal process according to this embodiment is a process in which region R in original document A shown in FIG. 13(a) is converted into diagonal image B inclined by angle (K) as shown in FIG. 13, followed by outputting copy C shown in FIG. 14. As can be understood from the copy C, the diagonal image B in the sub-scan region Y0≦Y<Y2 and Y4<Y≦Y6 is copied starting from the leading portion of its main scan. Therefore, the read start address is fixed as shown by a bold line of FIG. 13(a) in the foregoing region. On the other hand, overlap of the diagonal image B on the end portion of the paper sheet in the sub-scan period Y2≦Y≦Y4 causes the read start address to be changed as designated by a dashed line shown in FIG. 13(a). Therefore, the FRM signal maintains a state designated by FRM (Y3) shown in FIG. 14.

Figure 15:
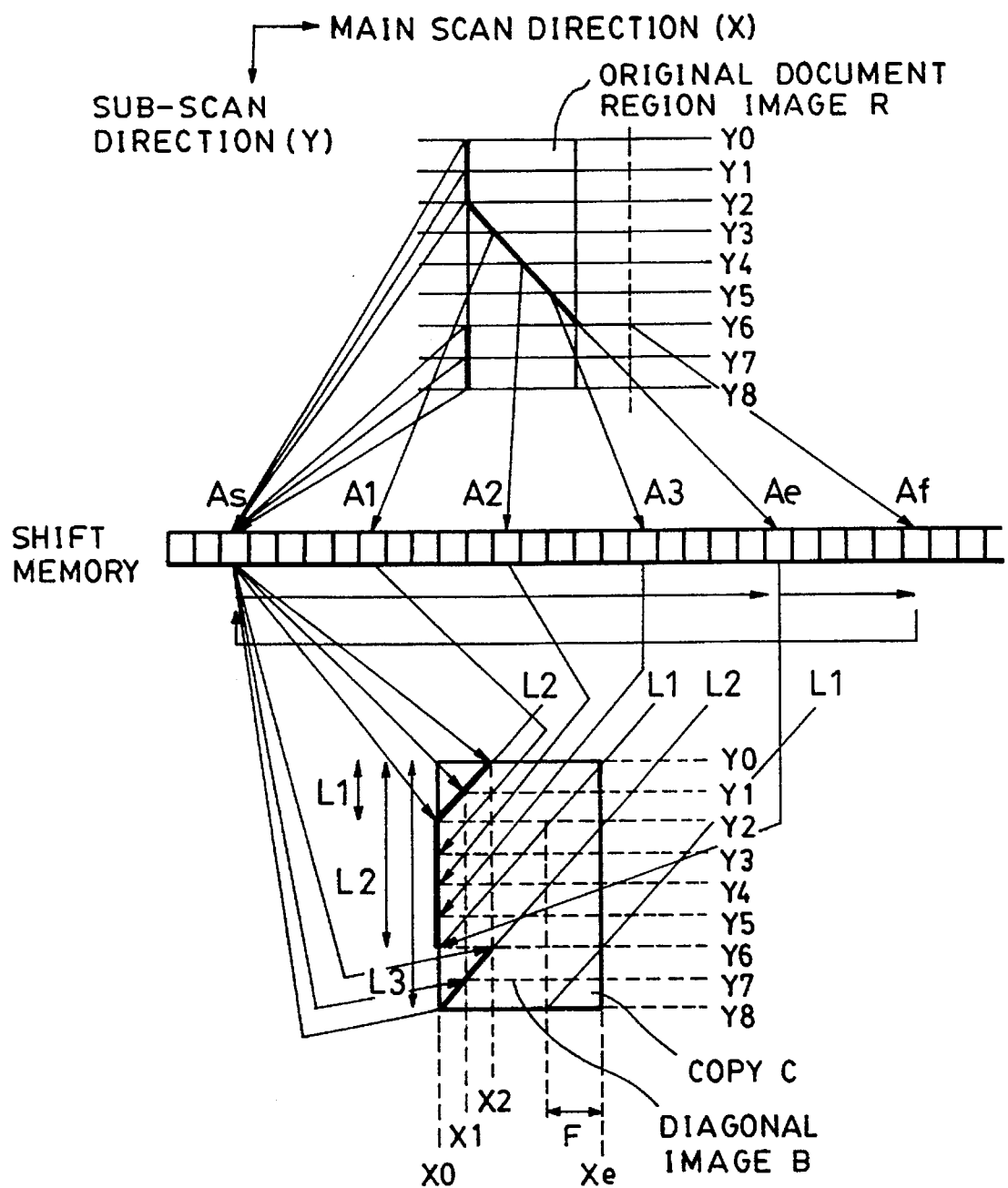
FIG. 15 illustrates change in the reading address from the shift memory 323 when the angle (K) of inclination according to the second embodiment is positive.

The foregoing fact will now be described further in detail with reference to FIG. 15. FIG. 15 illustrates change of the read address from the shift memory 323 when the read start address is changed with respect to the sub-scan direction in the sub-scan region Y2≦Y≦Y6.

Addresses As to Af of the shift memory 323 correspond to the main scan of image R in an arbitrary region on the original document. The read start address from the shift memory 323 is designated by a bold line on R. That is, the read start address is fixed to As in the regions Y0≦Y≦Y2 and Y6<Y≦Y8, while it is changed from As to Ae in the region Y2≦Y≦Y6. The image on line L1 on the copy C corresponds to the address Ae, while the image on line L2 corresponds to the address As. In the region Y2≦Y≦Y6, image data is, therefore, read from the address Ae similarly to the first embodiment, followed by reading image data to address Af, which is a result of addition of the address corresponding to F to Ae on the output image. Then, reading of image is returned to the address As.

Where F can be obtained by F=PX−DX·MX assuming that the main scanning length of the paper sheet is PX, the main scanning length of the image R is DX and the main scanning magnification is MX. The address additional degree Af−Ae is Af−Ae=F in the contraction mode or the equal magnification mode, while it is Af−Ae=F/MX in the enlargement mode. On the other hand, the FRM signal is changed as shown by the bold line on the copy C. That is, the FRM signal is changed from X2 to X0 in the region Y0≦Y<Y2, it is fixed to X0 in the region Y2≦Y≦Y6, and it is again changed from X2 to X0 in the region Y6<Y≦Y8.

Figure 16:
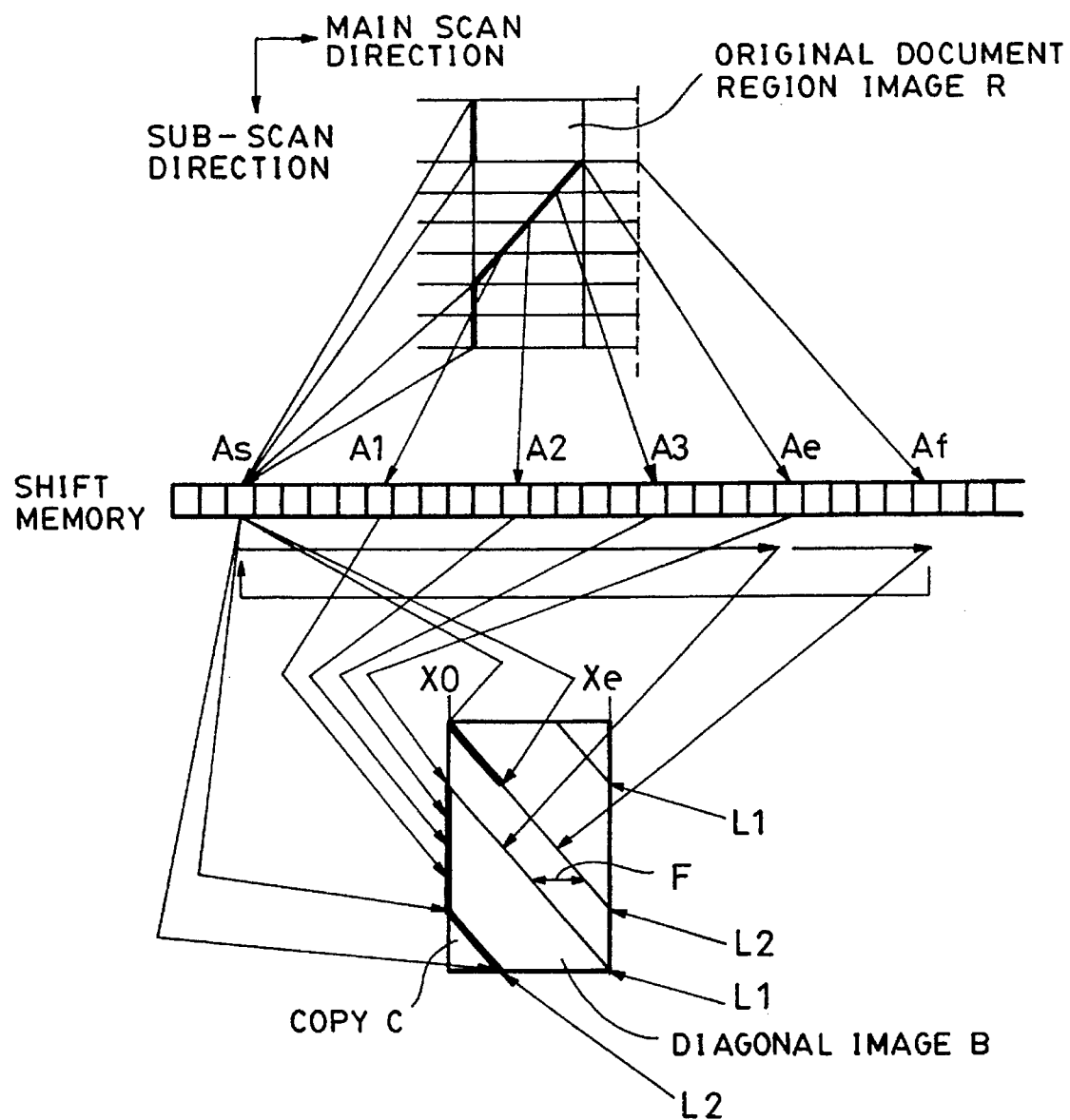
FIG. 16 illustrates change in the reading address from the shift memory 323 when the angle (K) of inclination according to the second embodiment is negative.

FIG. 16 illustrates the relationship between the region image R, the diagonal image B, the copy C, the address of the shift memory 323 and the FRM at the time of performing the diagonal process in a direction inverted to the case shown in FIG. 15. The bold line on region image R shows the change of the read start address, and the bold line on the copy C shows the change of the FRM signal. Since the difference from FIG. 15 is only the direction of the inclination, a similar process is performed.

Figure 17:
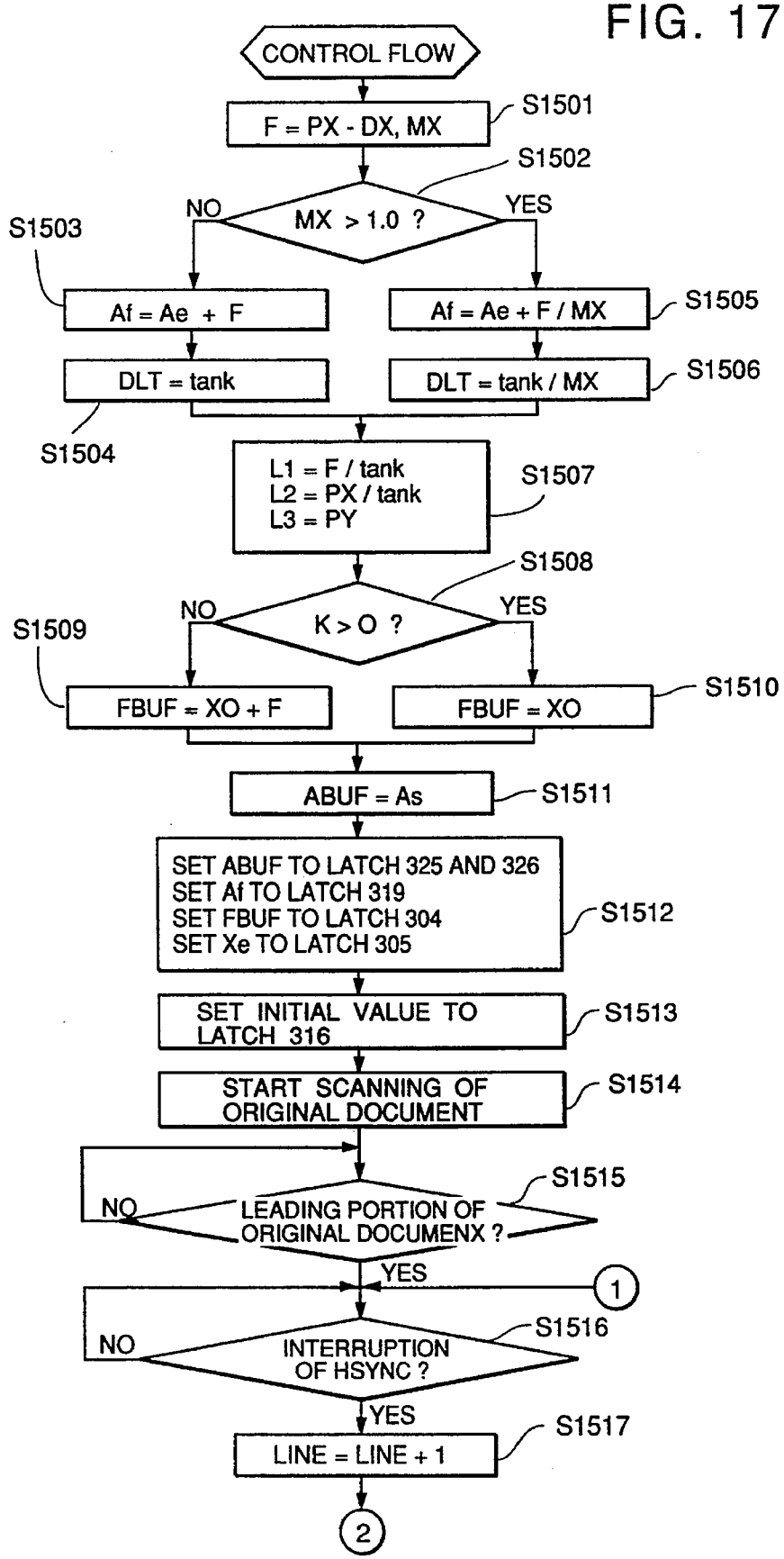
FIG. 17 is a flow chart which illustrates the diagonal process according to the second embodiment.
Figure 18:
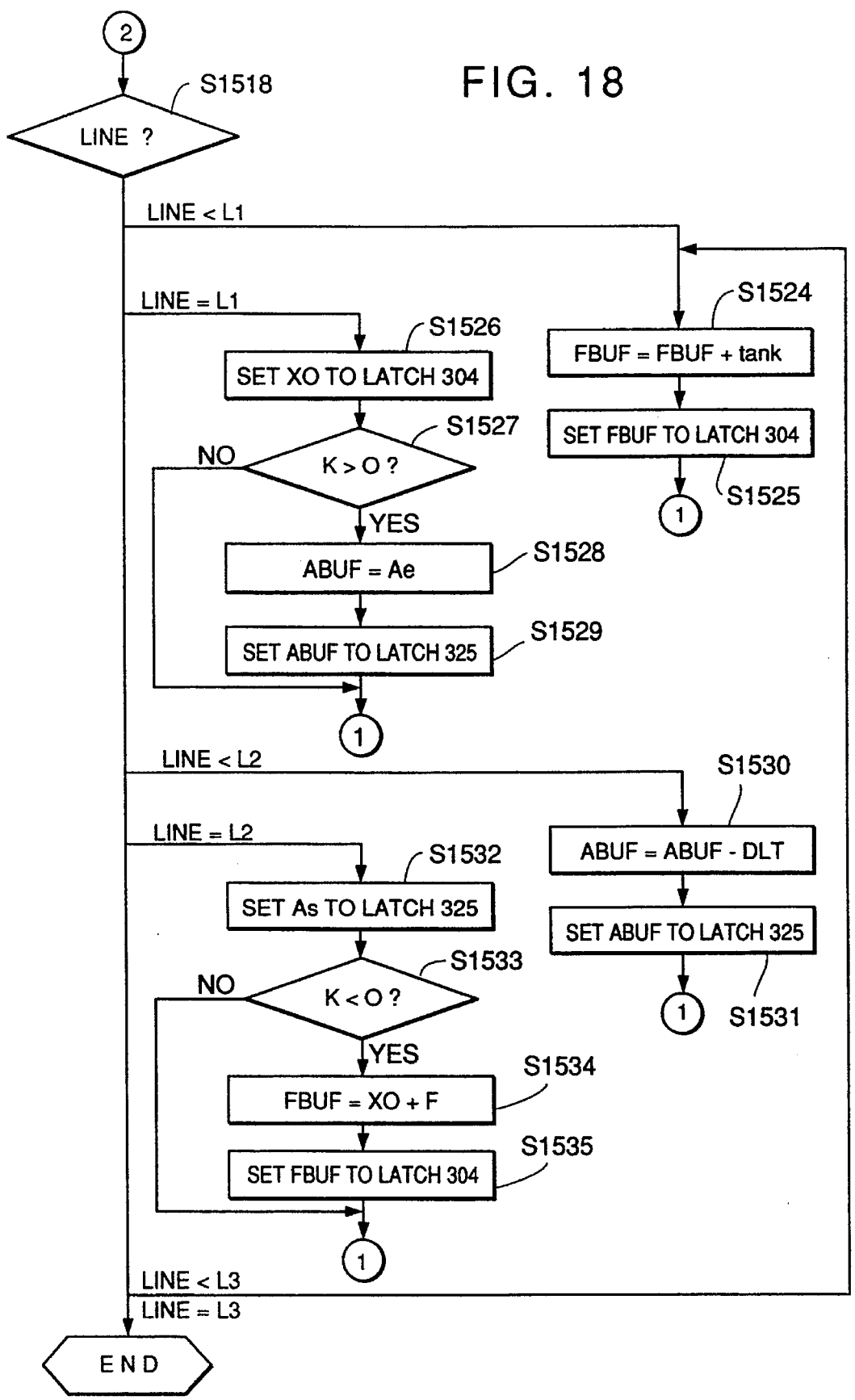
FIG. 18 is a flow chart which illustrates the diagonal process according to a second embodiment.

Next, the diagonal process according to this embodiment will be described with reference to flow chars shown in FIGS. 17 and 18. Hereinafter PX and PY are lengths in the main and the sub-scanning directions that are lengths from each of which a marginal area of the paper sheet in which no printing can be performed is subtracted. That is, PX and PY are effective regions of the paper sheet in which printing can be performed. Symbol MX is the main scanning magnification, and DX is the main scanning length of the image of the original document to be copied. Symbol K is an angle of inclination with a positive or a negative sign. The following definitions are made that: if the process shown in FIG. 15 is performed, K has a negative value, and if the process shown in FIG. 16 is performed, K has a positive value.

In step S1501, the margin length of the main scan on the paper sheet is obtained from F=PX−DX·MX to store the result in the area F of the RAM 213, where F corresponds to a portion in the effective printing region on the paper sheet in which the image is not copied. In step S1502, a discrimination is made as to whether or not the main scan is the enlargement process. If MX≦1.0, a discrimination is made that the subject process is the contraction process, resulting in proceeding of the process to step S1503 in which the margin degree F is added to the address Ae of the shift memory corresponding to the trailing end of the main scan of the image, resulting in the address Af. In next step S1504, tan (K), as the address value to be changed for each sub-scanning line, is calculated, followed by setting the obtained value to the RAM 213 as DLT. Therefore, if the value of K is positive, DLT is positive. If the value of K is negative, DLT is negative. It should be noted that the DLT is able to have decimals of a predetermined number of digits. If MX>1.0, a discrimination is made that the subject process is an enlargement process, resulting in proceeding of the flow to step S1505 in which the address is set to Af and F/tan K is added to the address Ae. In next step S1506, tank (K)/MX is set while making the quantity of the change of the address to be DLT. Since the enlargement is performed by reading data from the shift memory 323, a subtraction by MX is performed. Then, L1=F/tan (K), L2=PX/tank (K) and L3=RY are obtained as the sub-scanning position for changing over the change of the read start address and that of the FRM signal. The respective values are set to the RAM 213.

In the next step S1508, the sign of K is examined to determine the initial state of the FRM signal. If K≦0, the flow proceeds to step S1509. Since the FRM signal is positioned rearwards by F from the leading end X0 in the main scan of the paper sheet as shown in FIG. 15, X0+F is stored in area FBUF of the RAM 213. If K>0, the flow proceeds to step S1510, X0 is stored as FBUF as shown in FIG. 16. In next step S1511, the shift memory address As corresponding to the leading end of the main scan of the image R is set as the initial value ABUF of the read start address. In steps S1512 and S1513, data thus obtained is used to each latch of the circuit shown in FIGS. 3 and 4(a) is initialized.

In step S1514, scanning of the original document is started. In next step S1515, a confirmation is made that the scan reaches the leading potion of the original document, followed by waiting for the interruption of the HSYNC signal in step S1516. Where the original document is an image region to be copied, if the interruption of the HSYNC signal is generated, the flow proceeds to step S1517 to add "1" to counter LINE in the RAM 213 for counting the number of generated interruptions. An assumption is made that LINE has been initialized to "0" before the operation start.

In step S1518, the value of LINE and L1, L2 and L3, which have been previously obtained, are subjected to comparisons, followed by performing the following process in accordance with the results of the comparisons.

(1) If LINE<L1

In this case, the read start address is fixed to As and only the FRM signal is changed. The process is performed so that the shift quantity tan (K) of the diagonal image is added to the value of FBUF in which the generation timing of the FRM signal is stored, followed by again storing the result of the addition in the FBUF. In step S1525, the result is set to the latch 304. Since tan (K) has the same sign as that of K, the FRM signal is rearwards (or forwards) shifted with respect to the main scan if K is positive (or negative).

(2) If LINE=L1

This case corresponds to the change point between the process (1) and the process (3), this process being an initialization of the process (3). In step S1526, fixed FRM signal generation timing X0 is set to the latch 304. In step S1527, the value of K is examined. If K>0, the flow proceeds to step S1528 in which address Xe corresponding to the trailing end of the image is stored as the stored value ABUF of the read start address. In next step S1529, the value of ABUF is set to the latch 325. If K≦0, the processes in steps S1528 and S1529 are skipped. That is, if K≦0, the value of ABUF is not changed in the process (1).

(3) If LINE<L2

In this case, the FRM signal is fixed and only the read start address is changed. The process is performed so that the value of DLT, which stores the quantity of the change of the address, is, in step S1530, subtracted from the value of ABUF which stores the read start address, followed by again storing the result in ABUF. In next step S1531, the result is set to the latch 325. Since the value of DLT has the same sign as the angle (K), the read start address is shifted forwards (or rearwards) with respect to the main scan when K is positive (or negative).

(4) If LINE=L2

This case corresponds to the change point between the process (3) and the process (5), this process being an initialization of the process (5). In step S1532, the address As corresponding to the leading end of the main scan of the image is set to the latch 325 as the fixed read start address for the process (5). In step S1533, the value of K is examined. If K<0, the flow proceeds to step S1534 in which X0+F is, as the initial value of the FRM signal generation timing, set to FBUF similarly to step S1509. In step S1535, the result of this is set to the latch 304. If K≧0, the processes in steps S1534 and S1535 are skipped.

(5) If LINE<L3

The same process as that to be performed in (1) is performed.

(6) If LINE=L3

The copying operation is completed.

After the processes (1) to (5) have been completed, the flow returns to step S1516 in which the interruption of the HSYNC signal is again waited for. Then, the foregoing process is repeated until LINE=L3 is established.

Therefore, according to this embodiment, further free diagonal copying can be performed by changing the region in which the read start address from the shift memory 323 is fixed and the read start timing from the fixed read start address is changed and the region in which the read start address from the shift memory 323 is changed and the read timing from the changed read start address is fixed.

THIRD EMBODIMENT (FIGS. 19 TO 22)

In contrast with the first and the second embodiments in which the image of the original document is divided at the timing, at which it protrudes over the paper sheet, to generate a spiral copy, resulting in including a deformed image within one paper sheet, this diagonal process according to this embodiment has an arrangement that the image of the original document is divided into the direction of the sub-scan to make each of the divided sections to be inclined to include the diagonal image within one paper sheet.

An example of a copy resulted from the diagonal process according to this embodiment is shown in FIGS. 19 and 20.

Then, a case will be considered in which arbitrary region R of original document A having length DX in the main scanning direction and length DY in the sub-scanning direction as shown in FIG. 19(a) is converted into diagonal image B1 (the value of K is negative) inclined by an angle (K) as shown in FIG. 19(b) or into diagonal image B2 (the value of K is positive) as shown in FIG. 19(c) to obtain a copy.

An assumption is made that the enlargement ratio in the main scanning direction is MX and the enlargement ratio in the sub-scanning direction is MY. Even if the main scanning length (DX·MX+DY·MY·tan (K)) of the diagonal image is larger than the size of the paper sheet and, accordingly, the diagonal image protrudes beyond the paper size, a diagonal process in which the image is divided into two pieces in the sub-scanning direction to be individually subjected to diagonal processes as is shown with copy C1 shown in FIG. 20(a) or copy C2 shown in FIG. 20B. As a result, the main scanning length can be shortened by (DY·MY·tan (K))/2, resulting in that the diagonal image can be included within the size of the paper sheet if the paper sheet is larger than DX·MX+(DY·MY·tan (K))/2. The copies C1 and C2 respectively shown in FIGS. 20A and 20B are so both outputted that the read start address are fixed and only the FRM signals are changed. As shown in FIG. 20, the FRM signal repeats similar changes with respect to the sub-scanning direction in a region from Y0 to Y3 and in a region from Y3 to Y6. By utilizing the foregoing principle, the image is divided into N sections in the sub-scanning direction so that the main scanning length of the diagonal image is DX·MX+(DY·MY·tan (K))/N. The foregoing number of divisions may be manually specified from the scanning portion or automatically determined in accordance with the paper sheet, the magnification and the angle.

The foregoing edition functions realized in the copies C1 and C2 have not been provided for the conventional image copying apparatus and the like. If the image of the original document is composed of a plurality of individual images, the image therefore encounters partial lacking or omission. However, the present invention enables each of the plurality of images to be made diagonal. Therefore, a plurality of effective diagonal images can be obtained from a single operation while eliminating a necessity of changing the original document.

Figure 21:
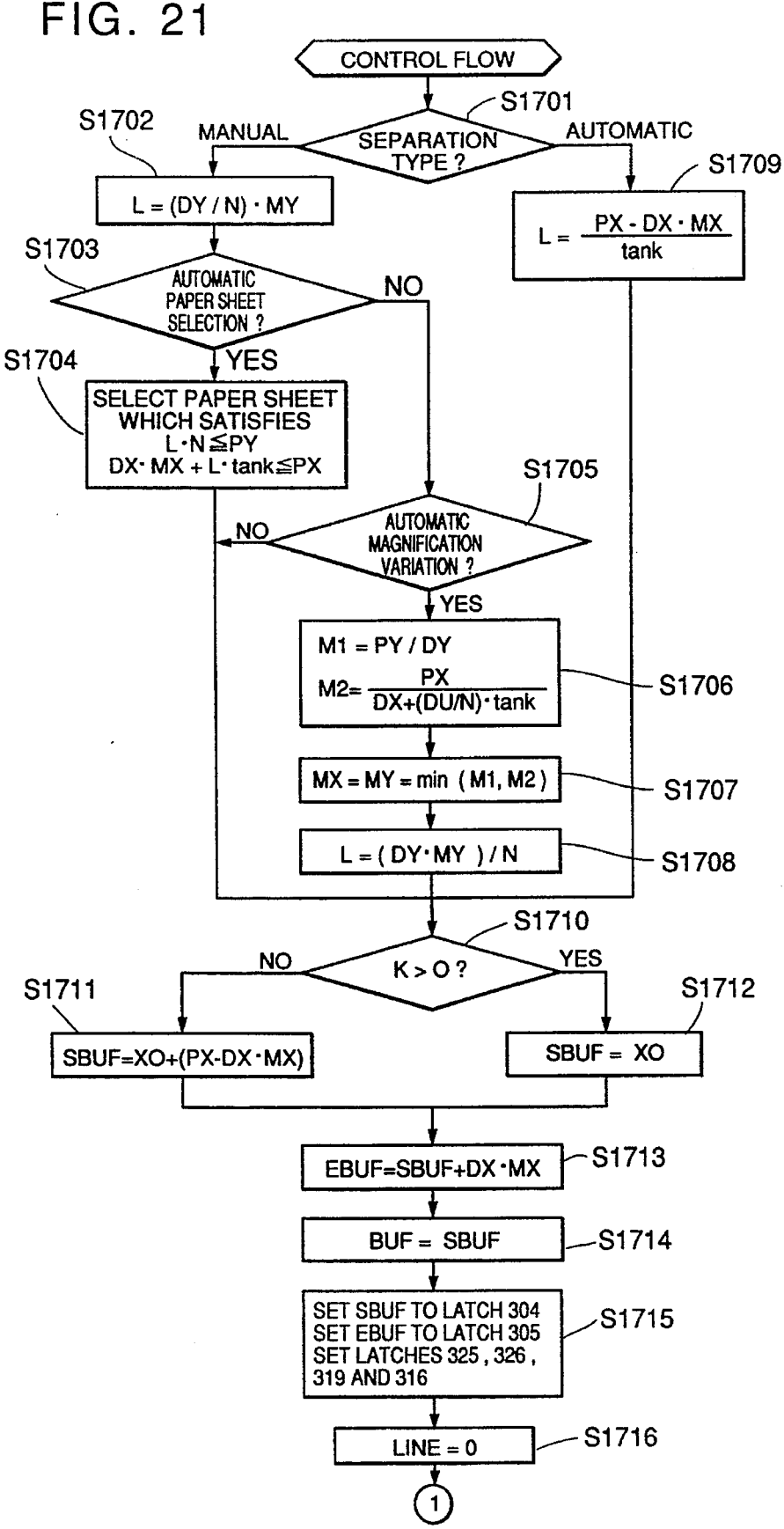
FIG. 21 is a flow chart which illustrates the diagonal process according to the third embodiment.
Figure 22:
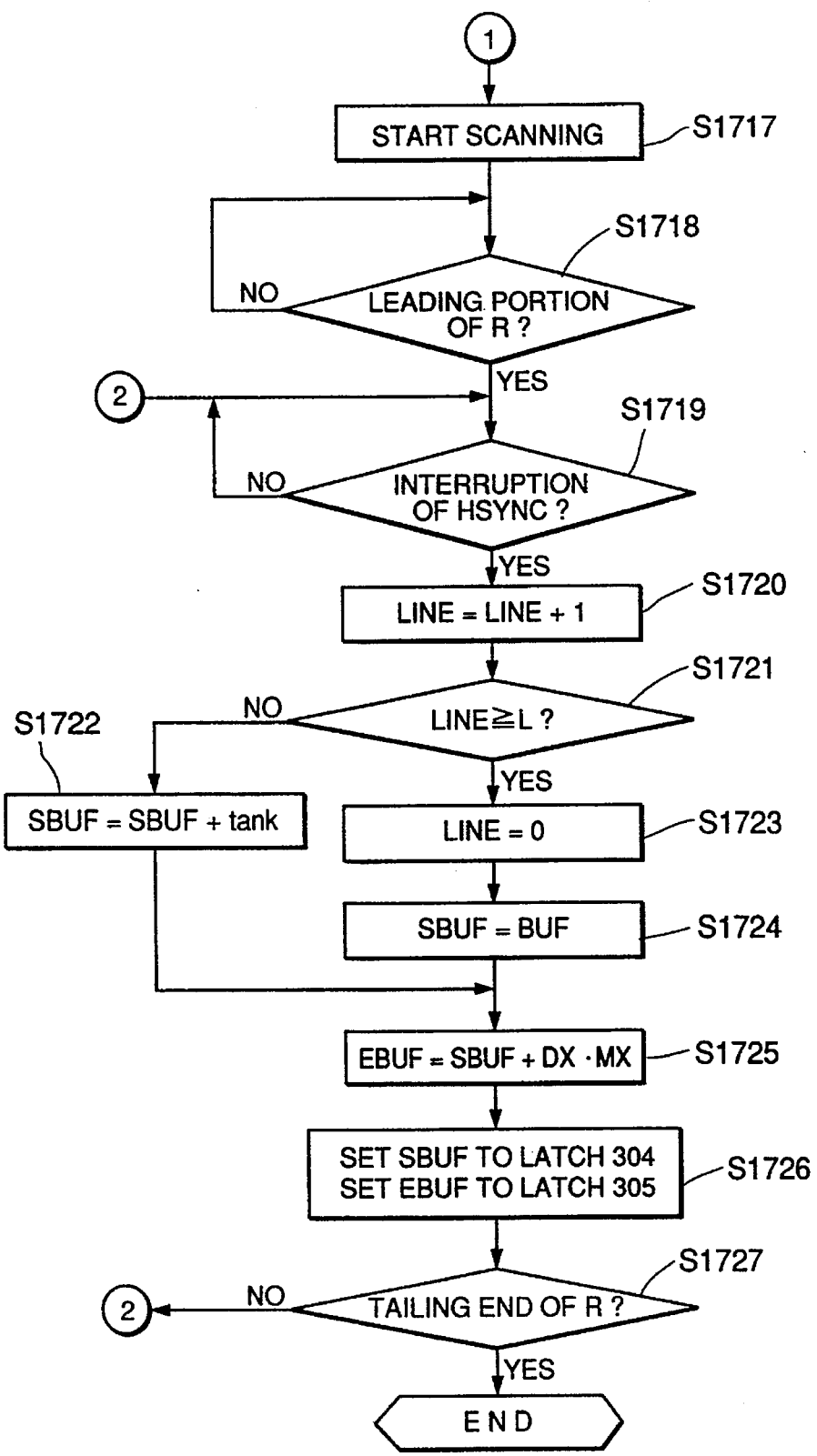
FIG. 22 is a flow chart which illustrates the diagonal process according to the third embodiment.

Next, a diagonal process according to the present invention will now be described with reference to flow charts shown in FIGS. 21 and 22.

In step S1701, an examination is performed whether the division is performed automatically or manually. If the division is performed automatically, the flow proceeds to step S1709 in which the main scanning length DX·MX of the output image is obtained by multiplying the main scanning length DX of the original document image by magnification MX. Then, the main scanning length DX·MX is subtracted from the main scanning length PX of the paper sheet so that PX–DX·MX is obtained, followed by dividing PX–DX·MX by tan (K). As a result, L=(PX–DX·MX)/tan (K) is obtained. The value of L is the length of the division of the image in the sub-scanning direction as shown in FIGS. 20(a) and 20(b) to incline the image by a predetermined angle (K) for the purpose of causing the image to be included within a predetermined paper sheet while preventing or omission of the image. If the division is performed manually, the flow proceeds to step S1702 in which the sub-scanning length DY of the original document image is divided by an instructed number (N) of divisions, followed by a multiplication by a magnification MY to obtain L=(DY/N)·MY.

In next step S1703, an examination is performed whether or not the paper sheet for the apparatus is selected automatically. If the paper sheet is selected automatically, the flow proceeds to step S1704 in which a paper sheet is selected that has the sub-scanning length PY which is larger than L·N obtained by multiplying L by the number of divisions N and has the main scanning length PX which is larger than the sum (DX·MX+L·tan (K)) of the result of a multiplication of the main scanning length DX of the image of the original document and the magnification MX and a multiplication of the division length L and tan (K). If the paper sheet is not automatically selected, the flow proceeds to step S1705 in which an examination is made as to whether or not the processing mode is the automatic magnification variation mode.

If the processing mode is the automatic magnification variation mode, the flow proceeds to step S1706 in which the following magnifications are obtained: magnification M1=PY/DY for causing the sub-scanning length DY of the original document image to be included in the sub-scanning length PY of the paper sheet; and magnification M2=PX/(DX+(DY/N)·tan (K)) for causing the main scanning length DX+(DY/N)·tan (K) to be included in the main scanning length PX of the paper sheet. In step S1707, the smaller magnification M1 or M2 is made to be the main scanning magnification MX and the sub-scanning magnification MY. Since the sub-scanning magnification relates to the main scanning image length in the case of the diagonal image, the magnification is not defined uniquely as a result of the automatic variation of the magnification. Therefore, an assumption is made in this embodiment that the magnification in the main scan and that in the sub-scan are the same. In next step S1708, the determined magnification is used to again determine the division length L in accordance with L=(DY·MY)/N. If the processing mode is not the automatic variation of the magnification, the process proceeds to step S1710 as it is.

In step S1710, the sign of the angle (K) is examined. If K≦0, the flow proceeds to step S1711. If K>0, the flow proceeds to step S1712. In each of steps S1711 and S1712, the initial value of the image reading timing at the leading portion of the sub-scan in the main scanning direction, that is, the initial value SBUF of the generation timing of the FRM signal is determined. If K>0, the image is shifted rearwards for each line, causing, for example, a predetermined address X0 corresponding to the leading end of the main scan of the paper sheet to be the initial value SBUF. If K≦0, the image is shifted forwards for each line, and, accordingly, the initial value is made so that SBUF=X0+(PX−DX·MX) in order to make the FRM signal generation timing to be X0 at the moment one sub-scan of an image divided into the sub-scan is completed. In step S1713, the leading edge of the FRM signal is made to be SBUF, while the trailing edge EBUF is made to be SBUF+DX·MX. In step S1714, the initial value SBUF is repeatedly used during one sub-scan, and, therefore, it is stored in area BUF on the RAM 213.

After the foregoing preparation has been completed, the flow proceeds to step S1715 in which the initial value SBUF of the leading edge of the FRM is set to latch 304, and the initial value EBUF of the trailing edge of the FRM is set to the latch 305. Further, the initial value is set for each of the other latches 325, 326, 319 and 316. In next step S1716, the counter (LINE) on the RAM 213 for counting the number of the sub-scan lines is initialized to "0". Then, scanning is commenced in step S1717.

In step S1718, a confirmation is made that scan has reached the leading portion of the original document image region R. In step S1719, the interruption of the main scanning synchronizing signal (HSYNC) is waited for. If the interruption is generated, the flow proceeds to step S1720 in which the count of the counter LINE is increased. In next step S1721, a comparison is made between the value of LINE and the sub-scan division length (L), which has been previously obtained.

If LINE<L, the flow proceeds to step S1722 in which the inclination quantity tan K for one line is added to the value of the leading edge SBUF of the FRM to again make the result to be SBUF. If LINE≧L, the flow proceeds to step S1723 in which a discrimination is made that scanning for the divided portion has been completed and LINE is initialized to "0". In step S1724, the initial value BUF stored in the SBUF is again set. In step S1725, the trailing end EBUF of the FRM is obtained from SBUF by calculation. In step S1726, the SBUF and EBUF thus obtained respectively are set to the latches 304 and 305.

Finally, in step S1727, an examination is made as to whether or not the scan has reached the trailing end of the original document image region R. If the scan has not reached the trailing end, the flow returns to step S1719 in which the control to be performed in steps S1720 to S1726 is repeated at the moment of the interruption of the signal HSYNC until the scan reaches the trailing end of the original image region R. If the scan reaches the trailing end, the process is completed here.

Therefore, according to this embodiment, the division of the original document image in the sub-scanning direction enables a diagonal image to be outputted without a missing portion.

FOURTH EMBODIMENT (FIGS. 23 TO 25)

This embodiment is to generalize the third embodiment.

Figure 23A:
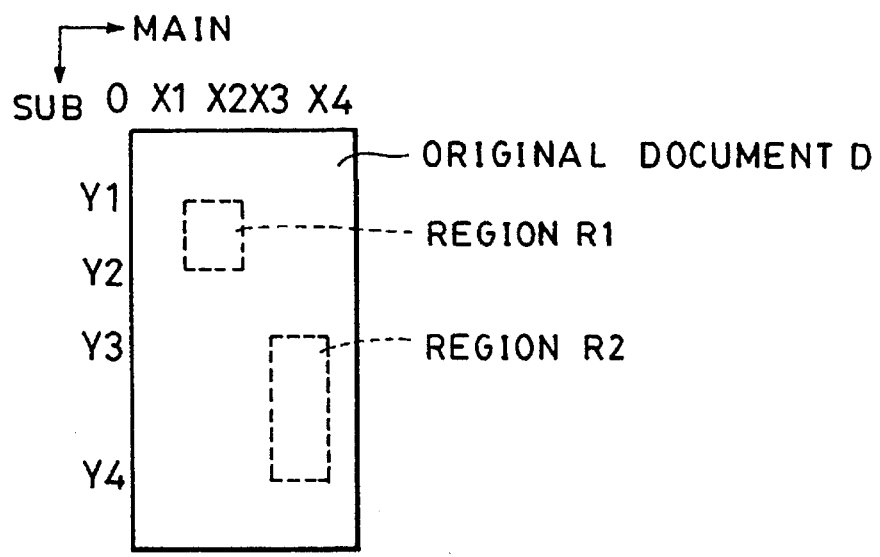
FIGS. 23(a) and 23(b) illustrate the outline of the diagonal process according to a fourth embodiment.
Figure 23B:
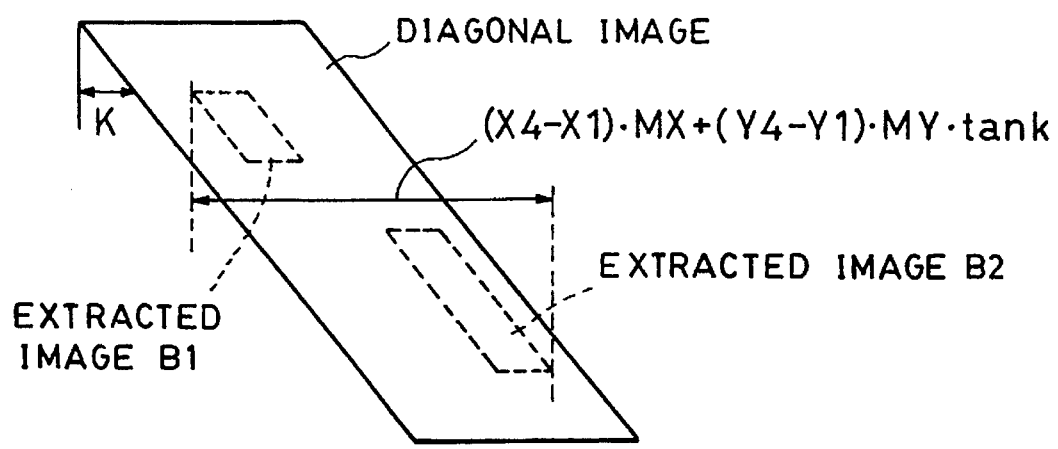
Figure 24:
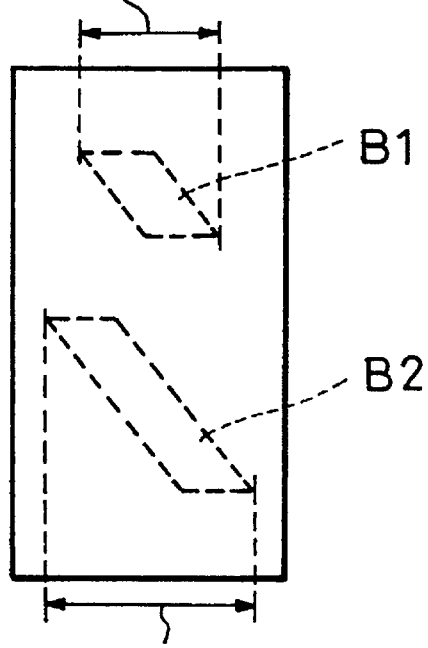
FIG. 24 illustrates the outline of the diagonal process according to the fourth embodiment.

If a diagonal process is performed by extracting, for example, images R1 and R2 in a plurality of regions apart from each other in original document D shown in FIG. 23(a), the division process according to the third embodiment causes the main scanning length of the outputted image to be (X4−X1)·MX+(Y4−Y1)·MY·tan (K) although the required images are only B1 and B2 as shown in FIG. 23(b). Therefore, the paper sheet must have an excessively large size. However, a copy output obtainable from the actual diagonal process requires the extracted image B1 to have the main scanning length L1=(X2−X1)·MX+(Y2−Y1)·MY·tan (K) and the extracted image B2 to have L2=(X4−X3)·MX+(Y4−Y3)·MY·tan (K). In terms of the overall size of the paper sheet, the paper sheet must have a size which meets the condition that the size is larger than the larger one, L1 or L2. The foregoing required size is considerably smaller as compared with the main scanning length shown in FIG. 23(b).

The foregoing fact is considered further generally, resulting in the overall main scanning length required for the image to be max (ΔXi·MXi+ΔYi·MYi·tan (Ki)), i=1, ..., N assuming that the main scanning lengths of N regions R1, ..., RN are ΔX1, ..., ΔXN, the sub-scanning lengths of the same are ΔY1, ..., ΔYN, the angles of inclinations to be given the regions are K1, ..., KN, the main scanning magnifications are MX1, ..., MXN and the sub-scanning magnifications are MY1, ..., MYN.

Figure 25:
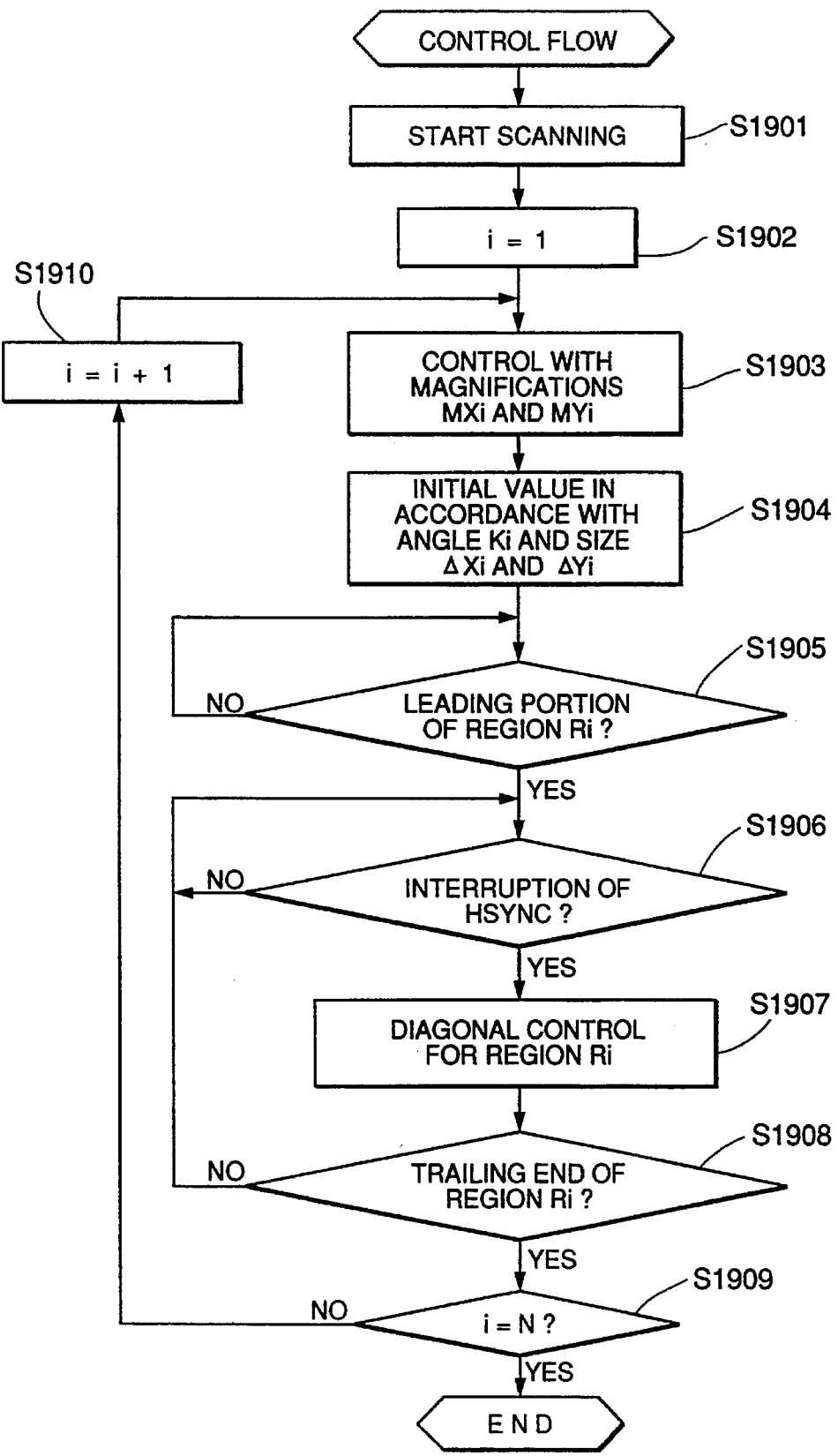
FIG. 25 is a flow chart which illustrates the diagonal process according to the fourth embodiment.

Next, the diagonal process according to this embodiment will be described with reference to a flow chart shown in FIG. 25. Since the diagonal control has been already described, only the characteristics of this embodiment will now be described.

When scanning is commenced in step S1901, area i on the RAM 213 to serve as the counter for counting the number of regions, which must be diagonal-processed, is set to "1" in step S1902. In step S1903, relative hardware is controlled to perform the main scan and the sub-scan for the region Ri at the magnifications MXi and MYi. The sub-scanning magnification can be programmably controlled by the CPU 212 by using, for example, a stepping motor.

In step S1904, the parameters relating to the inclination is determined by using the angle of inclination (Ki), the region sizes ΔXi and ΔYi for the region Ri to set the parameters to a predetermined latch or a register. Although omitted from the flow chart, information about the coordinates of the region position is also used. In next step S1905, a confirmation is made that the scan reaches the leading portion of the region Ri. In step S1906, the interruption of the HSYNC signal is waited for.

If the interruption of the HSYNC signal is made, the flow proceeds to step S1907 in which the diagonal process for the region Ri is performed. In step S1908, an examination is made as to whether or not the scan has reached the trailing end of the region Ri. If a discrimination is made that the scan has not reached the trailing end of the region Ri, the flow returns to step S1906. If the scan has reached the trailing end of the region Ri, the flow proceeds to step S1909 in which whether or not all of the regions have been processed is examined. If there is an unprocessed region, the flow proceeds to step S1910 in which i is increased by one, followed by processing the next region. If a discrimination is made that all of the regions have been processed, the process is completed here.

Therefore, according to this embodiment, even if a plurality of images are present dispersed in the original document, the images can individually be subjected to the diagonal process. As a result, the paper sheet can be effectively used to output a diagonal copy without image missing.

Although the mono-color copy has been described hereinbefore, color copy can be obtained by repeating the foregoing scan for a required number of colors to be developed for one image. This fact applies to the first to third embodiments.

FIFTH EMBODIMENT (FIGS. 26 TO 38)

Figure 26:
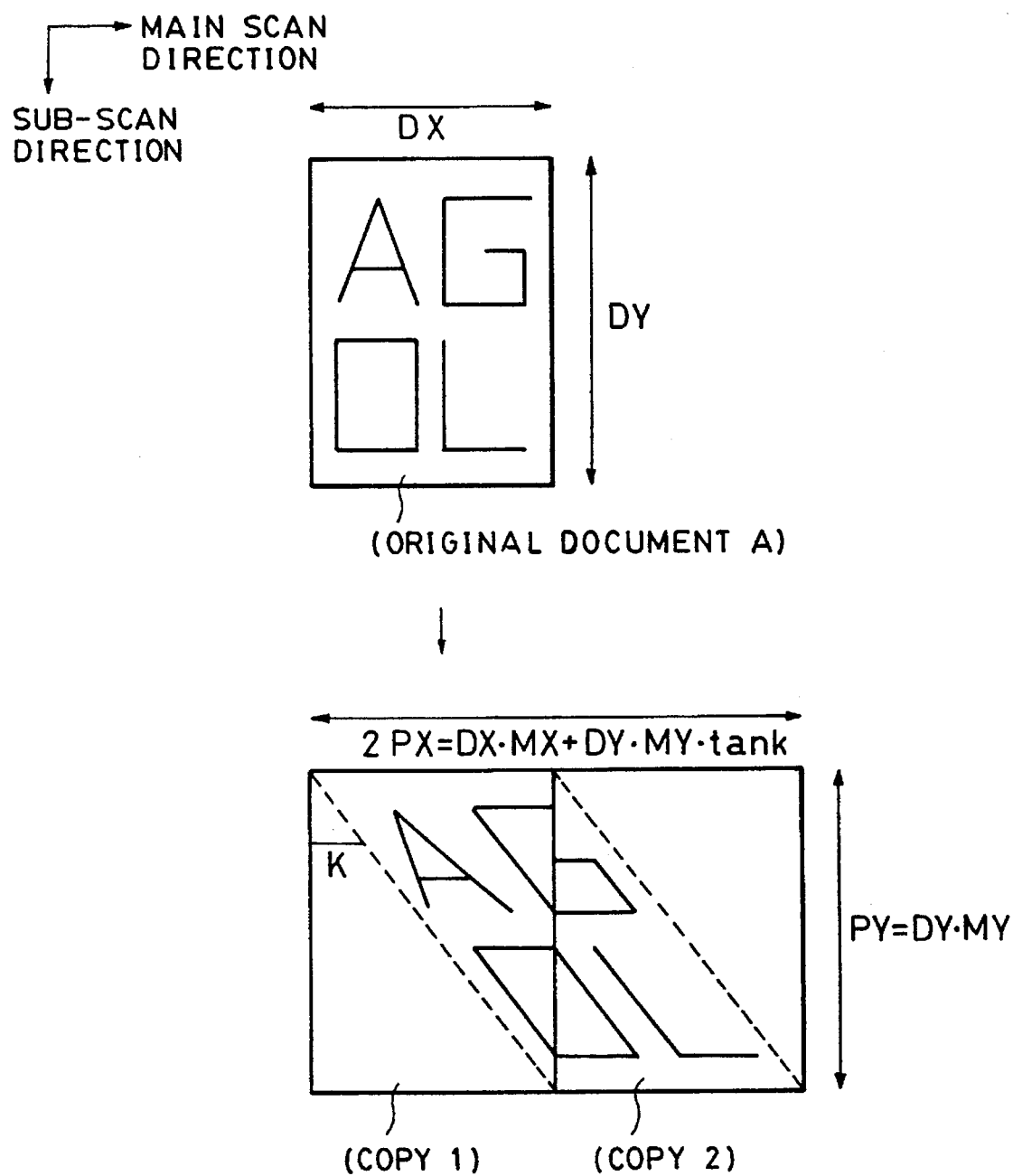
FIG. 26 illustrates the outline of the diagonal process according to a fifth embodiment.

FIG. 26 illustrates a copy output according to this embodiment.

The conventional diagonal copying technology enables only one copy (Copy 1) to be obtained as the diagonal copy of the original document A shown in FIG. 26. This embodiment automatically outputs two copies (Copy 1) and (Copy 2). Assuming that the size of the original document is DX (in the main scanning direction) and DY (in the sub-scanning direction), the magnification is MX (in the main scanning direction) and MY (in the sub-scanning direction), the paper sheet size is PX (in the main scanning direction) and PY (in the sub-scanning direction), and the inclination angle is (K), relationships PY=DY·MY and 2·PX=DX·MX+DY·MY·tan (K) are met (hereinafter appendix X denotes the main scanning direction and Y denotes the sub-scanning direction). However, the margin required in the periphery of the paper sheet and the tab for sticking for bonding the copying paper sheets are not considered in the case shown in FIG. 26.

Figure 27A:
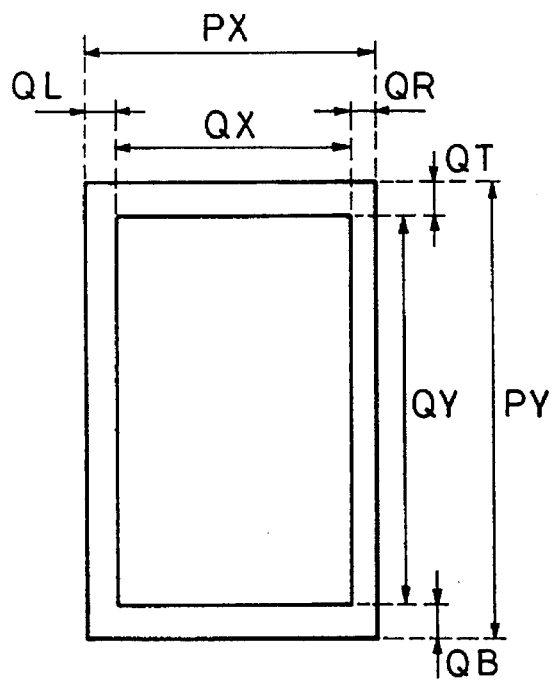
FIGS. 27(a) and 27(b) illustrate the relationship between an output paper sheet and an effective output region according to the fifth embodiment.
Figure 27B:
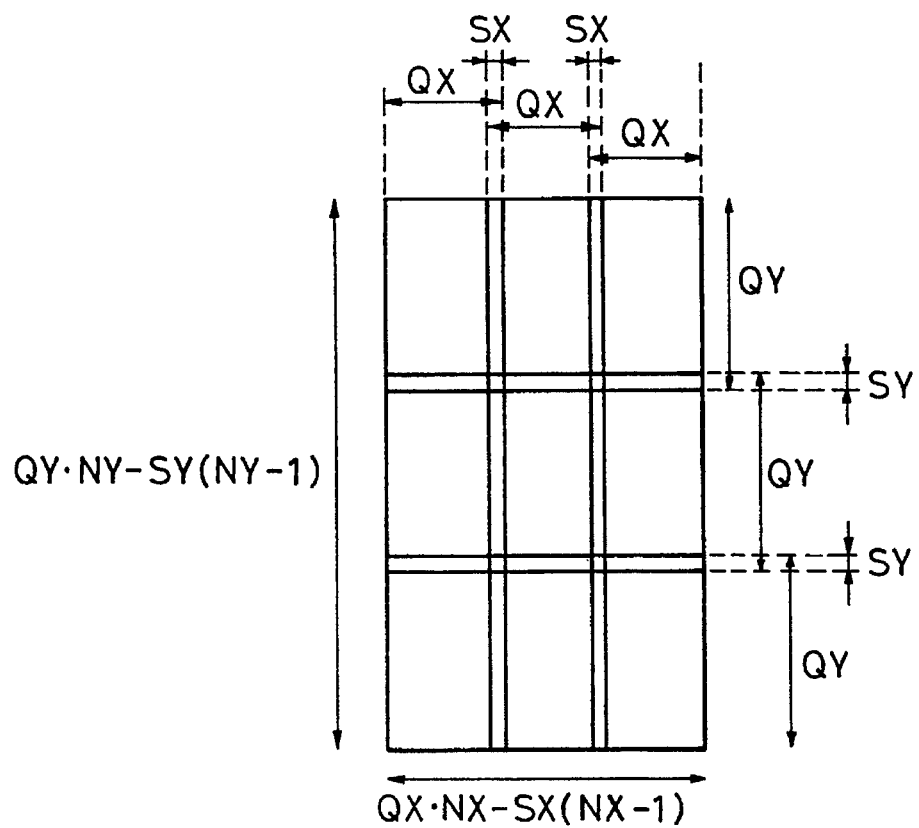

Conditions for outputting the copy while taking the foregoing margin required in the periphery of the paper sheet and the like into consideration are shown in FIG. 27. Assuming that the leading and trailing ends in the main scanning direction of the paper sheet respectively are QR and QL, and the leading and the trailing ends in the sub-scanning direction of the same respectively are QT and QB as shown in FIG. 27(a), the sizes (QX and QY) of the effective printing region of one paper sheet respectively are QX=PX−QL−QR and QY=PY−QT−QB. Assuming that the sticking tabs are SX and SY, the size of the overall effective printing region in the case where NX paper sheets are bonded in the main scanning direction and NY sheets are bonded in the sub-scanning direction as shown in FIG. 27B are QX·NX−SX·(NX−1) in the main scanning direction and QY·NY−SY·(NY−1) in the sub-scanning direction.

Figure 28A:
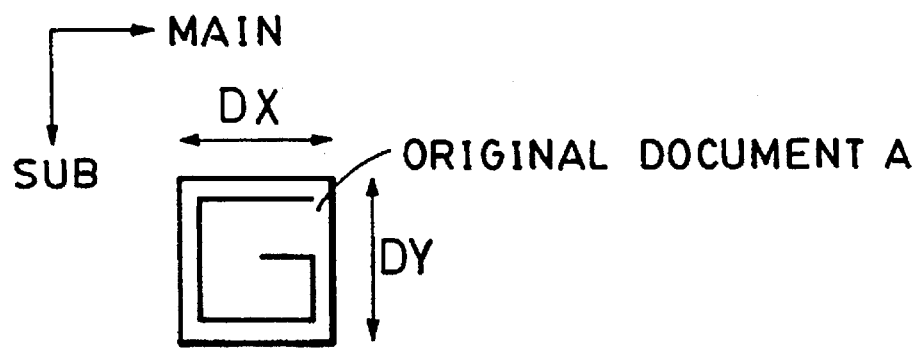
FIGS. 28(a) and 28(b) illustrate the relationship between an image of an original document and an enlarged image according to the fifth embodiment.
Figure 28B:
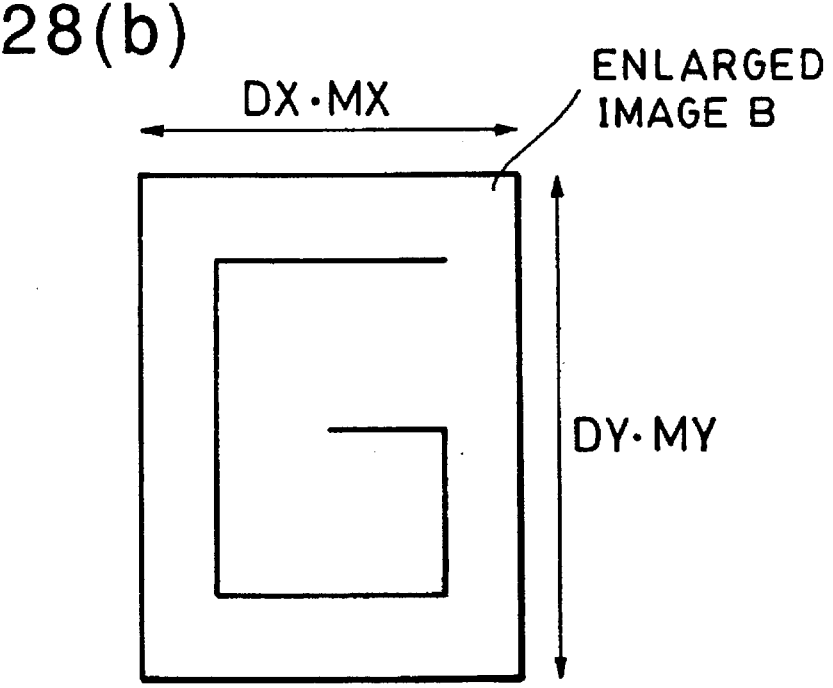
Figure 29:
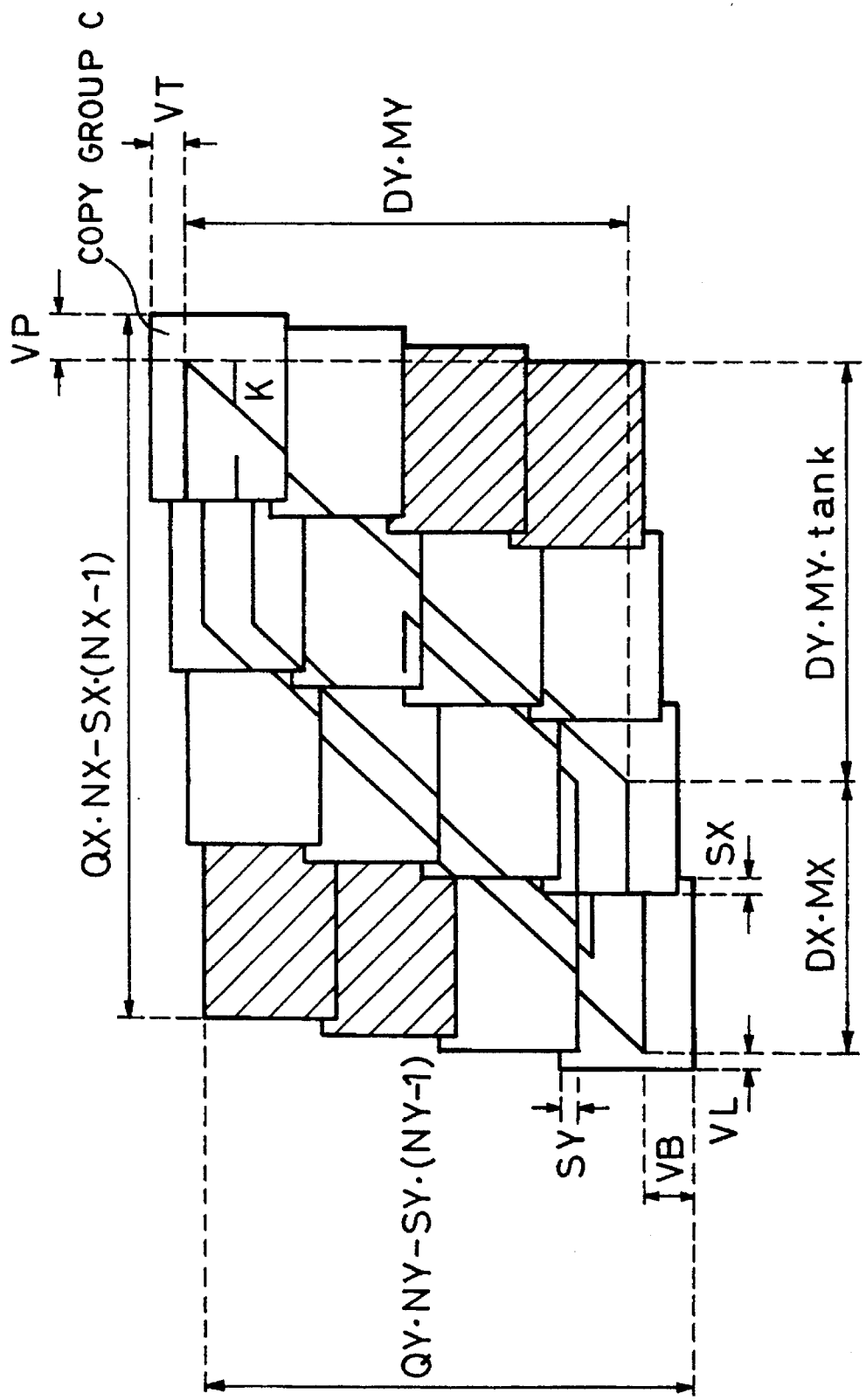
FIG. 29 illustrates a state where enlarged diagonal images to be outputted to a plurality of output paper sheets according to the fifth embodiment.

The foregoing concept is generalized as shown in FIGS. 28 and 29.

Referring to FIGS. 28 and 29, inclination of an image B (see FIG. 28(b)) formed by enlarging an original document A (see FIG. 28(a)) having size of DX×DY at magnifications MX and MY is inclined to have an angle (K) results in a copy group C (see FIG. 29). As can be seen from FIG. 29, no image is printed on the paper sheet classified by giving diagonal line, resulting in no necessity of output. Assuming that the number of the paper sheets in the main scanning direction including the foregoing paper sheet is NX and that in the sub-scanning direction is NY, the relationship between the paper sheets and the image can be defined as follows.

$$NX \cdot QX - (NX-1) \cdot SX = DX \cdot MX + DY \cdot MY \cdot \tan(K) + VL + VR$$

$$NY \cdot QY - (NY-1) \cdot SY = DY \cdot MY + VT + VB$$

If the size of the paper sheet and the tab for sticking are previously specified, NX and NY respectively are obtained as minimum integers which respectively meet $NX \geq (DX \cdot MX + DY \cdot MY \cdot \tan K - SX)/(QX - SX)$ and $NY \geq (DY \cdot MY - SY)/(QY - SY)$.

If the tab for sticking is automatically set, the allowable lower limits of SX and SY respectively are made to be SXmin and SYmin to obtain NX and NY which are minimum integers that meet $NX \geq (DX \cdot MX + DY \cdot MY \cdot \tan(K) - SXmin)/(QX - SXmin)$ and $NY \geq (DY \cdot MY - SYmin)/(QY - SYmin)$. Then, SY and SY are obtained from $SX = (NX \cdot QX - DX \cdot MX - DY \cdot MY \cdot \tan(K))/(NX-1)$ and $SY = (NY \cdot QY - DY \cdot MY)/(NY-1)$. If the tab for sticking is not required always, it is necessary to make SXmin=0 and SYmin=0. By using the determined NX, NY, SX and SY, VL+VR and VT+VB can be calculated.

Figure 30:
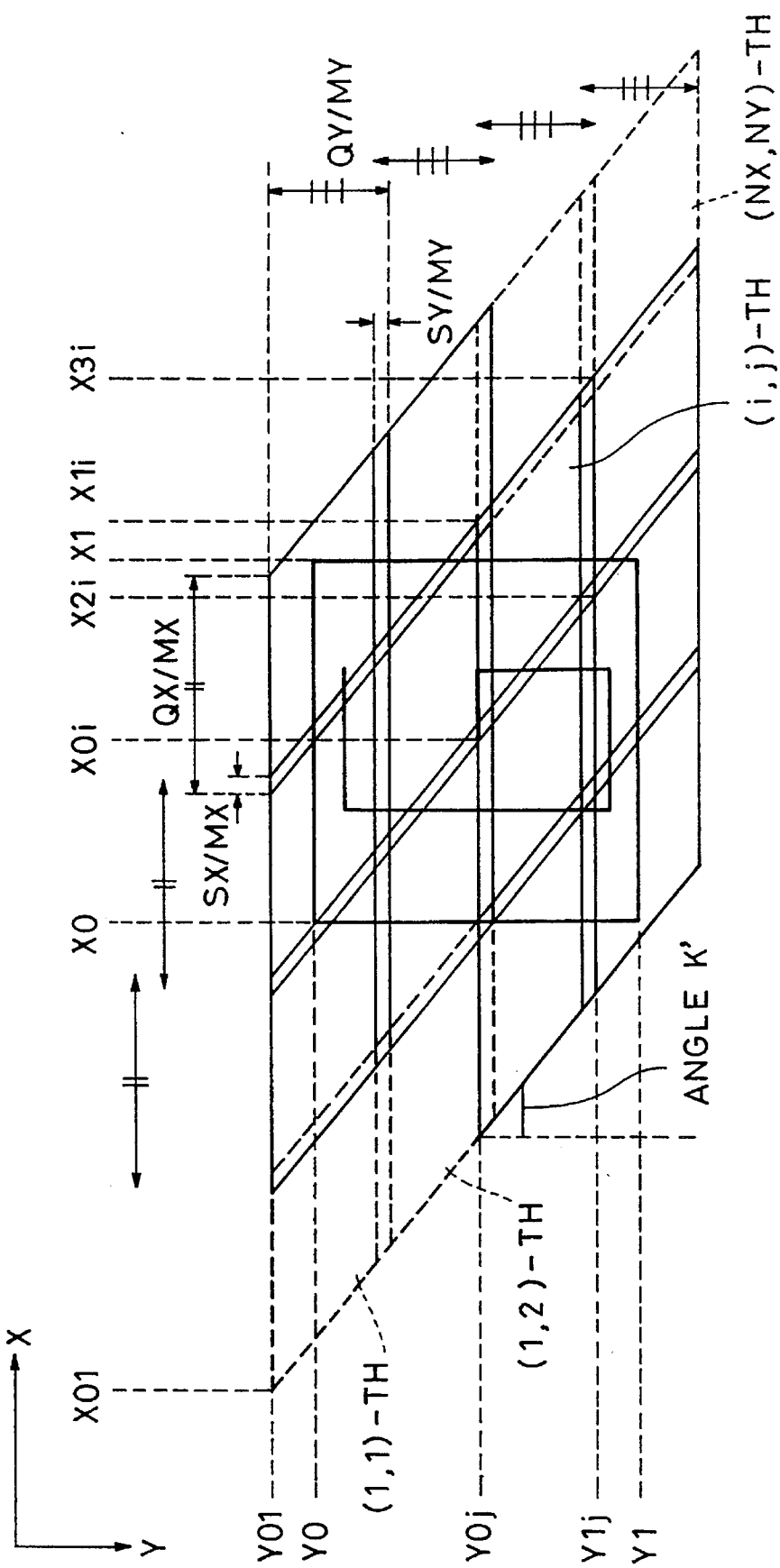
FIG. 30 illustrates a state where an image of an original document is divided when the inclination angle (K) is positive according to the fifth embodiment.
Figure 31A:
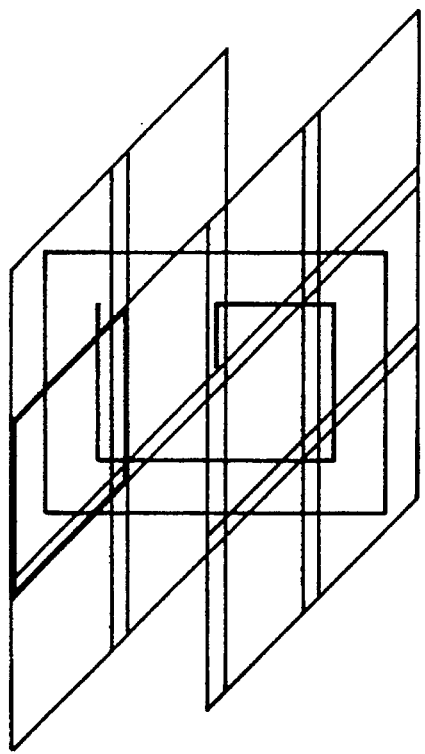
FIGS. 31(a), 31(b), 31(c) and 31(d) illustrate a magnification variation and diagonal copy divided into parallelogram regions according to the fifth embodiment.
Figure 31B:
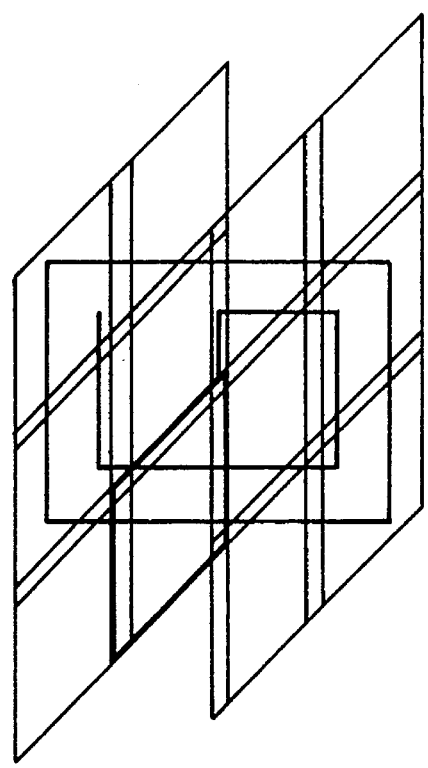
Figure 31C:
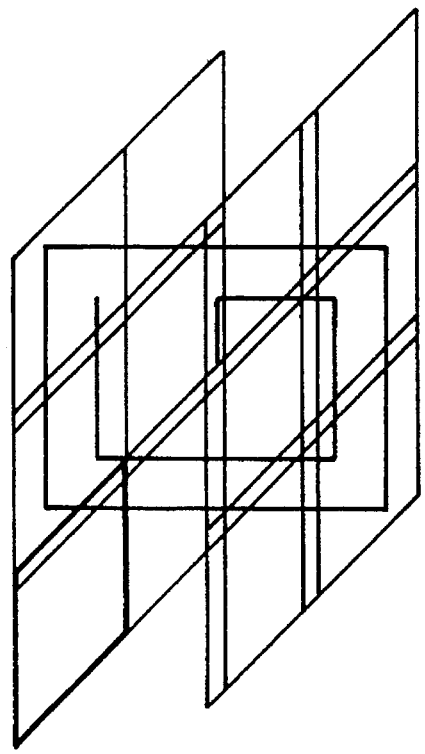
Figure 31D:
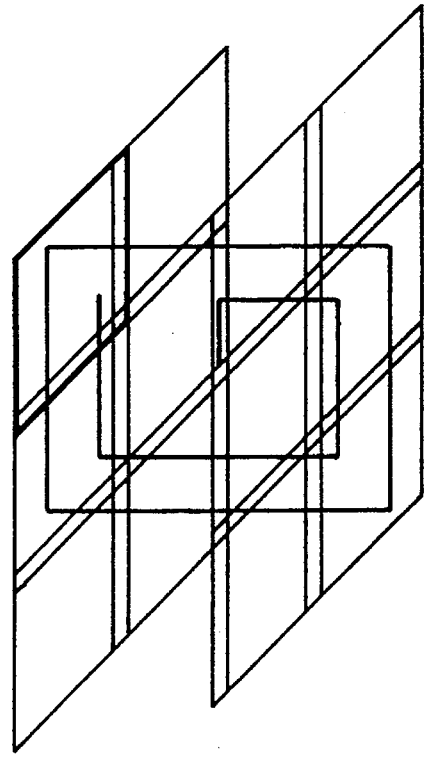
Figure 32B:
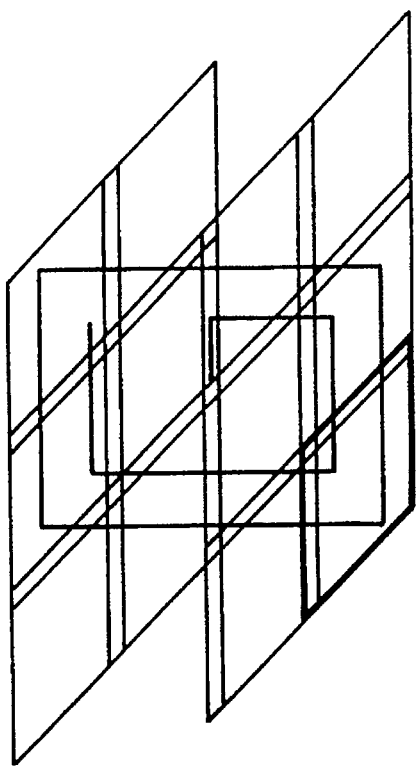
FIGS. 32(a), 32(b), 32(c) and 32(d) illustrate a magnification variation and diagonal copy divided into parallelogram regions according to the fifth embodiment.
Figure 32D:
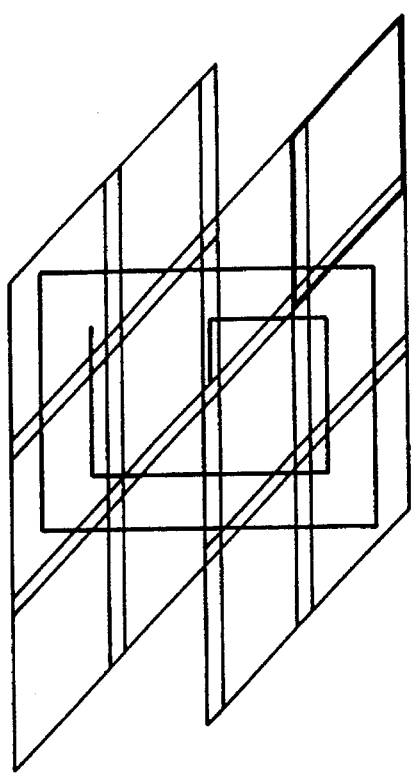
Figure 32A:
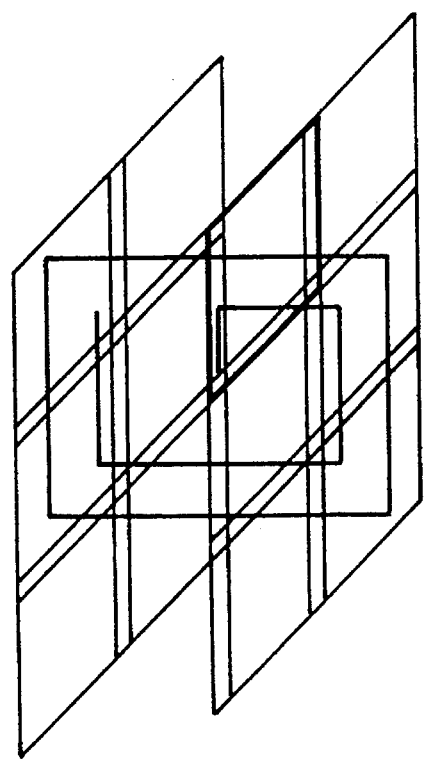
Figure 32C:
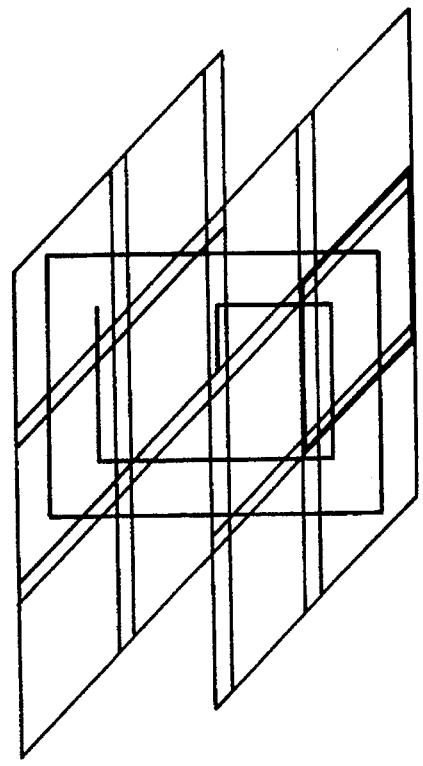

FIG. 30 illustrates a state of division of the original document image A for outputting the copy group C (see FIG. 29). The fact that a diagonal image, the magnification of which is varied at the magnifications MX and MY and which is inclined at the angle (K), is divided by a rectangle having the size QX×QY means a division of the same by a parallelogram which is inclined (minimum K') in an opposite direction to that of the diagonal image, and the base and the height of which are QX/MX and QY/MY. Where K' meets tan (K')=tan (K)·(MY/MX). It will now be described with reference to FIG. 34. If the tab for sticking in the output is SX and SY, the width of overlap of the foregoing parallelogram is SX/MX and SY/MY. As described above, the magnification of the original document image divided by the parallelogram region is sequentially changed as shown in FIGS. 31(a) to 31(d) and FIGS. 32(a) to 32(d) to form a diagonal copy, in which the process between FIG. 31(d) and FIG. 32(a) is omitted.

Assuming that the coordinates for defining the position of the original document image are (X0, Y0) and (X1, Y1) and the coordinates for defining the (i, j)-th parallelogram region are (X0i, Y0j) and (X1i, Y0j) and (X2i, Y1j) and (X3i, Y1j) with reference to FIG. 30, the coordinates (X01, Y01) defining the (1, 1)-the parallelogram and nearest the origin is as follows:

X01=X0−DY·tan (K')−VL/MX−(VT/MY)·tan (K'),
Y01=Y0−VT/MY where VR and VT are values described with reference to FIG. 29.

If VT=VR=0,
X01=X0−DY·tan (K'),
Y01=Y0

Therefore, if (X01, Y01) are determined, each coordinate value is as follows:
X0i=X01+(QX−SX)·(i−1)/MX+(QY−SY)·(j−1)·tan (K')/MY,
X1i=X0i+QX/MX,
X2i=X0i+(QY/MY)·tan (K'),
X3i=X2i+QX/MX,
Y0j=Y01+(QY−SY)·(j−1)/MY,
Y1j=Y0j+QY/MY Therefore, all of the parallelogram regions can be determined as a result of the foregoing calculations.

As described above, the regions expressed by (1, 1), (1, 2), (NX, NY−1), (NX, NY) shown in FIG. 30 do not overlap the original document image region, the output does not need to be performed. The necessity of the output of the (i, j)-th region is discriminated as follows: if the maximum value X3i (the right end of the drawing of the main scanning coordinates of the parallelogram is more left than the left end X0, that is, X3i≧X0, the output does not need to be performed. If the minimum value X0i (the left end of the drawing of the main scanning coordinates of the parallelogram is more left than the right end X1, that is, X0$i$≦X1, the output does not need to be performed.

Figure 33:
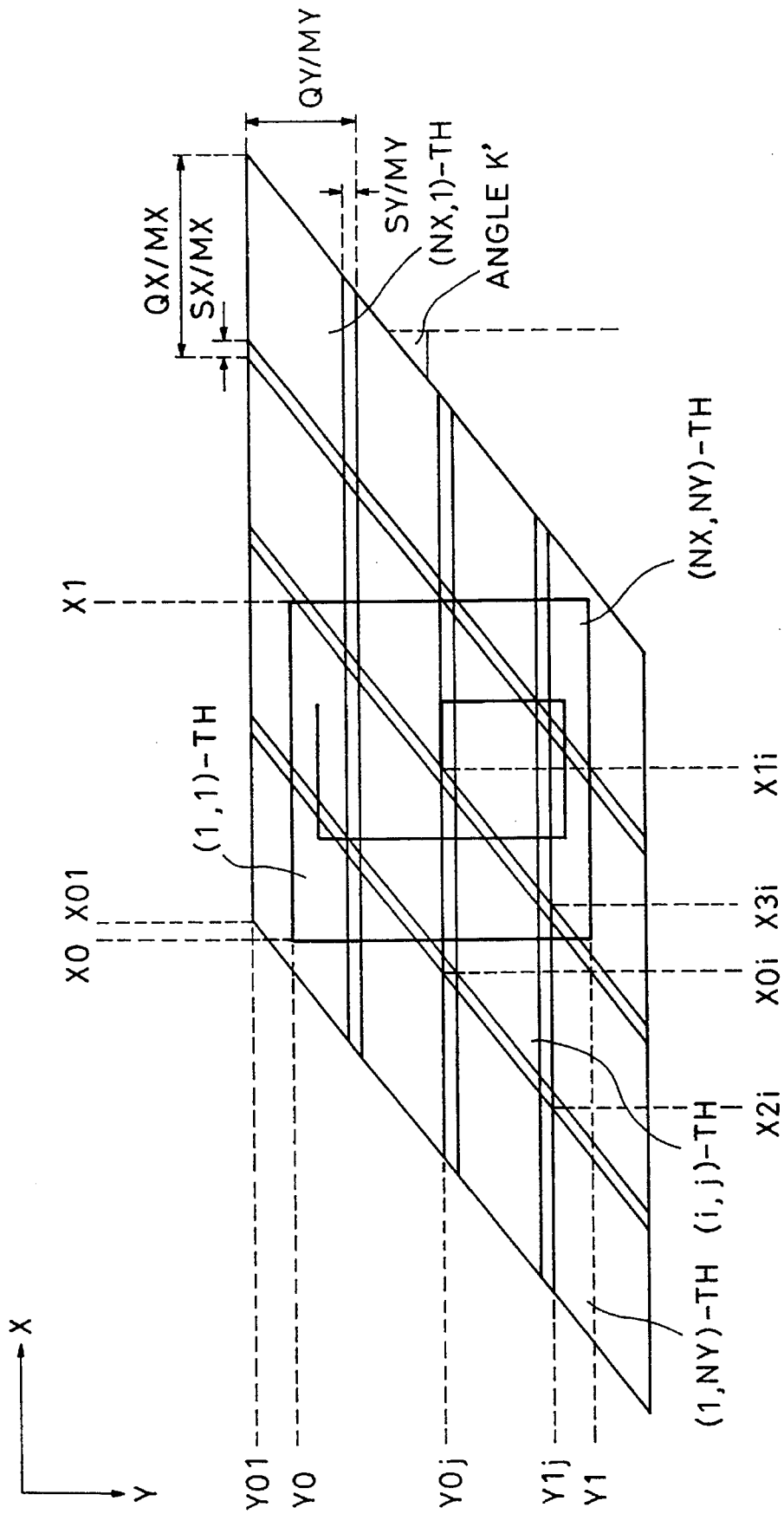
FIG. 33 illustrates a state where an image of an original document is divided when the inclination angle (K) is positive according to the fifth embodiment.

FIG. 33 illustrates the relationship between the original document image and the divided region in the case where the inclination direction opposes the direction shown in FIG. 30, where angle K' is so defined that the direction shown in FIG. 30 is plus and that shown in FIG. 33 is minus. Each of the coordinates is defined as follows:

X01=X0−(VL/MX)−(VT/MY)·tan (K'),
Y01=Y0−VT/MY,
X0$i$=X01+(QX−SX)·(i−1)/MX+(QY−SY)·(j−1)·tan (K')/MY
X1$i$=X0$i$+QX/MX,
X2$i$=X0$i$+(QY/MY)·tan (K'),
X3$i$=X2$i$+QX/MX,
Y0$j$=Y01+(QY−SY)·(j−1)/MY,
Y1=Y0$j$+QY/MY The region (i, j) that meets X1$i$≦X0 or X2$i$≧X1 does not need to be copied.

Then, the angle (K') will now be described with reference to FIGS. 34 and 35.

Figure 34A:
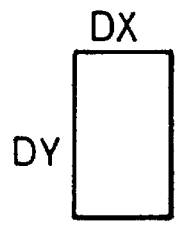
FIGS. 34(a), 34(b) and 34(c) illustrate an angle (K) of inclination according to the fifth embodiment.
Figure 34B:
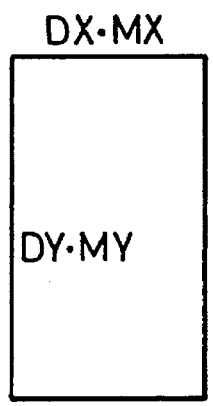
Figure 34C:
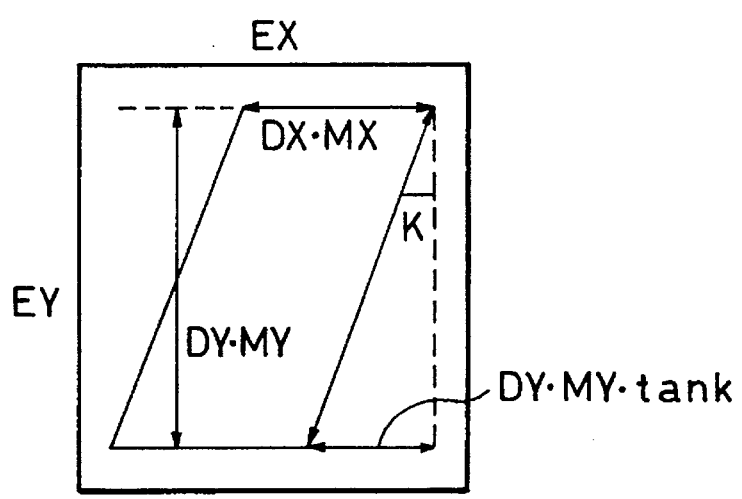
Figure 35A:
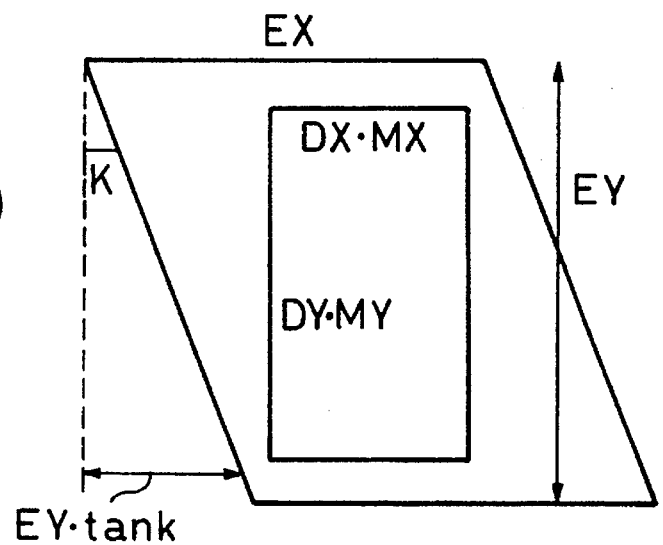
FIGS. 35(a) and 35(b) illustrate an angle (K) of inclination according to the fifth embodiment.
Figure 35B:
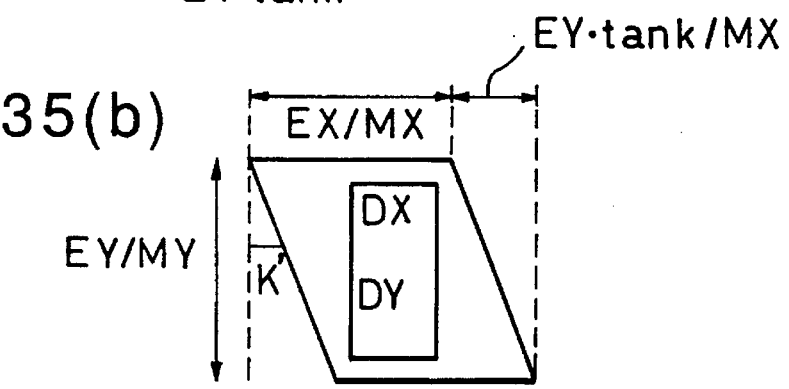

The magnification of an original document image the size of which is DX×DY shown in FIG. 34(a) is varied at magnifications MX and MY to generate an enlarged image shown in FIG. 34(b), followed by a conversion to a diagonal image multiplied by the angle (K). As shown in FIG. 34(c), the size of a rectangle including the foregoing diagonal image is assumed to be EX and EY. If the diagonal image shown in FIG. 34(c) is restored to the original while maintaining its magnification, a form shown in FIG. 35(a) is resulted. If the magnification of the image shown in FIG. 35(a) is as well as restored, a form shown in FIG. 35(b) is realized. As can be understood from FIGS. 34 and 35, the inclination angle (K') shown in FIG. 35(b) is tan (K')= (EY·tan (K)/MX)/(EY/MY), that is, tan (K')=tan (K)·(MY/MX).

The sub-scan performed by the optical system of the apparatus will now be described. The description will be made while making an assumption that NX·NY parallelograms divided to be read are sequentially full-color copied in the following sequential order: (1, 1), (2, 1), . . . , (NX, 1), (1, 2), . . . , (NX, 2) , . .., (1, NY), . .., (NX, NY).

The optical system stopped at the HP (Home Position) is previously moved forward to a position L1 more adjacent to the parallelogram region (1, 1), that is, a position (Y01−L1). Then, accelerated forward movement F1 is performed from position (Y01−L1) to position Y01. That is, L1 is the distance required for the optical system to be accelerated to a speed at which it performs the scan at sub-scanning magnification ML. A uniform speed forward scan M for magenta copy of the region (1, 1) is performed from position Y01 to position Y11.

Then, decelerated forward movement F2 is performed at position Y11 to reach position (Y11+L2). That is, L2 is the distance required to stop from the speed that realizes desired sub-scanning magnification MY. After the stop at the position (Y11+L2), returning movement R1 to the position (Y01−L1) is again performed, followed by performing acceleration F1, the deceleration F2 and the returning movement R1 to scan C the region (1, 1) for cyan copy, scan Y for yellow copy and scan Bk for black copy.

After the region (1, 1) has been scanned, regions (2, 1), . . . , (NX, 1) are copied. After a black copy of the region (NX, 1) has been made, the returning movement R2 for scanning the region (1, 2) is performed from position (Y11+L2) to position (Y02−L1). Then, a black copy of the region (NX, NY) is made by a similar procedure, followed by performing the returning movement R3 to the HP and the operation is completed.

Although a case where each region is subjected to one full-color copy is made in this embodiment, a plurality of copies or a mono-color copy can be made by scanning each region for a required number of copies or required number of colors. Furthermore, scanning of the region that does not include the original document image may be skipped.

Figure 37:
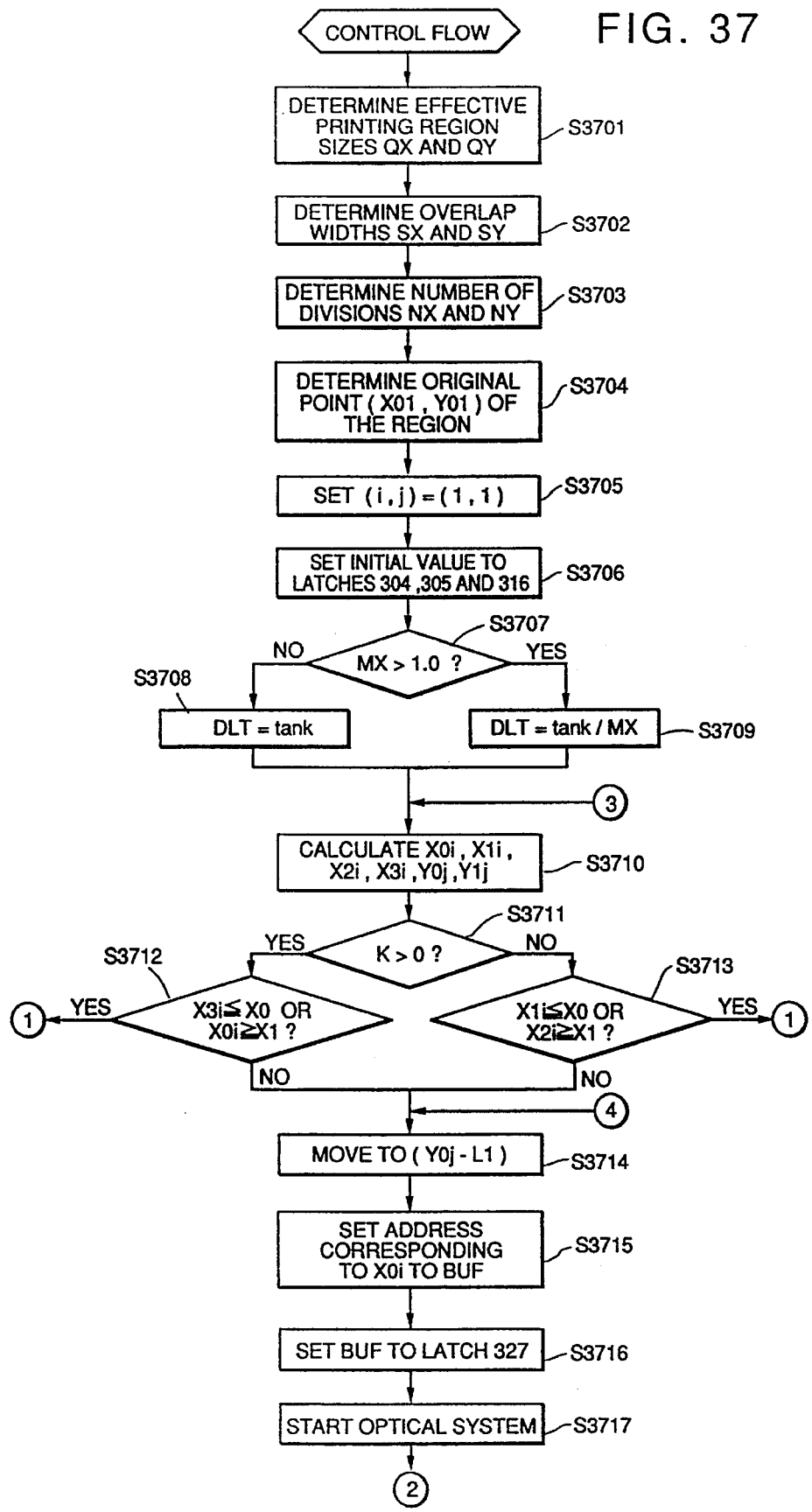
FIG. 37 is a flow chart which illustrates the diagonal process according to the fifth embodiment.
Figure 38:
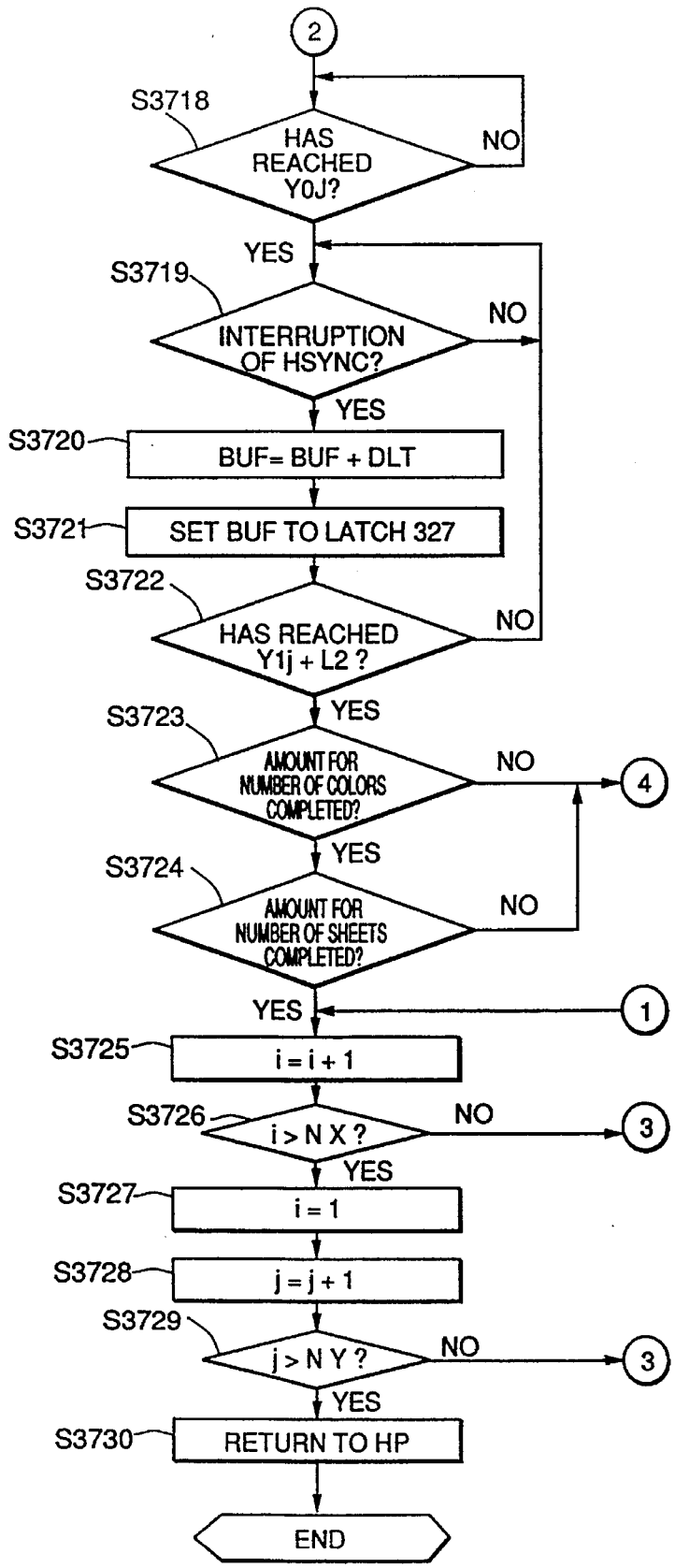
FIG. 38 is a flow chart which illustrates the diagonal process according to the fifth embodiment.

A diagonal process according to this embodiment will now be described with reference to flow charts shown in FIGS. 37 and 38.

In step S3701, the size QX and QY of the effective printing region of the paper sheet are determined, the sticking tabs SX and SY are determined in step S3702, and the number of divisions NX and NY are determined in step S3703. In next step S3704, the origin (X01, Y01) of the parallelogram for dividing the original document is determined in accordance with the foregoing factors. In next step S3705, the counter (i, j) of the RAM 213 for counting the parallelogram region is initialized to (1, 1). In step S3706, initial values are set to the latches 304, 305 and 316 shown in FIGS. 3 and 4(b). The completion address of left margin QL in the main scanning direction of the paper sheet is set to the latch 304, while the start address of the right margin QR is set to the latch 305. As a result, the FRM signal is enabled for a region that corresponds to effective printing width QX.

In step S3707, an examination is made as to whether or not the main scanning magnification MX is enlargement magnification. If MX≦1.0 (equal magnification or contraction), tan (K) is set to the area DLT of the RAM 213 in step S3708. If MX>1.0 (enlargement), tan K/MX is set to the area DLT on the RAM 213 in step S3709. In next step S3710, the coordinate (X0$i$, Y0$j$), (X1$i$, Y0$j$), (X2$i$, Y1$j$) and (X3$i$, Y1$j$) for defining the parallelogram region are obtained in accordance with the value of the counter (i, j) and (X01, Y01) to store the result in a predetermined area on the RAM 213.

In step S3711, the sign of the angle (K) is examined. If K>0, the flow proceeds to step S3712 in which an examination is performed whether or not X3$i$≦X0 or X0$i$ ≧X1 is met. If K≦0, the flow proceeds to step S3713 in which an examination is performed whether or not X1$i$≦X0 or X2$i$≧X1 is met. If the foregoing conditions are met in steps S3712 and 3713, no image is present in the subject region, resulting in proceeding of the flow to step S3725 without performing the copy process. If the foregoing conditions are not met, the flow proceeds to step S3714 in which the optical system is moved to position (Y0$j$−L1). In step S3715, the address corresponding to the coordinate X0$i$ is set to the area BUF of the RAM 213. In step S3716, the contents of the BUF is set to the latch 327.

In step S3717, the movement of the optical system of the apparatus starts, followed by performing a confirmation performed in step S3718 whether or not the scan has reached the leading end Y0$j$ of the region. In step S3719, the interruption of the HSYNC signal is waited for. If the interruption of the HSYNC signal takes place, the flow proceeds to step S3720 in which the area BUF on the RAM 213 is added by only DLT. In next step S3721, the value of the BUF is set to the latch 313. Since the DLT is positive (or negative) when the angle (K) is positive (or negative), the contents of the BUF is increased whenever the interruption takes place. As a result, the image read from the shift memory 323 is changed forwards (or rearwards) in the main scanning direction. Since the FRM signal is fixed with respect to the HSYNC signal, the diagonal image on the paper sheet is inclined rearwards (or forwards) in the main scanning direction with proceeding of the sub-scan.

In step S3722, an examination is performed whether or not the optical system has reached the position (Y1j+L2). If the scan has not reached the position (Y1j+L2), the flow returns to step S3719. If the scan has reached the position (Y1j+L2), the flow process proceeds to step S3722.

In step S3723, an examination is performed whether or not the scan for the required number of colors has been completed. In step S3724, an examination is performed whether or not the scan for the required number of sheets has been completed. If the scan has not been completed, the flow returns to step S3714. If the scan has been completed, the flow proceeds to step S3725 in which the value of the counter (i, j) is changed by the processes of steps S3725 to S3729 to process the next region. If all of the required scanning operations have been completed, the flow proceeds to step S3730 in which the optical system is returned to the HP.

Therefore, according to this embodiment, a diagonal image which cannot be formed within one paper sheet is automatically divided into a plurality of paper sheets, followed by combining all of the copies, resulting in a copy output without missing image information to be obtained.

SIXTH EMBODIMENT (FIGS. 39 TO 51)

Figure 36:
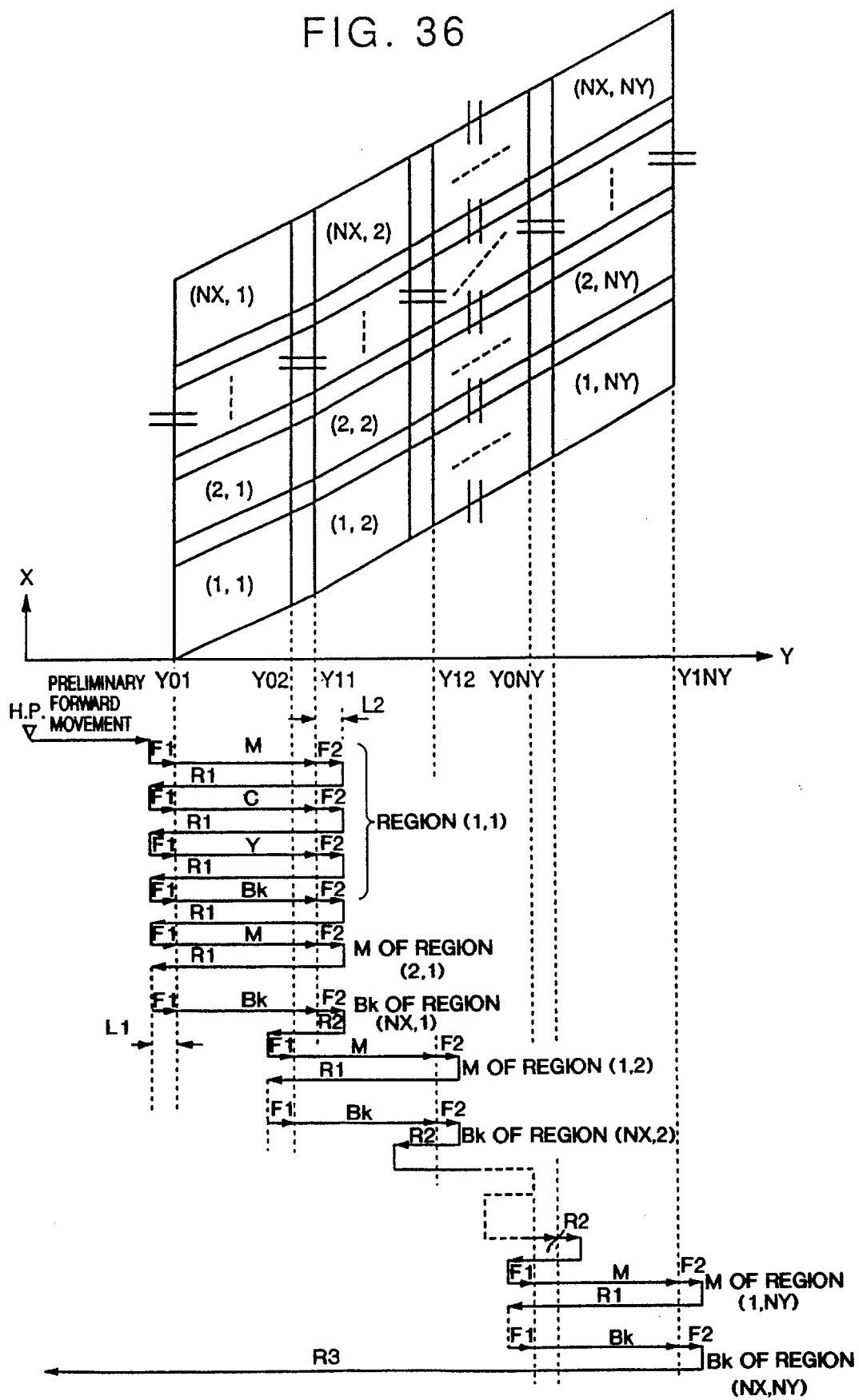
FIG. 36 illustrates the sequential order of sub-scan performed by an optical system of an apparatus according to the fifth embodiment.

The fifth embodiment has the arrangement that the FRM signal is not changed with respect to the HSYNC signal and the read start address from the shift memory 323 is changed (hereinafter the foregoing method is called the "method according to the fifth embodiment"). Since the counter 313 shown in FIG. 4(b) is reloaded in response to the HSYNC signal, the method according to the fifth embodiment requires all of the parallelogram regions for dividing the original document image to be present after the HSYNC signal in the main scanning direction. Also the sub-scan requires the scanning start portion must be in the rear of the home position as shown in FIG. 36.

The foregoing conditions cannot be sometimes met depending upon the position of the original document image. This embodiment performs control to deal with the forgoing state in such a manner that the read start address is fixed even if the parallelogram region is present in an imaginary space (in front of the HSYNC signal or the HP) to change the FRM signal (the foregoing method is called the "method according to the sixth embodiment" or "the method according to this embodiment").

The method according to this embodiment is the same as the control shown in FIG. 6.

Figure 39:
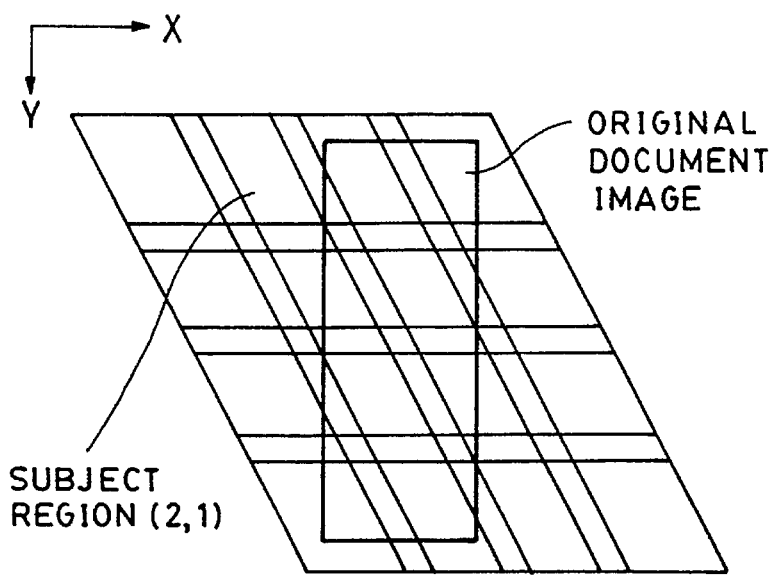
FIG. 39 illustrates the relationship between the image of the original document and the divided regions according to a sixth embodiment.
Figure 40A:
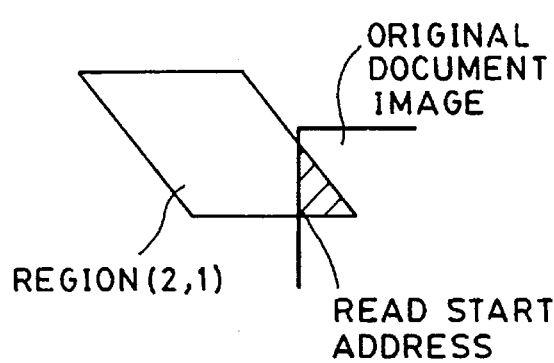
FIGS. 40(a), 40(b), 40(c) and 40(d) illustrate the relationship between an image of an original document and one divided region according to the sixth embodiment.
Figure 40B:
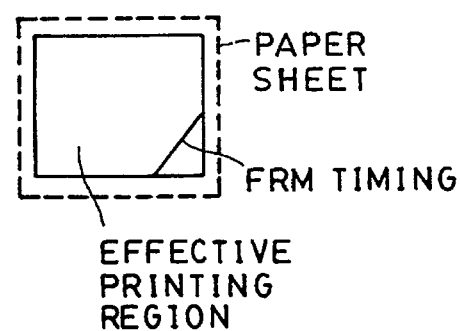
Figure 40C:
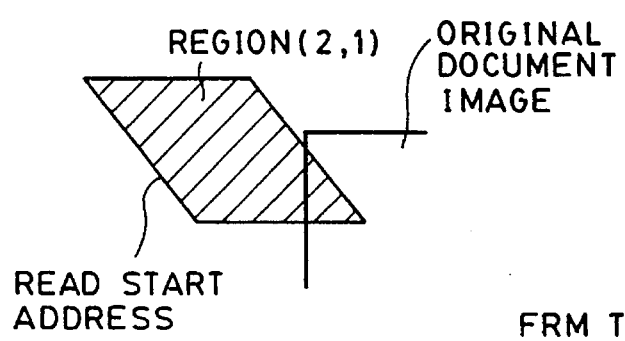
Figure 40D:
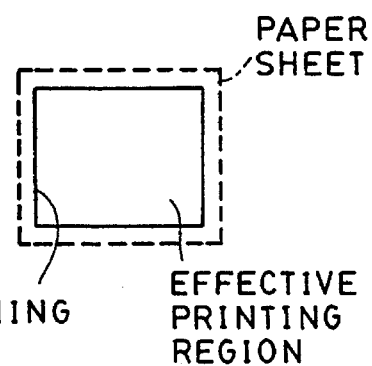

With reference to the region shown in FIG. 30, the difference between the method according to the fifth embodiment and that according to this embodiment will now be described specifically with reference to FIGS. 39 and 40. A case, where the (2, 1)-th region of the original document and the divided regions having the relationship shown in FIG. 39 is paid attention, is considered. If the method according to the fifth embodiment is employed, the read start address is changed along the leading edge of the main scan of the region is changed as shown in FIG. 40(c). Furthermore, the FRM signal is fixed to be positioned along the leading edge of the main scan of the effective printing region of the paper sheet as shown in FIG. 40(d). If the method according to this embodiment is employed, the read start address is fixed to the leading edge of the main scan of the original document image included in the region (2,1) as shown in FIG. 40(a). Furthermore, the FRM signal is so changed to be generated at the position at which the image corresponding to the read start address is reproduced as shown in FIG. 40(b).

FIG. 41 illustrates the read start address control for all of the regions shown in FIG. 30. Referring to FIG. 41, a dashed line shows a case where the read start address is changed by the method according to the fifth embodiment, and a continuous line shows a case where the read start address is fixed by the method according to this embodiment. Regions (4, 1), (4, 2), (3, 3), (2, 4) and (3, 4) are processed by the method according to the fifth embodiment, while regions (2, 1), (2, 2), (1, 3) and (1, 4) are processed by the method according to this embodiment. Regions (3, 1) and (2, 3) are processed by a method that is a mixture of the foregoing two methods. That is, the method is determined depending upon the hypotenuse of the parallelogram region adjacent to the leading end of the main scan and the positional relationship with the image.

A rule for selecting the method according to the fifth embodiment and that according to this embodiment will now be described with reference to FIGS. 42 and 43. An assumption is made here, as shown in FIG. 42(a), that coordinates of the positions of the original document image are (X0, Y0), (X1, Y0), (X1, Y1) and (X0, Y1). The (i, j)-th parallelogram region is defined by coordinates (X0$i$, Y0$j$), (X1$i$, Y0$j$), (X2$i$, Y1$j$) and (X3$i$, Y1$j$). The positional relationships between the image and the left hypotenuse of the parallelogram region realized when attention is paid to sub-scan region [Y0$j$, Y1$j$] are five cases (if the direction of the inclination of the diagonal image is considered, ten cases), such as (b1) of FIG. 42, (c1) of FIG. 42, (a1) of FIG. 43, (b1) of FIG. 43, and (c1) of FIG. 43. Next, the foregoing cases will be described.

Figure 42:
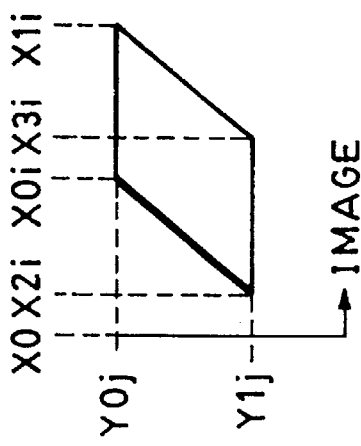
FIGS. 42(a1), 42(b1), 42(b2), 42(c1), 42(c2) illustrate the positional relationship between a subject image and parallelogram regions according to the sixth embodiment.
Figure 42:
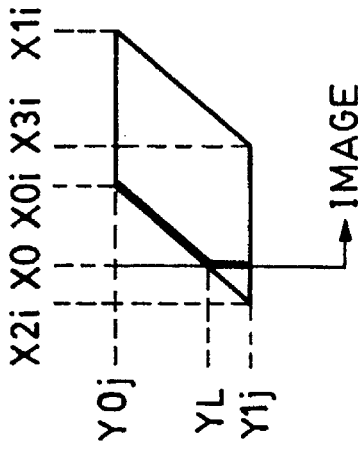
Figure 42:
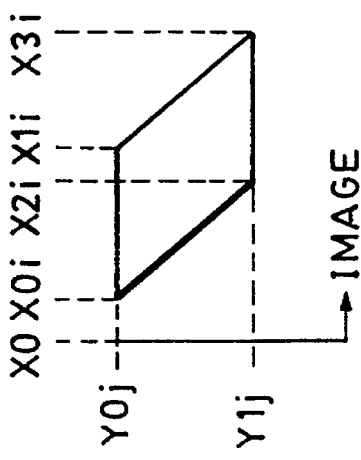
Figure 42:
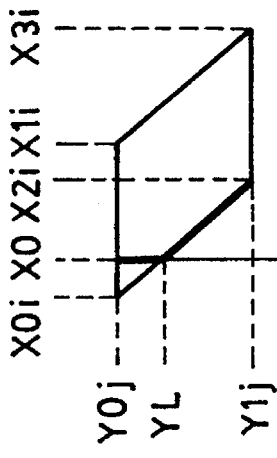
Figure 42A:
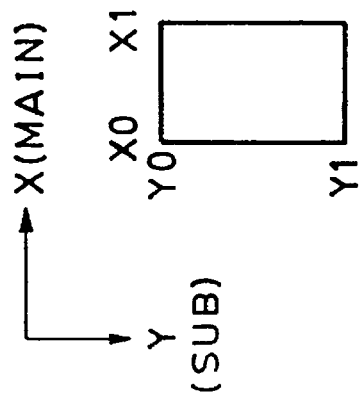

(1) (b1) of FIG. 42 and (b2) of FIG. 42 (type B) :

In this case the region is included in the image, in which X0≦X0$i$ ((b1) of FIG. 42) or X0≦X2$i$ ((b2) of FIG. 42) is met, and the method according to the fifth embodiment is applied to all of the regions from Y=Y0$j$ to Y=Y1$j$. A case of (b1) of FIG. 42 is called type B1, and a case of (b2) of FIG. 42 is called type B2.

(2) (c1) of FIG. 42 and (c2) of FIG. 42 (type C):

In this case the end of the image intersects the left hypotenuse. In the case of (c1) of FIG. 42, X0$i$<X0<min (X1$i$, X2$i$) is met, the method according to this embodiment is applied to a region from Y=Y0$j$, and the method according to the fifth embodiment is applied to a region from Y=YL. In the case of (c2) of FIG. 42, X2$i$<X0<min (X0$i$, X3$i$) is met, the method according to the fifth embodiment is applied to a region from Y=Y0$j$, and the method according to this embodiment is applied to a region from Y=YL. A case of (c1) of FIG. 42 is called type C1, and a case of (c2) of FIG. 42 is called type C2.

Figure 43:
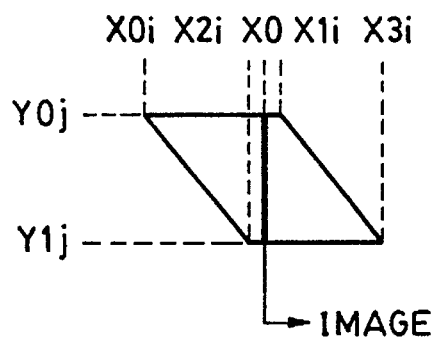
FIGS. 43(a1), 43(a2), 43(b1), 43(b 2), 43(c1) and 43(c2) illustrate the positional relationship between the subject image and the parallelogram regions according to the sixth embodiment.
Figure 43:
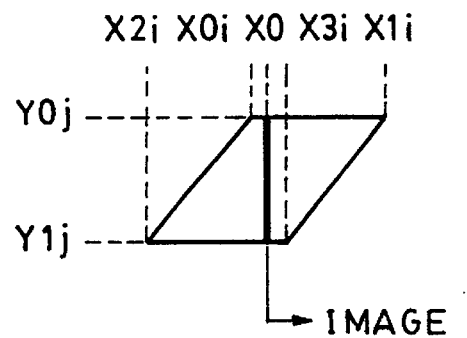
Figure 43:
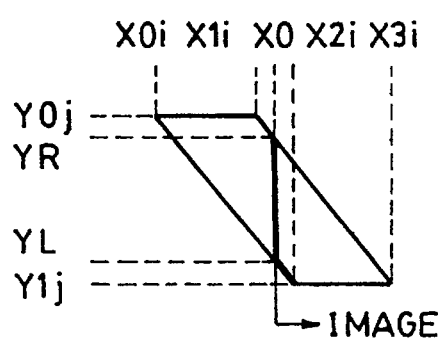
Figure 43:
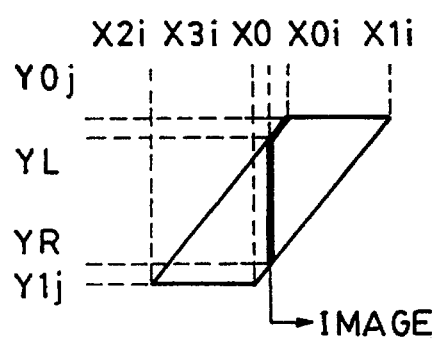
Figure 43:
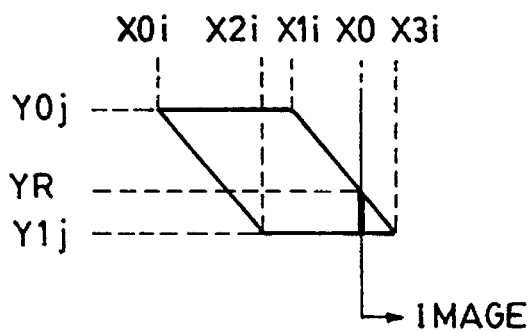
Figure 43:
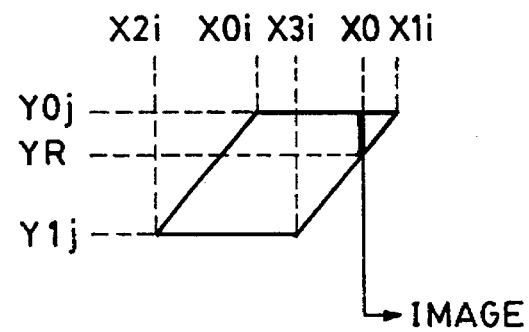

(3) (a1) of FIG. 43 and (a2) of FIG. 43 (type D):

In this case, the end of the image is present between the left hypotenuse and the right hypotenuse, X2$i$≦X0≦X1$i$ (a1) of FIG. 43) or X0$i$≦X0≦X3$i$ (a2) of FIG. 43) is met, and the method according to this embodiment is applied to all of the regions from Y=Y0$j$ to Y=Y1$j$. A case of (a1) of FIG. 43 is called type D1, and a case of (a2) of FIG. 43 is called type D2.

(4) (b1) of FIG. 43 and (b2) of FIG. 43 (type E):

In this case the shape of the region is different from that of the case (3), and therefore both of the left hypotenuse of the region and the right hypotenuse intersect the end of the image. In the case of (b1) of FIG. 43, X1$i$≦X0≦X2$i$ is met, the method according to this embodiment is applied to a region from Y=YR to Y=YL, and the method according to the fifth embodiment is applied to a region from Y=YL to Y=Y1j. In the case of (b2) of FIG. 43, X3i≦X0≦X0i is met, the method according to the fifth embodiment is applied to a region from Y=Y0j to Y=YL, and the method according to this embodiment is applied to a region from Y=YL to Y=YR. A case of (b1) of FIG. 43 is called type E1, and a case of (b2) of FIG. 43 is called type E2.

(5) (c1) of FIG. 43 and (c2) of FIG. 43 (type F):

In this case, the end of the image intersects the right hypotenuse. In the case of (C1) of FIG. 43, X1i≦X0≦X3i is met, the method according to this embodiment is applied to a region from Y=YR to Y=Y1j. In the case of (c2) of FIG. 43, X3i≦X0≦X1i is met, the method according to this embodiment is applied to a region from Y=Y0j to Y=YR. A case of (c1) of FIG. 43 is called type F1, and a case of (c2) of FIG. 43 is called type F2.

The coordinates of the left hypotenuse are defined as follows:
Y=aX+b,
a=(Y0j−Y1j)/(X0i−X2i),
b=(X0i·Y1j−X2i·Y0j)/(X0i−X2i)

The coordinates of the right hypotenuse are defined as follows:
Y=cX+d,
c=(Y0j−Y1j)/(X1i−X3i),
d=(X1i·Y1j−X3i·Y0j)/(X1i−X3i)

Therefore, the coordinates can be obtained by YL=a·X0+b and YR=c·X0+d. Accordingly, the region to which the method according to the fifth embodiment or the method according to this embodiment is applied, that is, the contents of the control of the read start address can be determined uniquely.

Next, the control of the FRM signal to be performed in accordance with the contents of the control of the read start address thus determined will now be described with reference to FIG. 44, the FRM signal corresponding to the contents of the control of the read start address. An assumption is made that the read start address at the sub-scanning position Yk of the parallelogram region 4401 is determined to be Xk.

Figure 44:
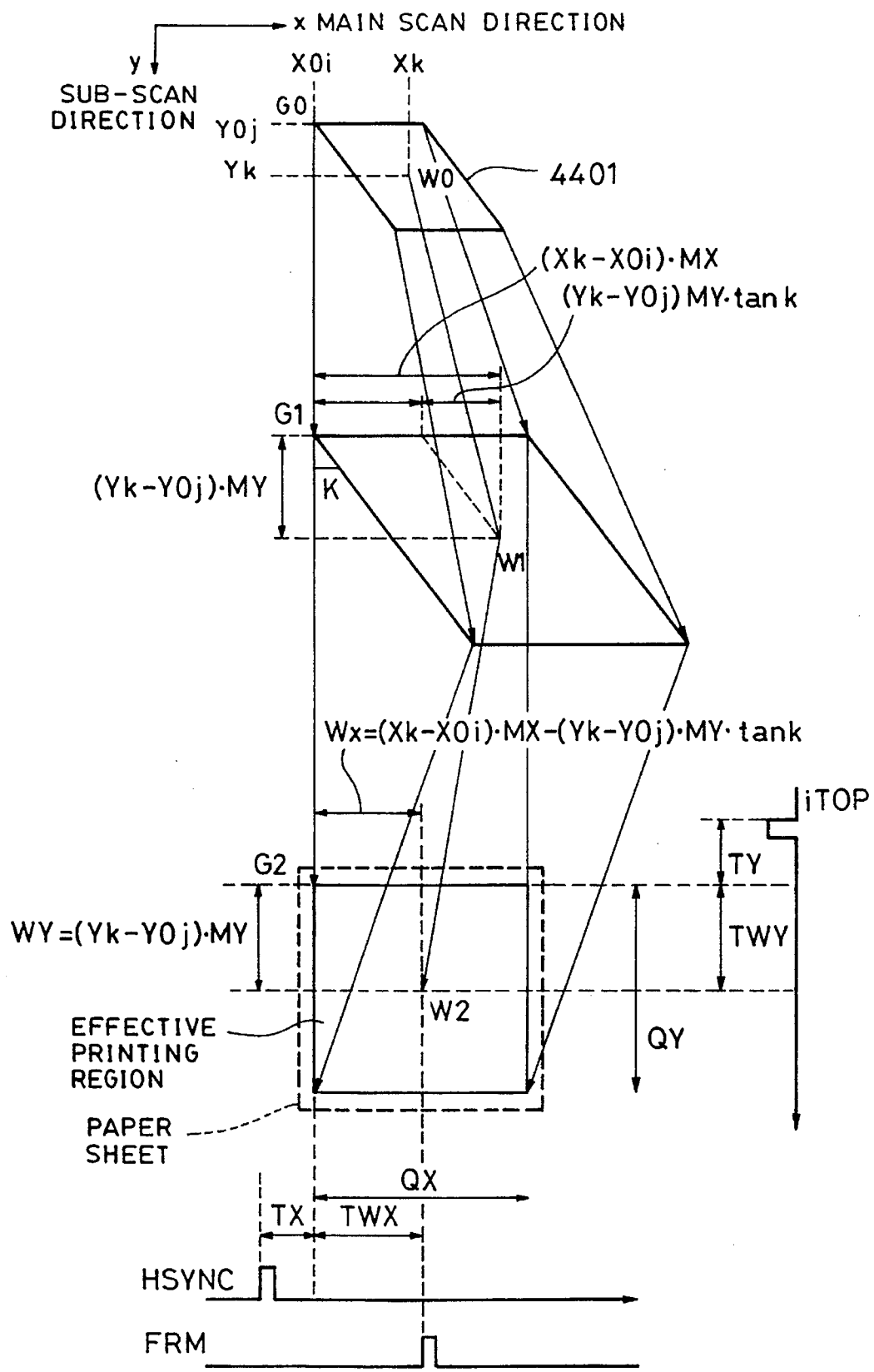
FIG. 44 illustrates control of an FRM signal according to the sixth embodiment.
Figure 45:
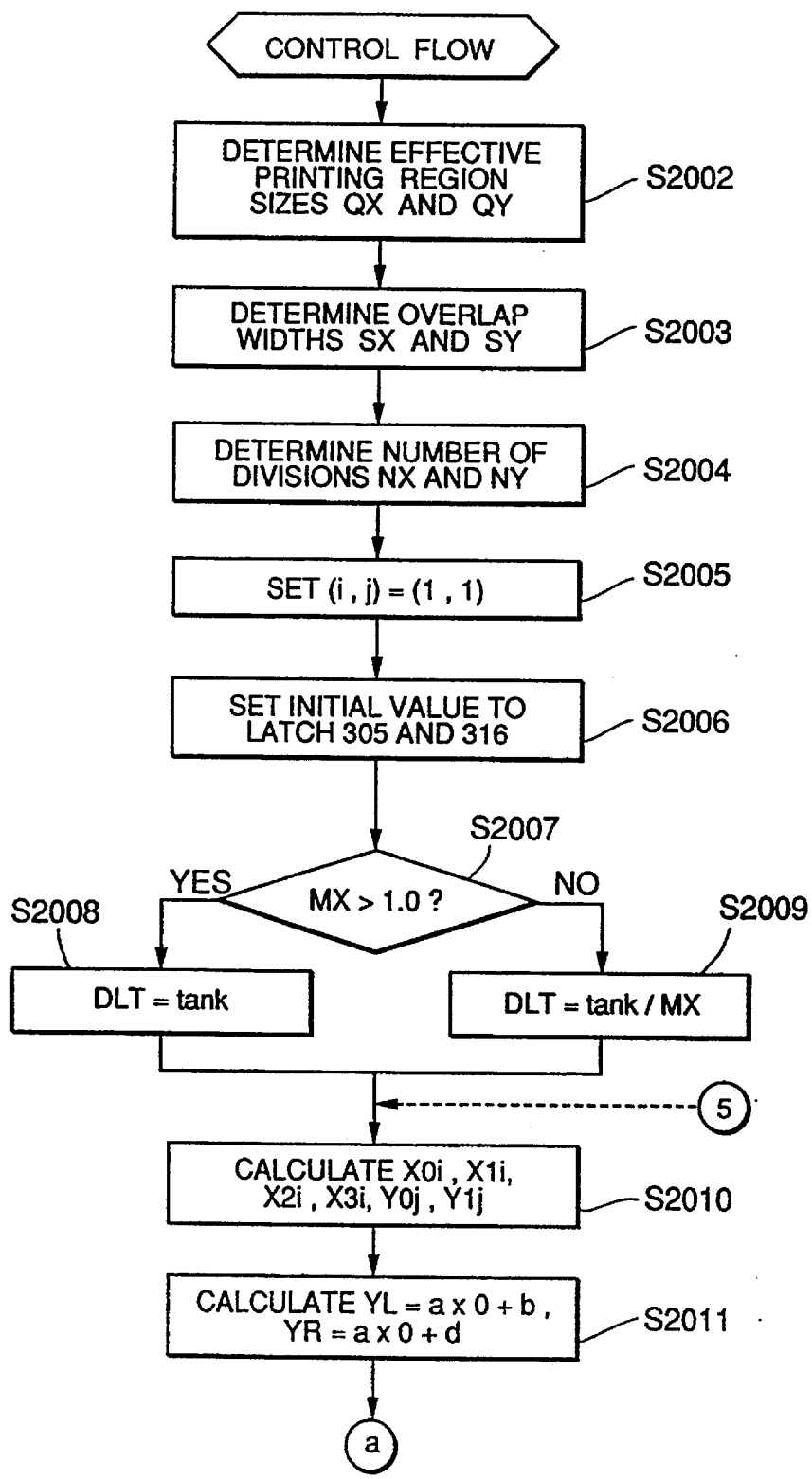
FIG. 45 is a flow chart which illustrates the diagonal process according to the sixth embodiment.
Figure 46:
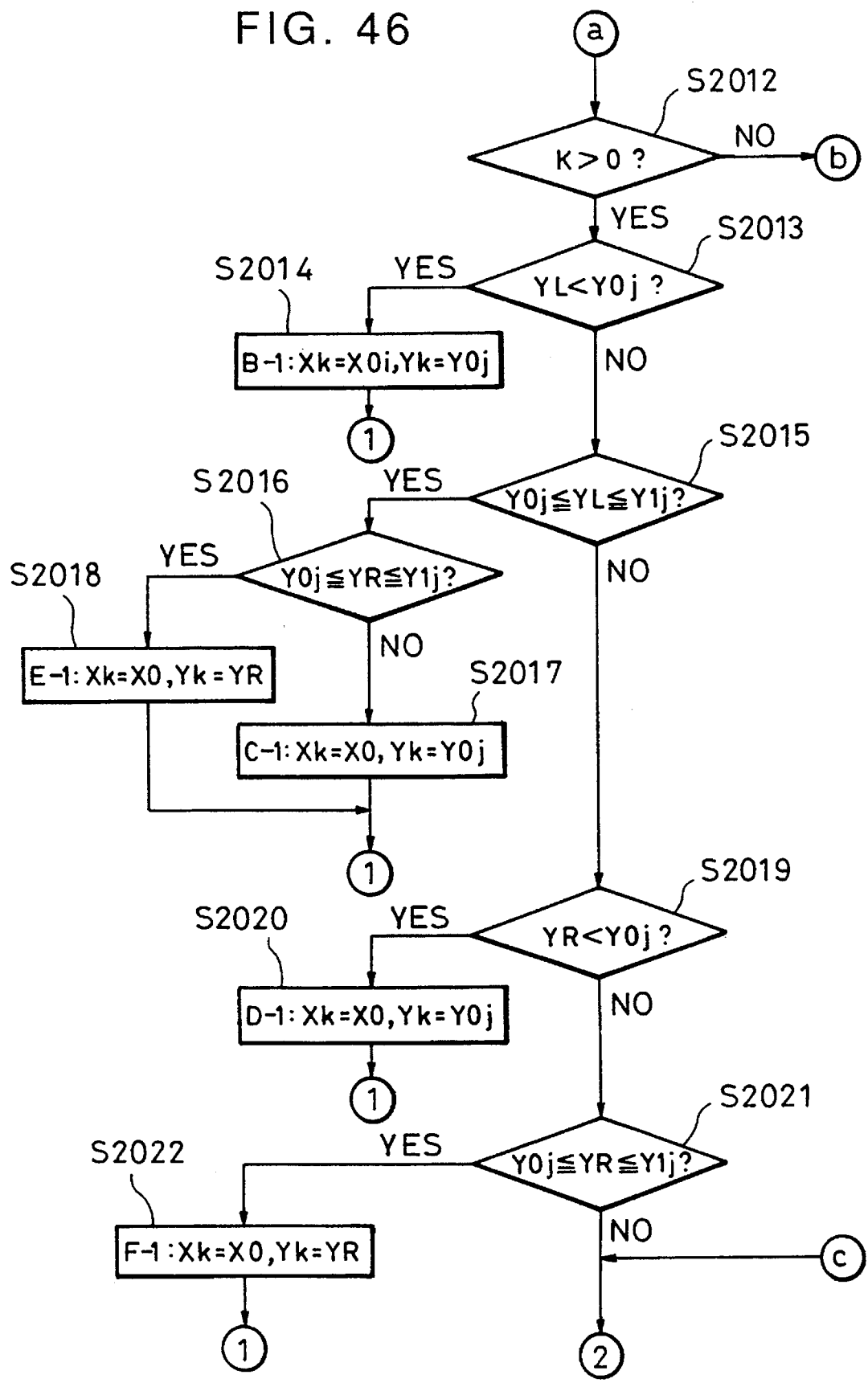
FIG. 46 is a flow chart which illustrates the diagonal process according to the sixth embodiment.
Figure 47:
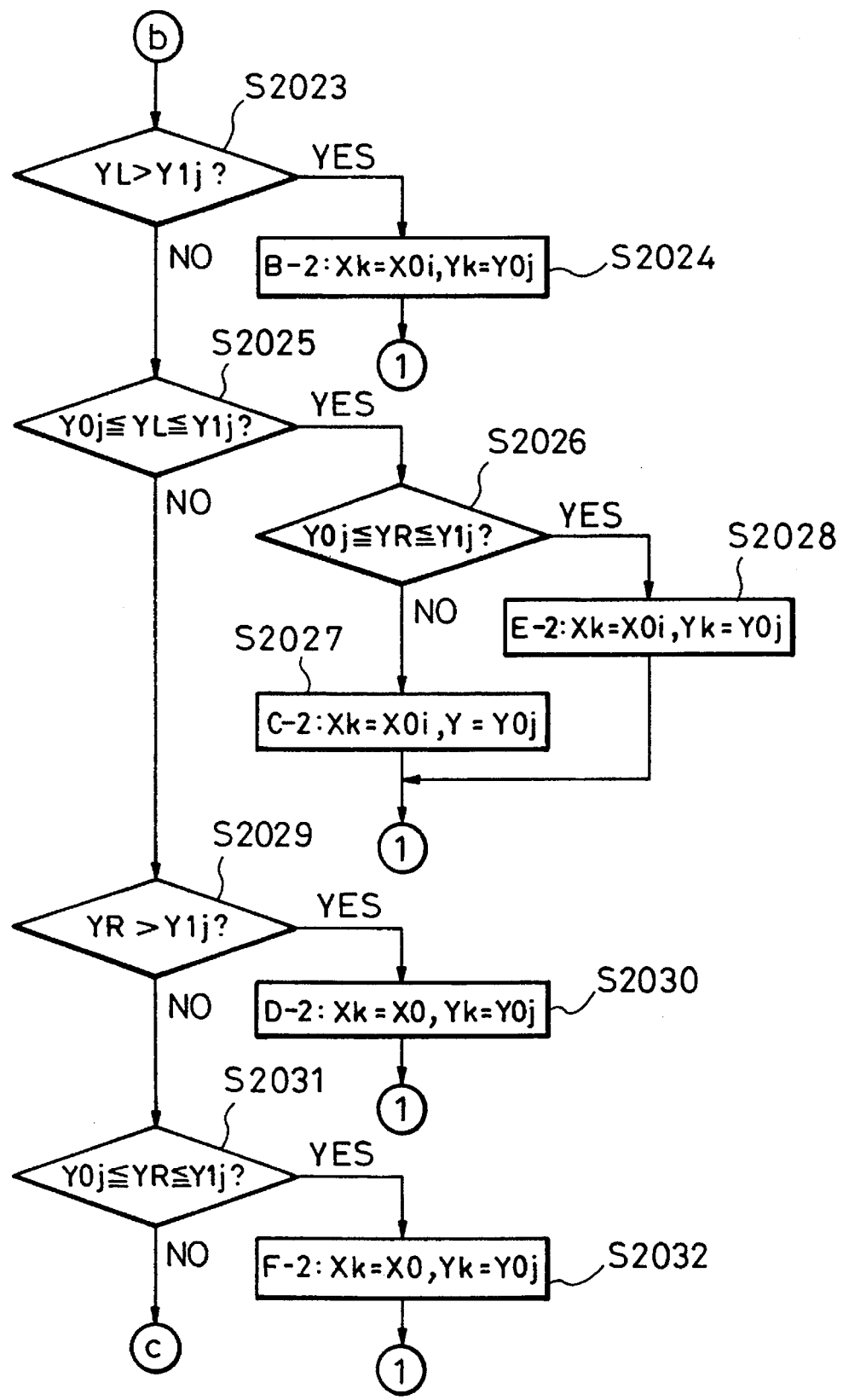
FIG. 47 is a flow chart which illustrates the diagonal process according to the sixth embodiment.
Figure 48:
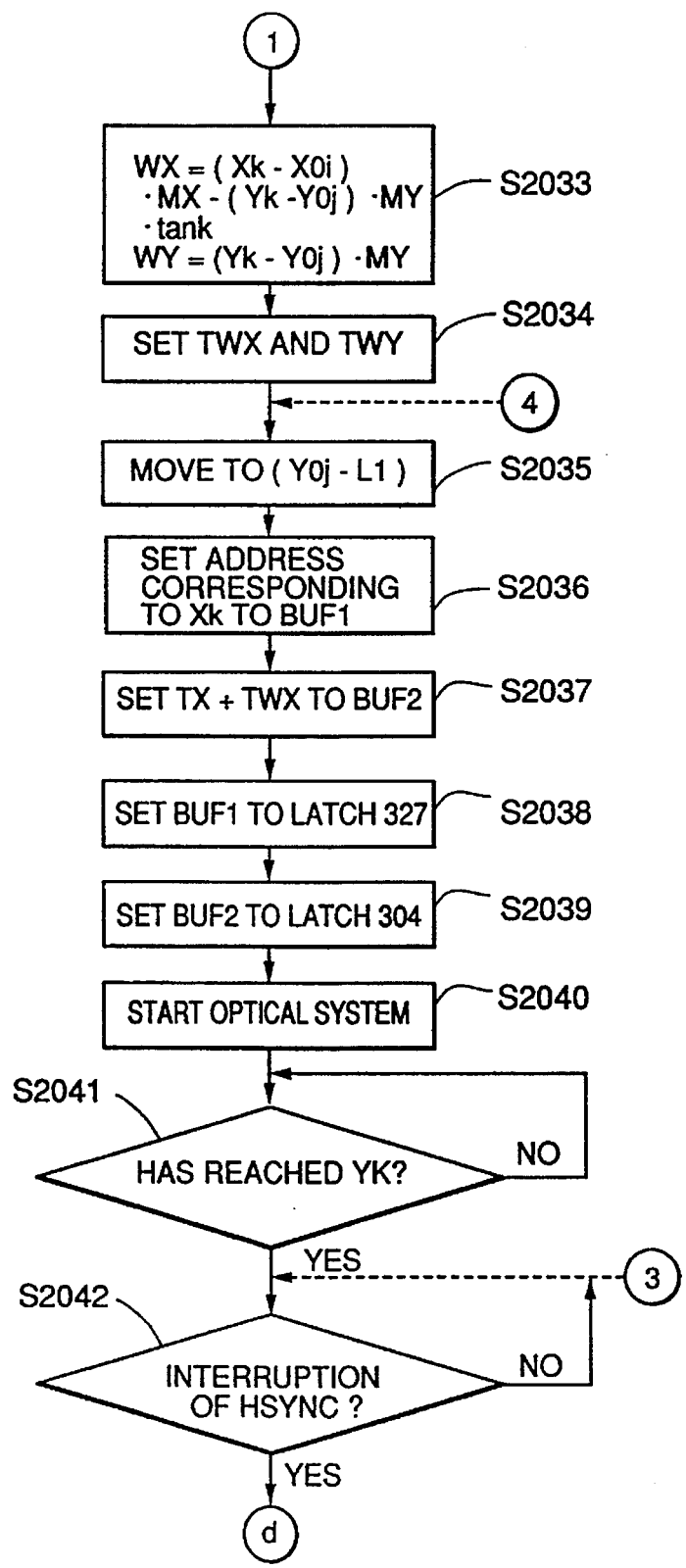
FIG. 48 is a flow chart which illustrates the diagonal process according to the sixth embodiment.
Figure 49:
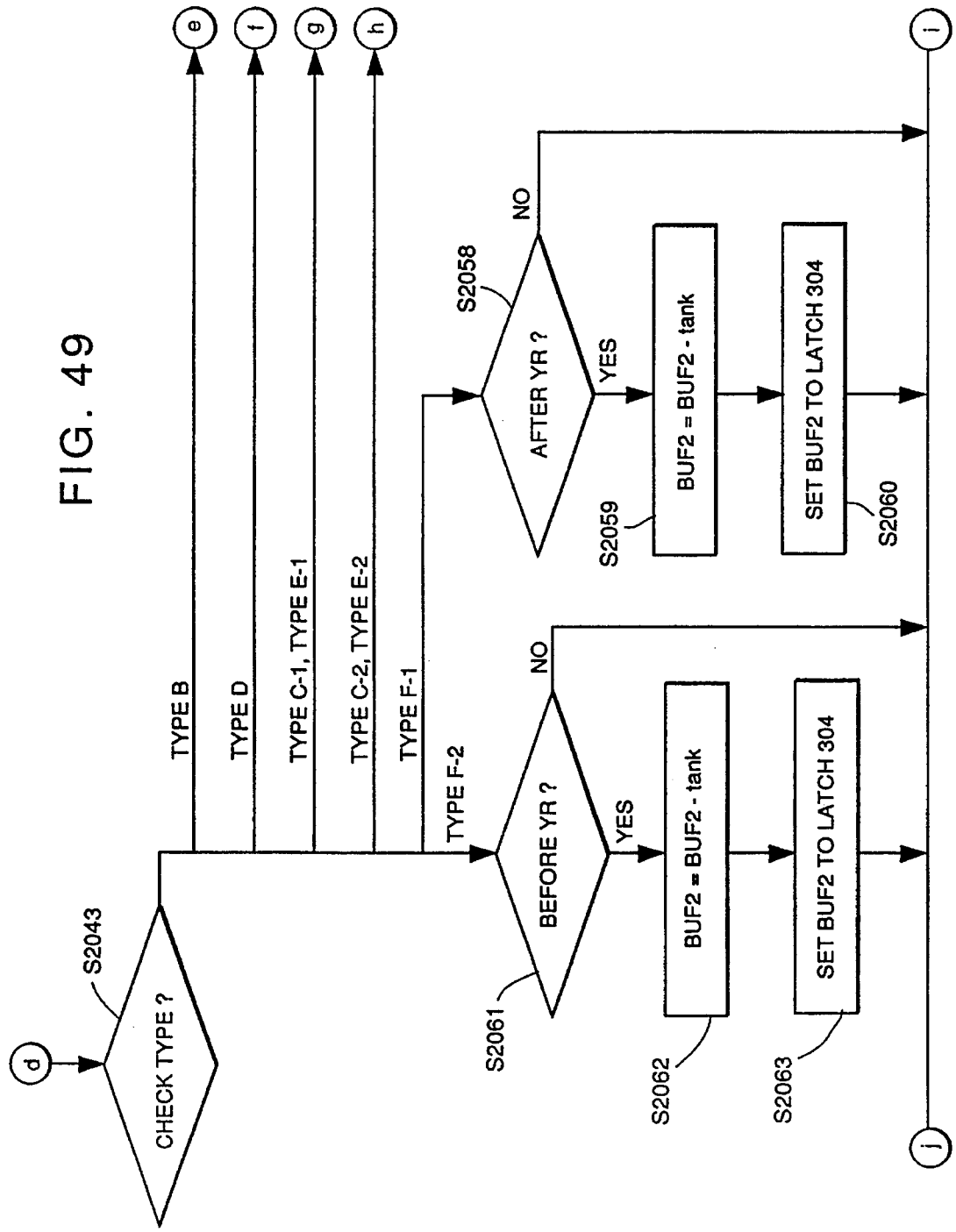
FIG. 49 is a flow chart which illustrates the diagonal process according to the sixth embodiment.
Figure 50:
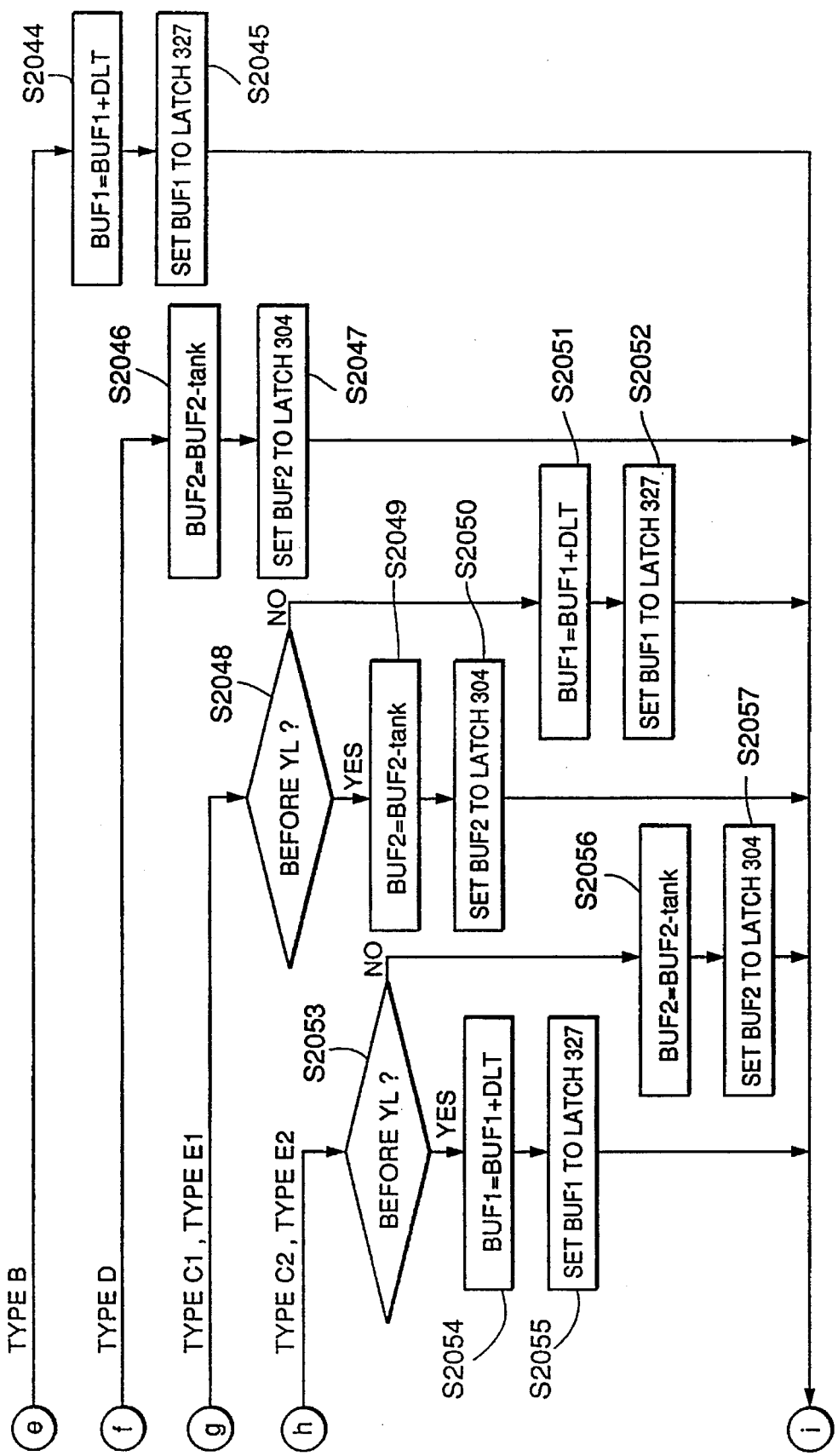
FIG. 50 is a flow chart which illustrates the diagonal process according to the sixth embodiment.
Figure 51:
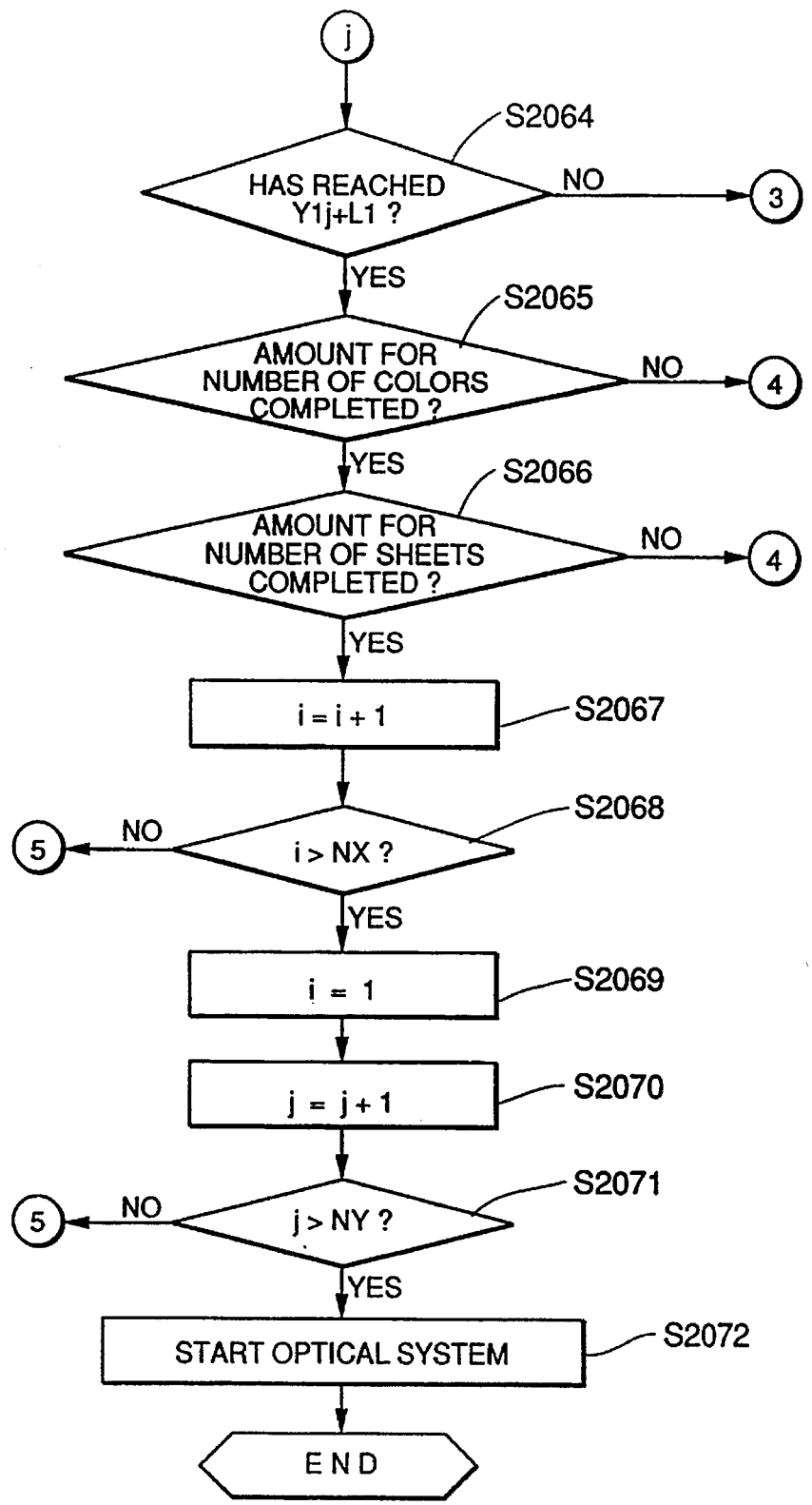
FIG. 51 is a flow chart which illustrates the diagonal process according to the sixth embodiment.
Figure 52A:
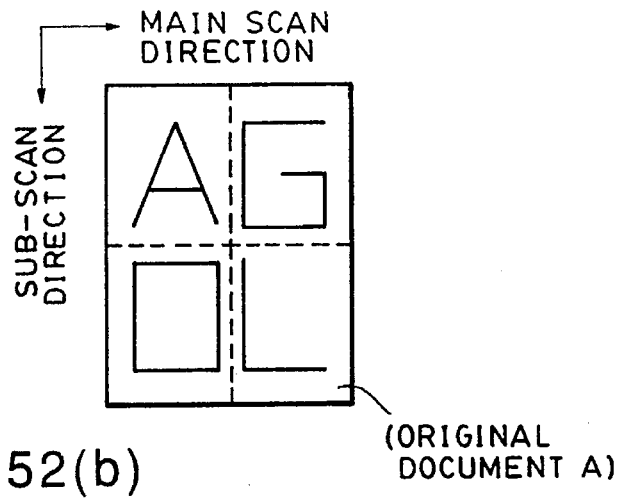
FIGS. 52(a), 52(b), 52(c), 52(d) and 52(e) illustrate the outline of a diagonal process according to a seventh embodiment.
Figure 52B:
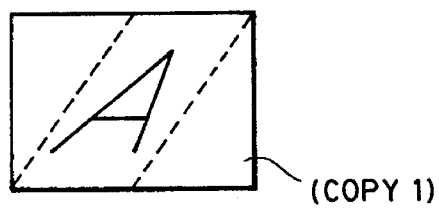
Figure 52C:
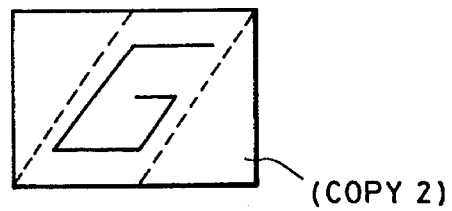
Figure 52D:
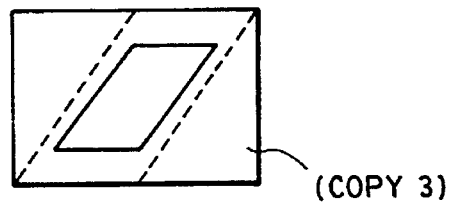
Figure 52E:
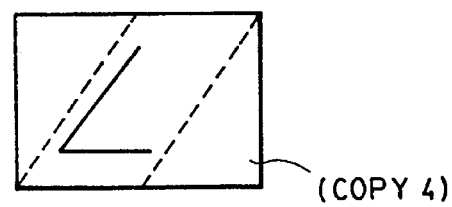

While paying attention to origin G1 and point W1 of the origin G0 and the point W0 (Xk, Yk) of the region projected to a parallelogram region, in which the magnification variation ratio MX and MY are considered, the relative coordinates of the point W1 with respect to the origin G1 is W1 (((Xk−X0i)·MX, (YK−Y0j)·MY) as shown in FIG. 44. Further paying attention to G2 and W2 resulted from projecting G1 and W1 on an effective printing region having the size QX×QY, the relative coordinates (WX, WY) of the point W2 with respect to the origin G2 is as follows:
WX=(Xk−X0i)·MX−(Yk−Y0j)·MY·tan (K),
WY=(Yk−Y0j)·MY Since the timing of the origin G2 is a known value, that is, it is clock TX from the horizontal synchronizing signal HSYNC and line TY from the vertical synchronizing signal ITOP, the FRM signal generation timing W2 corresponding to the read start address W0 is TX+TWX from the HSYNC at the time of TY+TWY from ITOP, where TWY is a value obtained by converting the distance WY in units of lines, TWX is a value obtained by converting the distance WX in units of pixels.

By determining the read start address on the original document image as described above, the corresponding FRM signal generation timing is determined.

Next, the diagonal process according to this embodiment will be described with reference to flow charts shown in FIGS. 5 to 51.

In step S2002, the effective printing regions sizes QX and QY on the paper sheets are determined, the sticking tabs SX and SY are determined in step S2003, and the number of the divisions are determined in step S2004. In step S2004, (1, 1) is set to the counter (i, j) on the RAM 213 showing the region number. The foregoing procedure is the same as that of the fifth embodiment. In step S2006, initial values are set to each of the latches 305 and 316.

In next step S2007, a discrimination is made whether or not the main scanning magnification MX is an enlargement magnification. If MX>1.0 (enlargement), the flow proceeds to step S2008 in which tan (K) is set to the area DLT of the RAM 213. If MX≦1.0 (equal magnification or contraction), the flow proceeds to step S2009 in which tan (K)/MX is, together with its sign, set to the DLT. In next step S2010, the coordinates for defining the (i, j)-th parallelogram region are calculated. In next step S2011, intersections YL and YR between the end X=X0 of the original document image and the two hypotenuses of the region are obtained.

In step S2012, the sign of the angle (K) of inclination is examined. If K>0, initial value XK and YK of the read start address are set on the basis of YL and YR in accordance with the positional relationship (that is, the type) of the left hypotenuses of the parallelogram region shown in (b1) of FIG. 42, (c1) of FIG. 42, (a1) of FIG. 43, (b1) of FIG. 43 and (c1) of FIG. 43 in steps S2013 to S2022.

If K≦0, initial value XK and YK of the read start address are set on the basis of YL and YR in accordance with the positional relationship (that is, the type) of the left hypotenuses of the parallelogram region shown in (b2) of FIG. 42, (c2) of FIG. 42, (a2) of FIG. 43, (b2) of FIG. 43 and (c2) of FIG. 43 in steps S2023 to S2032.

After the initial values XK and YK of the read start address have been determined, WX and WY described with reference to FIG. 19 are obtained in steps S2033 for the purpose of determining the corresponding FRM signal generation timing. In step S2034, WX and WY are respectively converted into line units and pixel units to obtain TWX and TWY. In net step S2035, the optical system is moved to position (Y0j−L1). In step S2036, the address value corresponding to the initial value XK of the read start address is set to the area BUF 1 of the RAM 213. In step S2037, the initial value TX+TWX of the FRAM is set to the area BUF 2 of the RAM 213. In steps S2038 and S2039, the set contents of the BUF1 and BUF2 are set to the corresponding latches 327 and 304.

In step S2040, the movement of the optical system is started, followed by a confirmation in step S2041 that the scanning position has reached YK. In the next step S2042, the interruption of the HSYNC signal is waited for. If the interruption of the HSYNC signal is made, the flow proceeds to step S2043 in which the type of the positional relationship of the left hypotenuse of the parallelogram region is discriminated. In accordance with the result of the discrimination, the read start address or the FRM is selectively changed.

(1) In the case of type B:

The flow proceeds to step S2044 in which DLT is added to BUF1, followed by adding the result to the BUF 1. In step S2045, the contents of the BUF 1 is set to the latch 327. Then, the flow proceeds to step S2064.

(2) In the case of type D:

The flow proceeds to step S2046 in which tan (K) is subtracted from BUF 2, followed by storing the result in the BUF 2. In step 2047, the contents of the BUF 2 are set to the latch 304. Then, the flow proceeds to step S2064.

(3) In the case of type C-1 or type E-1:

The flow proceeds to step S2048 in which the scanning position of the optical system is examined. In a period before the scanning position of the optical system reaches YL, the same processes (steps S2046 and S2047) to be performed in the case of the type D are performed in steps S2049 and S2050. After the scanning position has reached YL, the same processes (steps S2044 and S2045) to be performed in the case of the type B are performed in steps S2051 and S2052. Then, the flow proceeds to step S2064.

(4) In the case of type C-2 or type E-2:

The flow proceeds to step S2053 in which the scanning position of the optical system is examined. In a period before the scanning position of the optical system reaches YL, the same processes (steps S2044 and S2045) to be performed in the case of the type B are performed in steps S2054 and S2055. After the scanning position has reached YL, the same processes (steps S2046 and S2047) to be performed in the case of the type D are performed in steps S2056 and S2057. Then, the flow proceeds to step S2064.

(5) In the case of type F-1:

The flow proceeds to step S2058 in which the scanning position of the optical system is examined. In a period after the scanning position of the optical system has reached YR, the same processes (steps S2046 and S2047) to be performed in the case of the type D are performed in steps S2059 and S2060. Before the scanning position reaches YR, these processes are skipped. Then, the flow proceeds to step S2064.

(6) In the case of type F-2:

The flow proceeds to step S2061 in which the scanning position of the optical system is examined. In a period before the scanning position of the optical system reaches YR, the same processes (steps S2046 and S2047) are performed in steps S2062 and S2063. After the scanning position has reached YR, these processes are skipped. Then, the flow proceeds to step S2064.

In step S2064, whether or not the scanning position of the optical system has reached Y1$j$+L1 is examined. If it has not reached Y1$j$+L1, the flow returns to step S2042 to repeat the processes from step S2042 to S2064 are repeated until the scanning position of the optical system reaches Y1$j$+L1. In step S2065, whether or not the process for a required number of colors have been completed is examined. If the process continuation is required, the flow returns to step S2035 in which the processes for the required number of colors and sheets are repeated. If the required processes have been completed, a discrimination is made that the process for the region (i, j) has been completed, resulting in proceeding of the flow to step S2067.

In step S2067, the counter (i, j) is updated for processing the next region. In steps S2068 to S2071, if a discrimination is made that the next region must be processed, the flow returns to step S2010. If a discrimination has been made that the process for all of the regions has been completed, the optical system is returned to the home position and the process is completed in step S2072.

Therefore, according to this embodiment, the read start address and the FRM signal are selectively controlled so that a diagonal image which cannot be included within on paper sheet can be outputted in such a manner that it is divided into a plurality of paper sheets.

SEVENTH EMBODIMENT (FIGS. 52 TO 57)

In contrast with the fifth and the sixth embodiments that are suitable to obtain a desired image in a state where a plurality of divided outputs are pasted, this embodiment has an arrangement that the diagonal process is performed to enable each of a plurality of the divided outputs to be a desired image output.

FIG. 52 illustrates an example of a copy made by the diagonal process according to this embodiment. According to this embodiment, four image regions obtainable by dividing original document (A) shown in FIG. 52($a$) into two pieces in the main scanning direction and the sub-scanning direction are respectively subjected to the magnification variation and diagonal processes so that copy 1 to copy 4 shown in FIGS. 52($b$) to 52($e$) are obtained.

The foregoing process will now be described in detail with reference to FIGS. 53 and 54.

Figure 53:
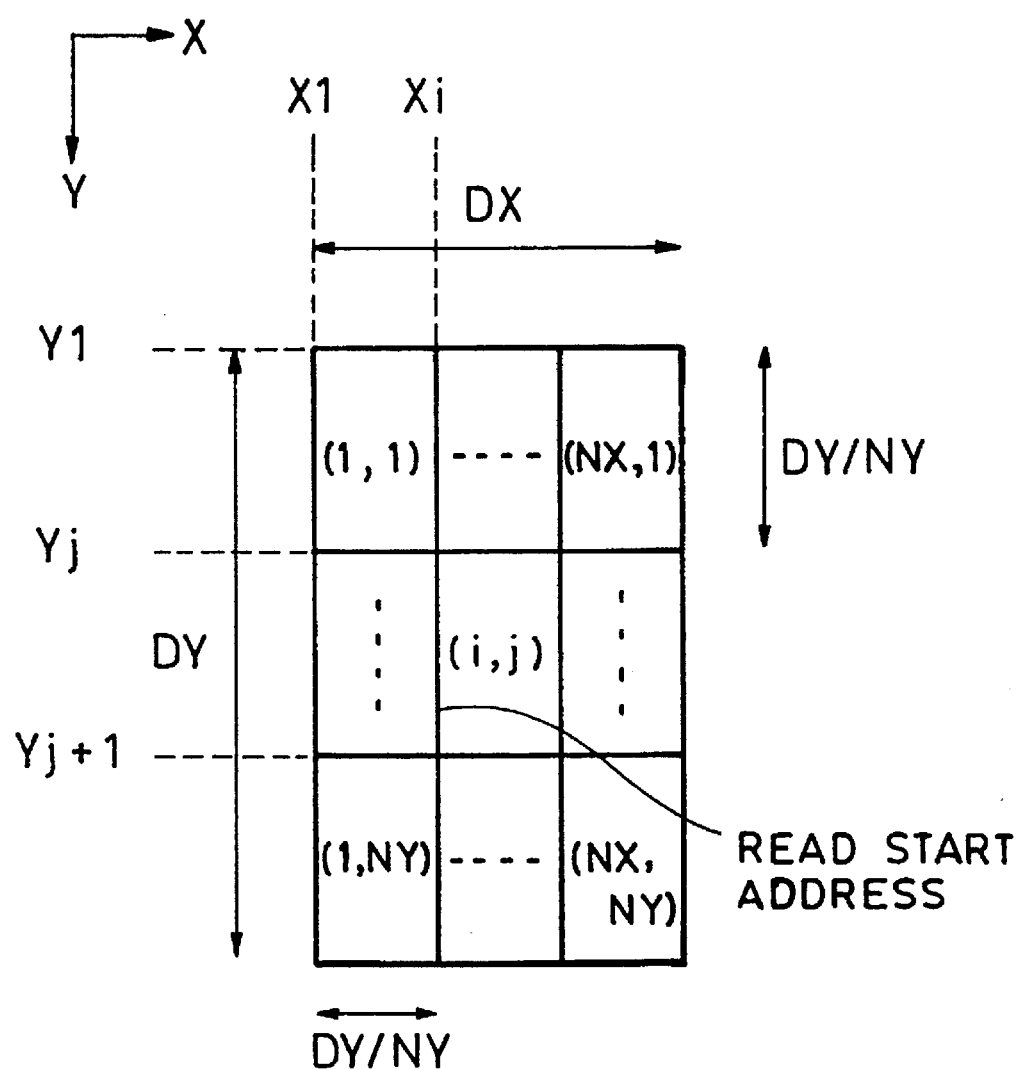
FIG. 53 illustrates the diagonal process according to the seventh embodiment in detail.

FIG. 53 illustrates a state of the original document image. As shown in FIG. 53, division of an original document having size of DX×Dy into NX sections in the main scanning direction and NY sections in the sub-scanning direction results the sizes of the divided regions DX/NX and DY/NY. FIG. 54($a$) illustrates an image formed by subjecting the divided region as shown in FIG. 53 to a magnification variation process and a diagonal process and a paper sheet for reproducing the image. As shown in FIG. 54($a$), the size of the diagonal image is as follows:

$LX$ (size in the main scanning direction)=$(DX/NX) \cdot MX + (DY/NY) \cdot MY \cdot \tan(K)$, $LY$ (size in the sub-scanning direction)=$(DY/NY) \cdot MY$ In order to make the diagonal image to be included in one paper sheet, the sizes of the effective printing region QX and QY must meet QX=LX+VL+VR, and QY=LY+VT+VB, where VL, VR, VT and VB≧0.

According to this embodiment, the method according to the sixth embodiment, that is, the read start address is fixed, and FRM signal is controlled to vary to realize the diagonal image. As for region (i, j) shown in FIG. 53 for example, making X=X$i$ to be the read start address in a sub-scanning region [Y$j$, Y$j$+1] will cause the corresponding FRM start timing to be as designated by a bold continuous line AB of FIG. 54($a$). A portion in the rear of the continuous line by (DX/MX)·MX in the main scanning direction is the FRM end timing. Assuming that the origin of the effective printing region of the paper sheet is G2, the relative coordinates of A and B with respect to G2 are:
A: (VL+LY·tan (K), VT); B: (VL, VT+LY).

Figure 54A:
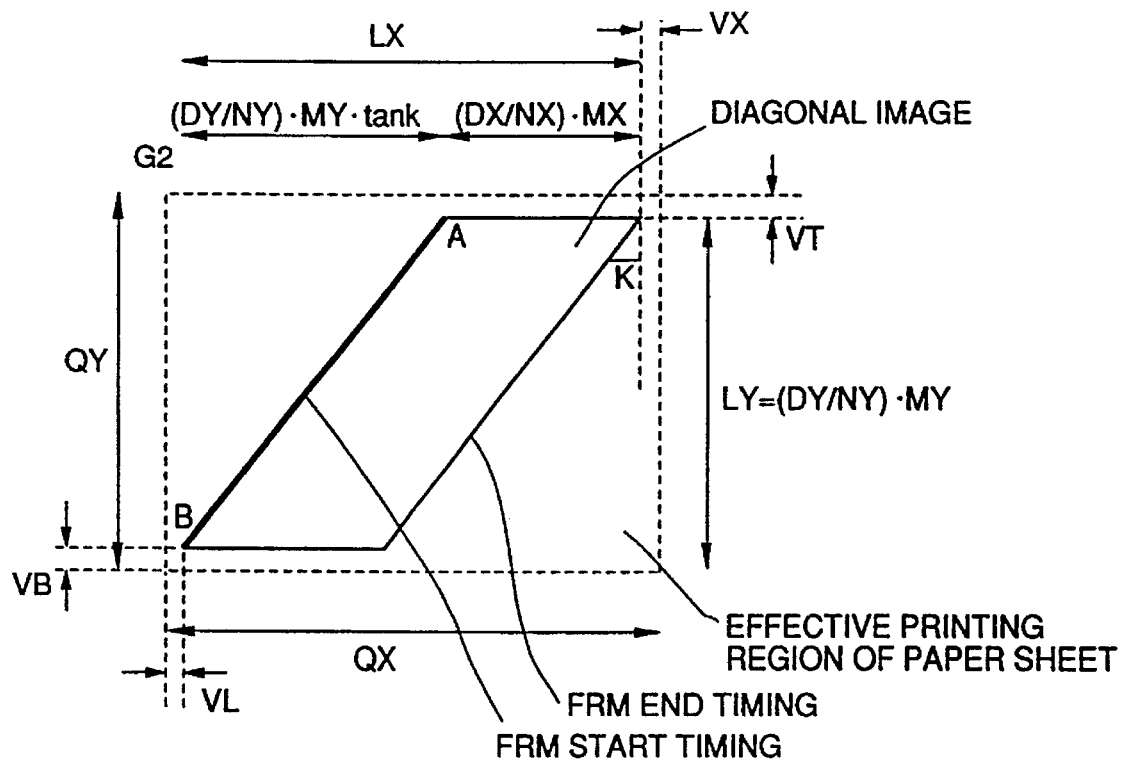
FIGS. 54(a) and 54(b) illustrate the diagonal process according to the seventh embodiment in detail.
Figure 54B:
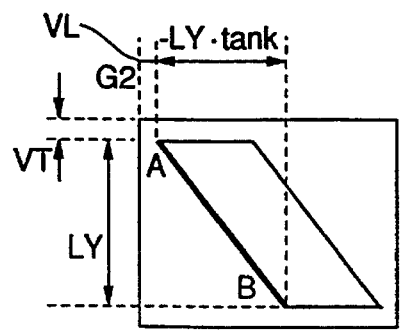

In the case shown in FIG. 54($a$), K>0, while K≦0 in the case shown in FIG. 54($b$). As shown in FIG. 54($b$), the relative coordinates of A and B are: A: (VL, VT); B: (VL−LY·tan (K), VT+LY). In either case, by determining the size of the original document image, the number of divisions, the magnification, the angle of inclination, and the size of the paper sheet, the read start address and the FRM generation timing are determined. Therefore, the diagonal output can be performed by employing the method according to the sixth embodiment as described in the sixth embodiment.

The apparatus according to this embodiment is provided with a mode for automatically determining any one of the three parameters: the size (QX, QY) of the paper sheet, the magnification (MX, MY) and the angle (K), and a mode for manually setting all of the foregoing parameters. If the image protrudes the paper sheet in the mode for manually setting all of the parameters or if no optimum parameter is present in the mode for automatically determining the parameters, an alarm can be issued to an operator.

Figure 55:
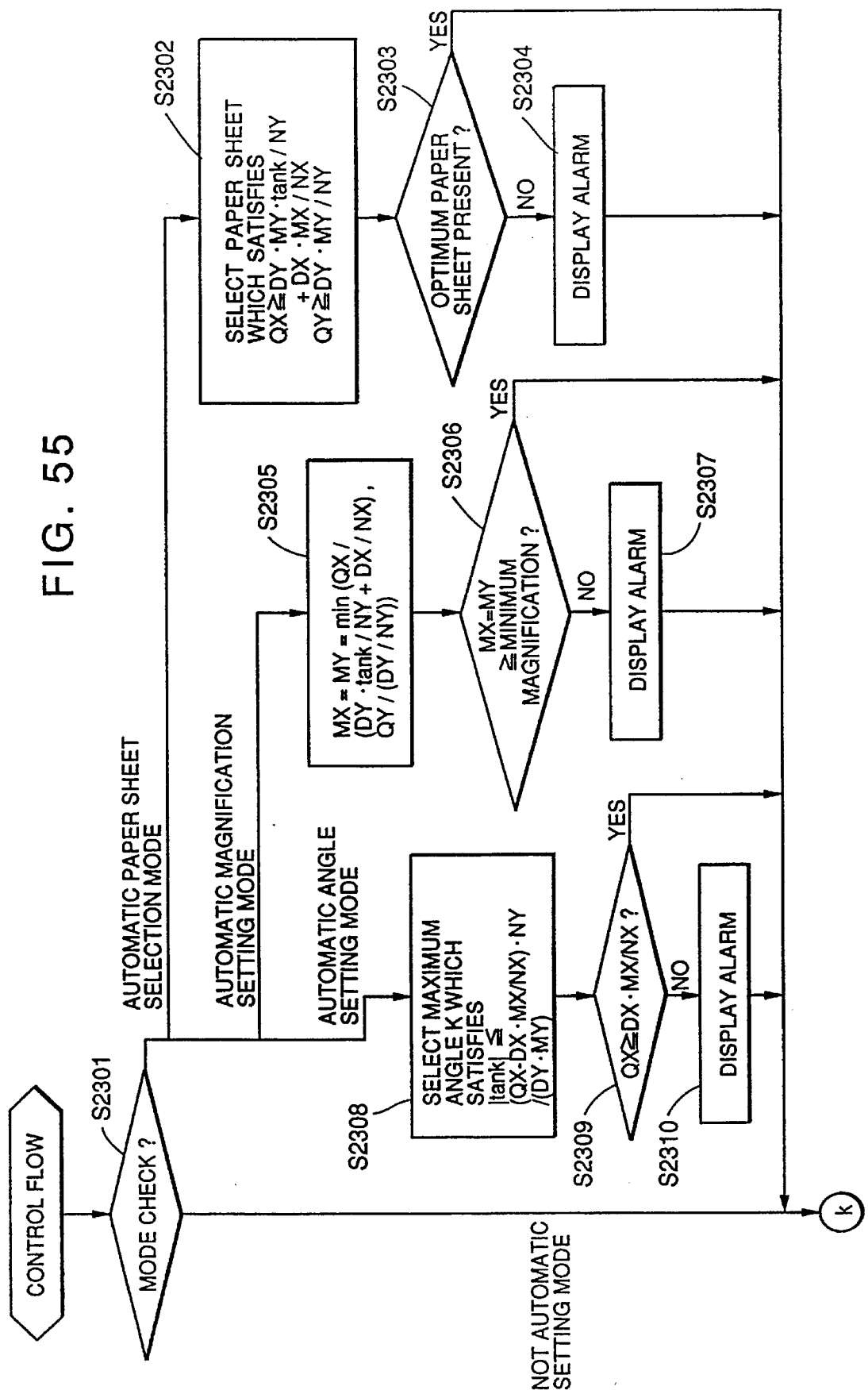
FIG. 55 is a flow chart which illustrates the diagonal process according to the seventh embodiment.
Figure 56:
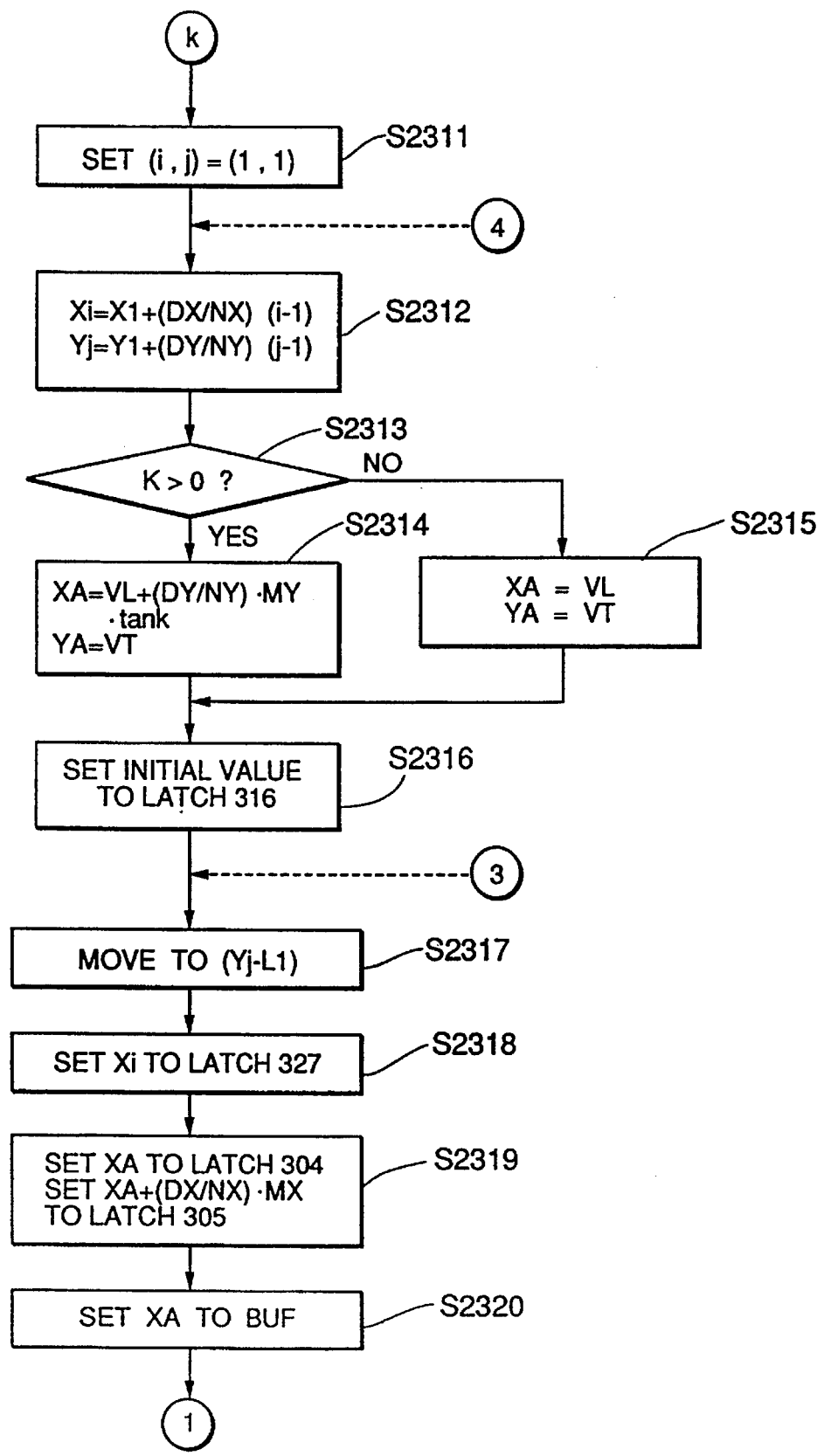
FIG. 56 is a flow chart which illustrates the diagonal process according to the seventh embodiment.
Figure 57:
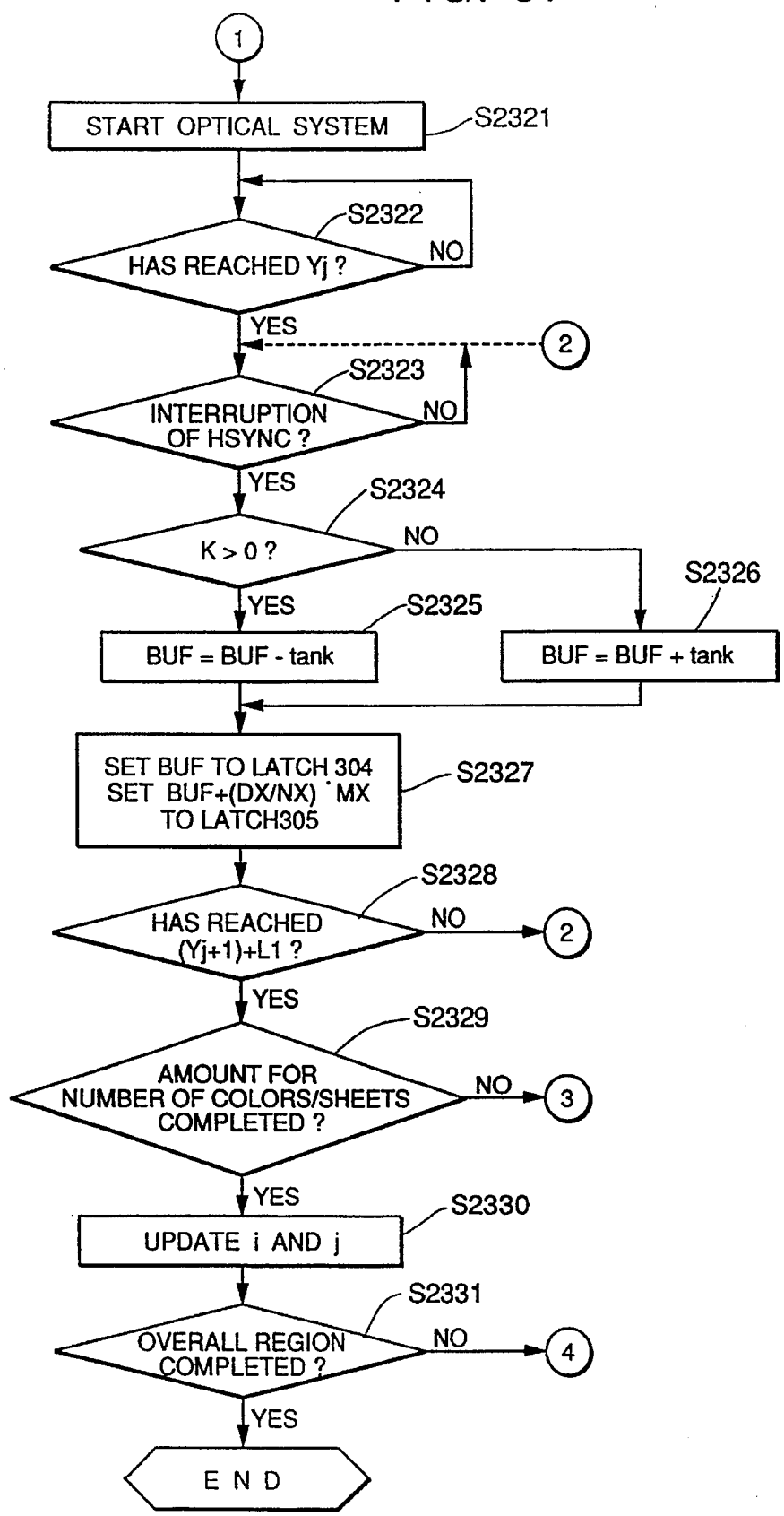
FIG. 57 is a flow chart which illustrates the diagonal process according to the seventh embodiment.

The diagonal process according to this embodiment will now be described with reference to flow charts shown in FIGS. 55 and 57.

In step S2301, a discrimination is made as to whether or not any of the foregoing parameters is set automatically. If the mode is the automatic paper sheet selection mode, the flow proceeds to step S2302 in which a paper sheet is selected that has an effective printing region size which meets QX≧DY·MY·tan (K)/NY+DX·MX/NX, QY≧DY·MY/NY. In next step S2303, whether or not the optimum paper sheet is present is examined. If the optimum paper sheet is not present, the flow proceeds to step S2304 in which an alarm is indicated. If there is the optimum paper sheet, the flow skips step S2304, followed by proceeding to step S2311.

If the mode is the automatic magnification setting mode, the flow proceeds to step S2305 in which smaller one of QX/(DY·tan (K)/NY+DX/NX) and QY/(DY/NY) is set as MX and MY. In step S2306, an examination is made as to whether or not MX (=MY) is larger than the least multiple. If the magnifications MX and MY are set manually, MX and MY may be different from each other. In the case of the automatic setting, a condition MX=MY must be kept and it is uniquely determined. If the set MX (=MY) is smaller than the least multiple (for example, 0.5 in the case of 50%), the flow proceeds to step S2307 in which an alarm is indicated. If MX (=MY) is larger than the least multiple, the flow skips step S2307, followed by proceeding to step S2311.

If the mode is the automatic angle setting mode, the flow proceeds to step S2308 in which the maximum angle K that meets |tan (K)|≦(QX−DX·MX/NX)·NY/(DY·MY) is set, where |tan (K)| means an absolute value. The reason why the maximum angle is set is that the diagonal image is reproduced on the entire area of the selected paper sheet. If a confirmation is made in step S2309 that QX<DX·MX/NX, the divided image cannot be included within the paper sheet. Therefore, the flow proceeds to step S2310 in which an alarm is indicated. If QX≧DX·MX/NX, the flow skips step S2310, followed by proceeding to step S2311.

If the mode is not the automatic setting mode, the flow proceeds to step S2311 as it is. If all of the parameters have been determined as described above, the counter (i, j) of the RAM 213 for indicating the division region number of the original document image is initialized to (1, 1) in step S2311. In step S2312, the origin (X1, Y1) of the original document image, the size (DX, DY) of the original document image, and the number (NX, NY) of the divisions are used to obtain the coordinates (Xi, Yj) of the origin of the (i, j)-th region. The read start address is fixed to the main scanning address Xi in the sub-scanning region [Yj, Yj+1]. Since the FRM generation timing is varied depending upon the direction of the inclination as described above, the sign of the angle (K) is discriminated in step S2313. If K>0, the initial value (XA, YA) of the FRM for the region (i, j) is set in step S2314. If K≦0, the same is set in step S2315.

In next step S2316, the write start address of the shift memory 323 is set to the latch 316. In step S2317, the scanning position of the optical system is moved to the sub-scanning position (Yj−L1), where L1 has the same value as that according to the sixth embodiment. In step S2318, data corresponding to Xi is set to the latch 327. In step S2319, data of the FRM generation timing is set to the latches 304 and 305. Data corresponding to XA is, as the initial value of the first transition timing of the FRM is set to the latch 304. On the other hand, data corresponding to the initial value of the last transition timing of the FRM obtained by adding the output image main scanning length (DX−NX)·MX to XA is set to the latch 305. In step S2320, the initial value set to the latch 304 is interpolated to the area BUF of the RAM 213.

In step S2321, the movement of the optical system is started. In step S2322, a confirmation is made that the scanning position has reached the leading end Yj of the region (i, j). In step S2323, the interruption of the HSYNC signal is waited for. If the interruption of the HSYNC signal has been generated, the flow proceeds to step S2324.

In step S2324, the sign of K is examined. If K>0, data in the BUF which stores the FRM timing is updated in step S2325. If K≦0, the same is updated in step S2326. In step S2327, the latches 304 and 305 are updated in accordance with the updated data. Specifically, tan (K) is decreased if K>0, while tan (K) is increased if K≦0.

In step S2328, an examination is made as to whether or not scanning of the region (i, j) performed by the optical system has been completed and it has reached position Yj+1+L1. If the scan has not reached the position Yj+1+L1, the flow returns to step S2323. If the scan has reached the position Yj+1+L1, the flow proceeds to step S2329. In step S2329, an examination is performed whether or not scanning for the required number of colors and required number of sheets has been completed. If it has not been completed, the flow returns to step S2317. If it has been completed, the flow proceeds to step S2330 in which the counter (i, j) is updated for scanning the next region. In step S2331, an examination is performed whether or not scanning of all of the regions has been completed. If it has not been completed, the flow returns to step S2312. If it has been completed, the process is completed here.

Therefore, according to this embodiment, the original document image is divided into an arbitrary number of regions, and the divided images are respectively subjected to the diagonal process and the magnification varying process so that they can be outputted to different paper sheets.

EIGHTH EMBODIMENT (FIGS. 58 TO 61)

This embodiment is a further generalization of the seventh embodiment.

Figure 58:
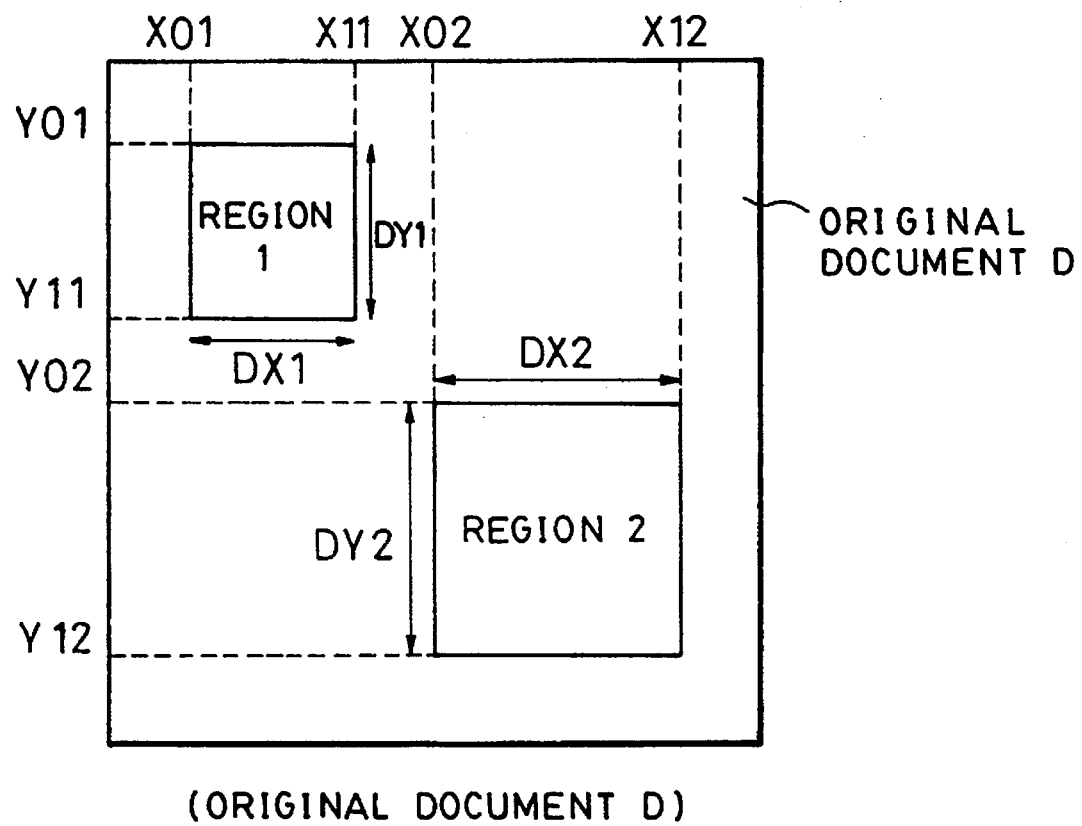
FIG. 58 illustrates the outline of a diagonal process according to an eighth embodiment.
Figure 59A:
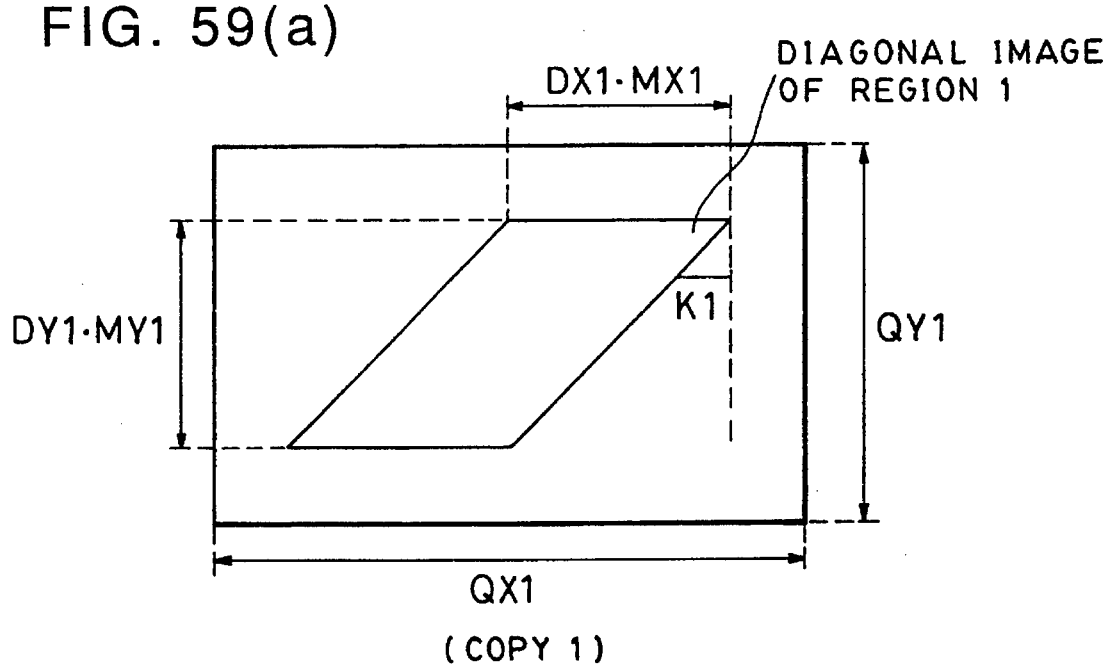
FIGS. 59(a) and 59(b) illustrate the outline of a diagonal process according to the eighth embodiment.
Figure 59B:
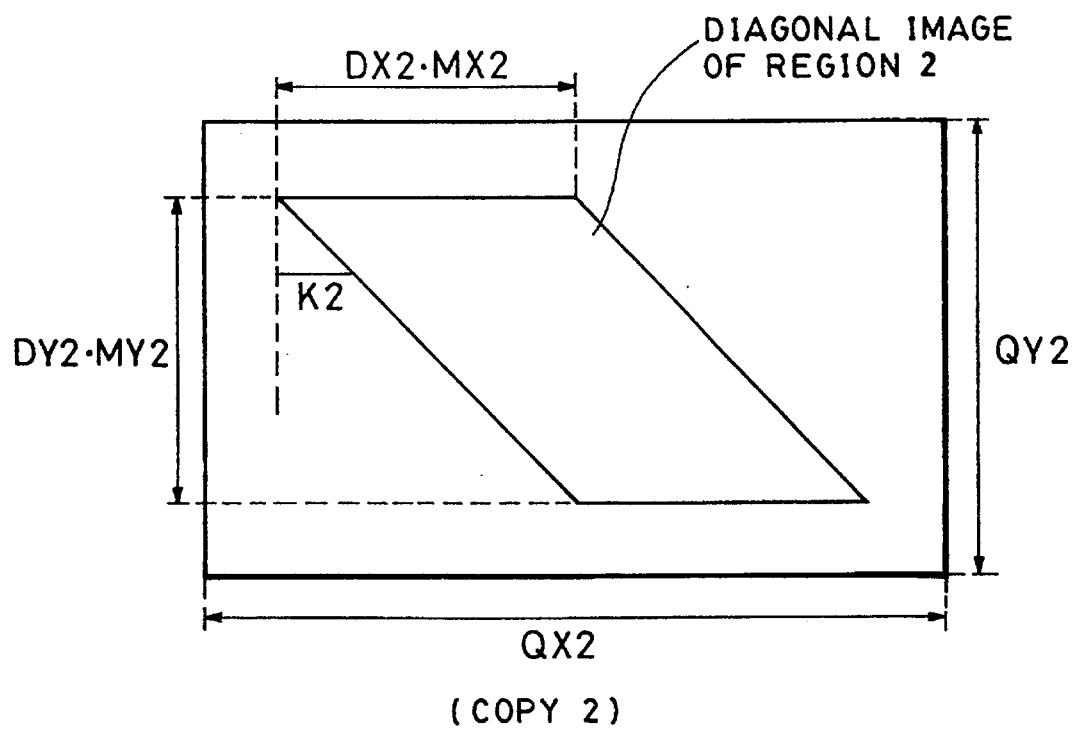

Even if a plurality of regions (regions 1 and 2 in this case) are present in original document D in a dispersed manner as shown in FIGS. 58 and 59, the regions 1 and 2 are extracted by generalizing the diagonal process. The regions 1 and 2 are then subjected to a diagonal process at different angles K1 and K2 and the magnification variation process at different magnifications (MX1, MY1) and (MX2, MY2). Therefore, copy 1 (see FIG. 59A) and copy 2 (see FIG. 59B) can be outputted onto paper sheets having different sizes (QX1, QY1) and (QX2, QY2). In this case, any one of the angle, the magnification and the paper sheet size may be the same between the copy 1 and the copy 2.

Figure 60:
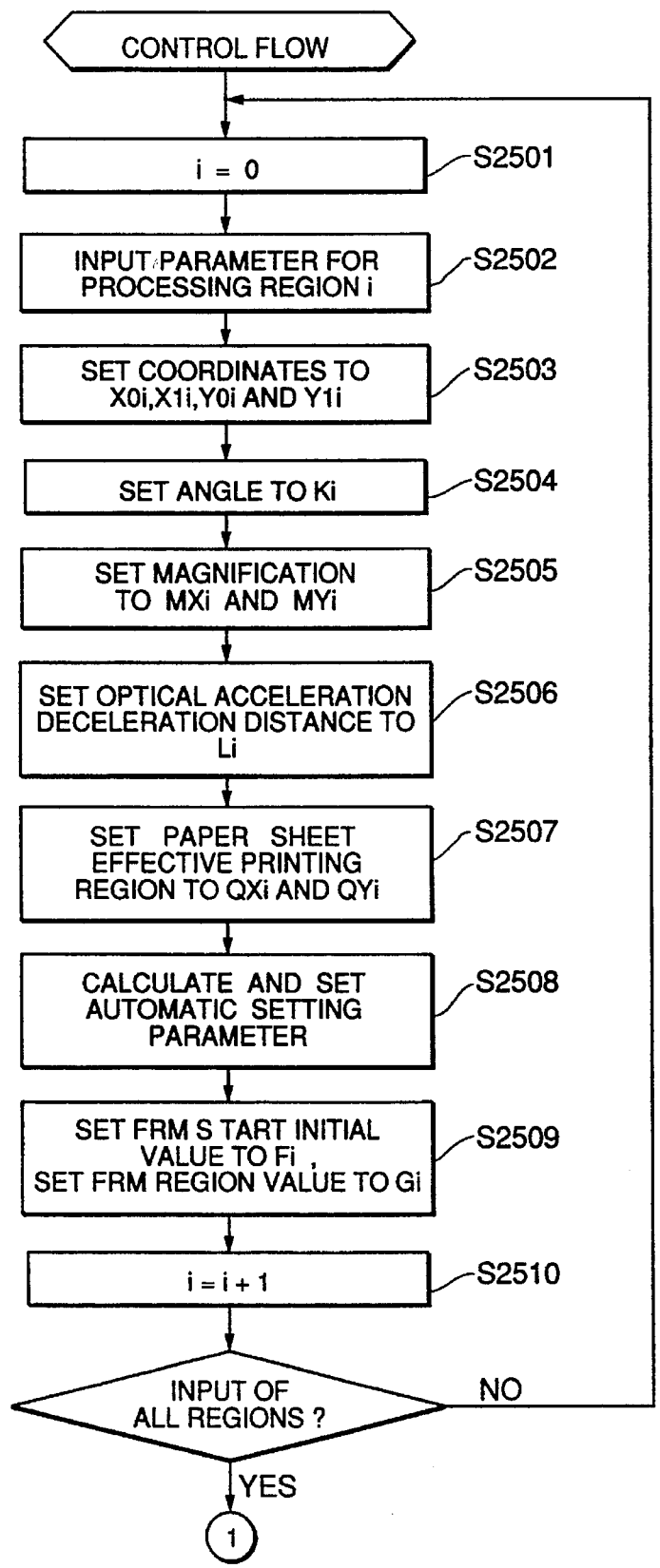
FIG. 60 is a flow chart which illustrates the diagonal process according to the eighth embodiment.
Figure 61:
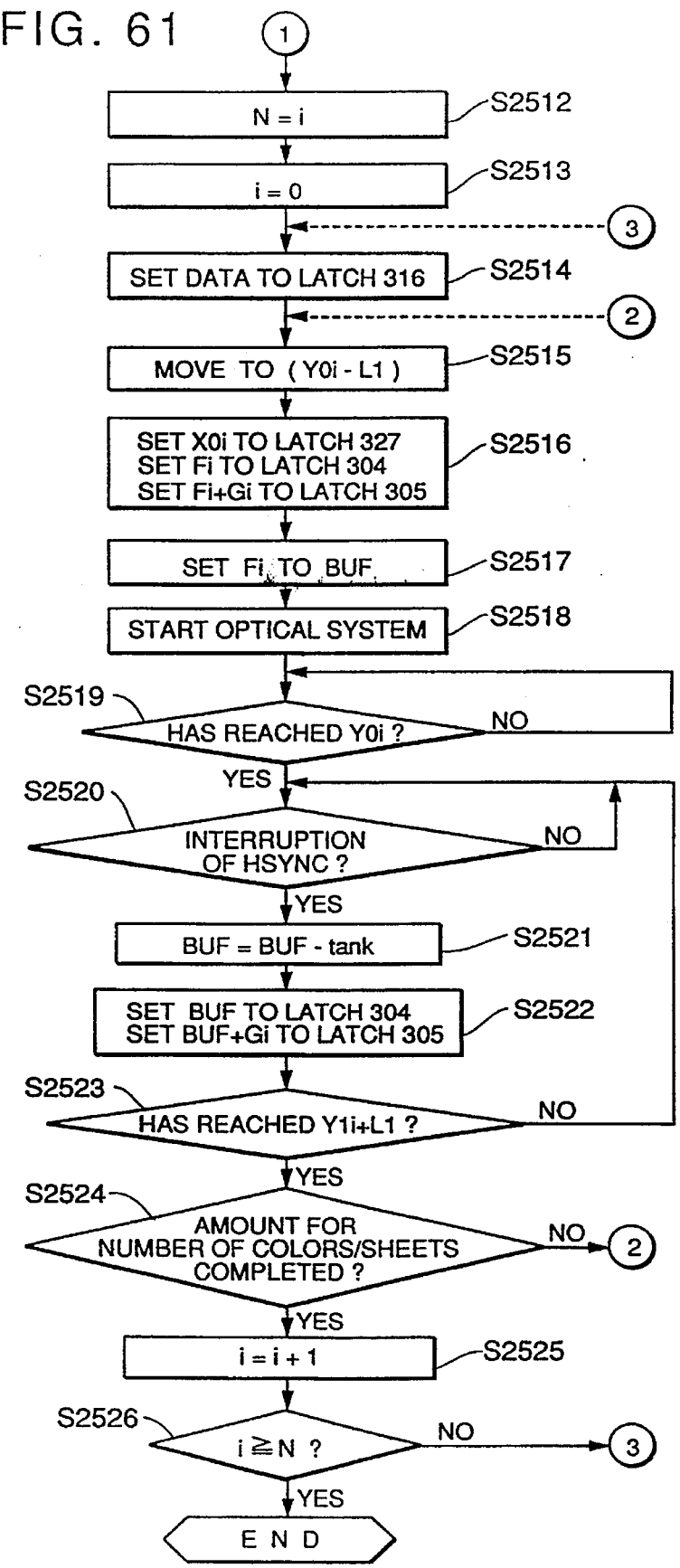
FIG. 61 is a flow chart which illustrates the diagonal process according to the eighth embodiment.
Figure 62A:
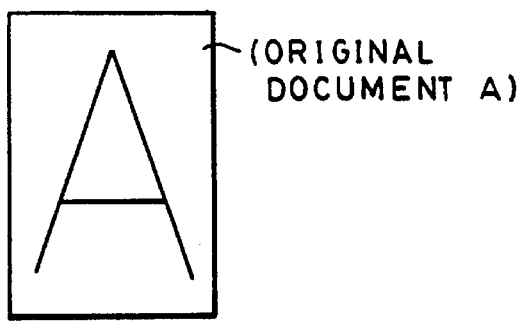
FIGS. 62(a), 62(b), 62(c) and 62(d) illustrate an example of a diagonal image according to a conventional technology.
Figure 62B:
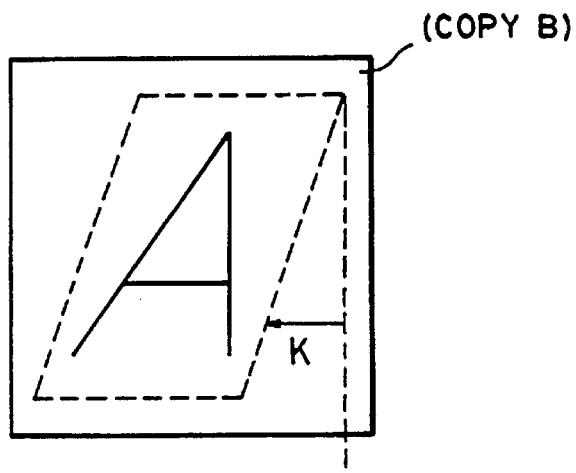
Figure 62C:
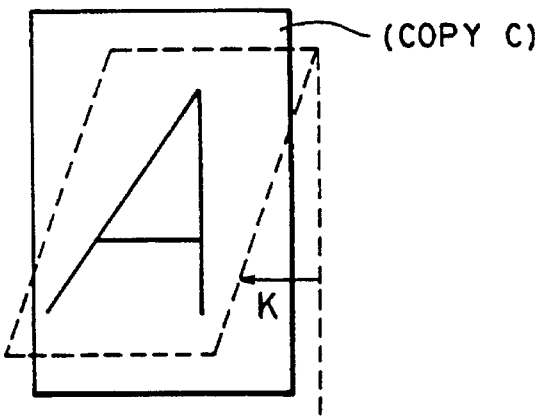
Figure 62D:
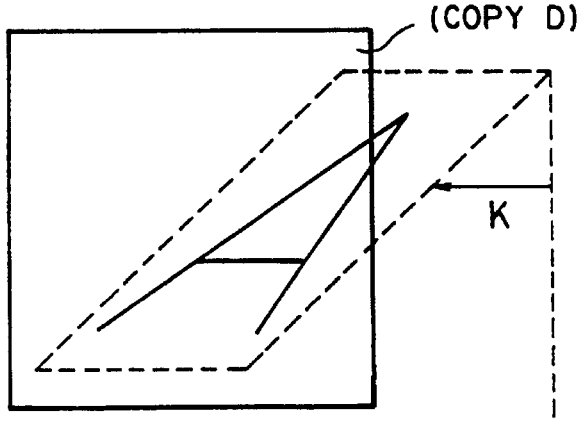

The diagonal process according to this embodiment will now be described with reference to flow charts shown in FIGS. 60 and 61. The apparatus according to this embodiment is also provided with the parameter automatic setting mode as the apparatus according to the seventh embodiment.

In step S2501, a counter (i) of the RAM 213 for indicating the region number is cleared to "0". In step S2502, the parameter for processing the i-th region is inputted by an operator. In accordance with this, the coordinate value of the region is, as the input parameter, set to predetermined areas X0$i$, X1$i$ and Y0$i$ of the RAM 213 in step S2503. In step S2504, the inclination angle (K) is set to area Ki of the RAM 213. In step S2505, the magnification is set to areas MXi and MYi of the RAM 213. In step S2506, the distance required to accelerate the speed of the optical system corresponding to the sub-scanning magnification MYi is set to area Li of the RAM 213. In step S2507, the size of the effective printing region of the selected paper sheet is set to areas QXi and QYi of the RAM 213.

Among the foregoing parameters, the parameters adapted to the automatic setting mode are, in step S2508, calculated and set in accordance with the procedures as described in the seventh embodiment. If the foregoing parameters are determined, the generation timing of the FRM is determined as described in the seventh embodiment. Therefore, the flow proceeds to step S2509 in which the initial value of the first transition timing of the FRM is set to area Fi of the RAM 213, and the width of region "TRUE" of the FRM is set to area Gi of the RAM 213. In step S2510, the counter (i) is increased by only one to receive parameter for processing the next region. In step S2511, an examination is performed whether or not the input of the parameters for all of the required regions has been completed. If the input of the parameters has not been completed, the flow returns to step S2501. If the input of the parameters has been completed, the flow proceeds to step S2512.

In step S2512, the number of the regions is set to area N of the RAM 213. In step S2513, the counter (i) is again cleared to "0". In next step S2514, the initial value is set to the latch 316. In step S2515, the scanning position of the optical system is moved to position (Yi–L1). In step S2516, read start address X0i of the region i is set to the latch 327, timing initial value F1 for starting the FRM is set to the latch 304, and timing initial value Fi+Gi for completing the FRM is set to the latch 305. In step S2517, data Fi is stored in the area BUF of the RAM 213 for updating the FRM timing.

In step S2518, the scanning operation by using the optical system is started. In step S2519, a confirmation is made that the scanning position has reached Y0i, and then the interruption of the HSYNC signal is waited for in step S2520. If the interruption of the HSYNC signal has been generated, the flow proceeds to step S2521 in which the stored BUF is updated by only tan (K). Specifically, if K is positive, it is decreased by only tan (K). If it is negative, it is increased by only tan (K). In step S2522, the latches 304 and 305 are set in accordance with the updated value of the BUF.

In step S2523, whether or not the scanning position has reached Y1i+L1 is examined. If it has not reached Y1i+L1, the flow returns to step S2520. If it has reached Y1i+L1, the flow proceeds to step S2524. In step S2524, whether or not the scan for the required number of colors and required number of sheets has been completed is examined. If a discrimination is made that the scan has not been completed, the flow returns to step S2515. If a discrimination is made that the scan has been completed, the flow proceeds to step S2525 in which the region number i is updated. In step S2526, an examination is performed whether or not all of the set regions have been processed. If they have not been processed, the flow returns to step S2514 in which the foregoing process is repeated. If they have been completed, the process is completed.

Therefore, according to this embodiment, even if a plurality of images are dispersedly present, each of a plurality of the image regions, the positions and the sizes of which are different, can be subjected to the diagonal process at different magnifications and angles to be outputted to a paper sheet. Therefore, a further improved apparatus that can be easily used can be provided.

The present invention may be applied to a system composed of a plurality of devices, or may be applied to a sole apparatus. Furthermore, the present invention may, of course, be applied to a system or an apparatus which is established by a supplied program.

As described above, according to the present invention, the method of outputting a diagonal image of the original document is varied or it is divided into a plurality of recording mediums at the time of the output so that an effect can be obtained in that missing of the diagonal image from the recording medium can be prevented. Therefore, waste in the recording medium and output time taken at the time of outputting a diagonal image can be reduced.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus comprising:

input means for inputting an original image;

setting means for setting a plurality of arbitrary image regions in the original image, the plurality of arbitrary image regions being spaced apart from each other in the original image;

conversion means for converting a plurality of images in the plurality of arbitrary image regions into a plurality of diagonal images, the conversion means converting an image into a diagonal image by progressively increasing a distance between the image and a predetermined axis so that a resulting diagonal image is inclined at an angle with respect to the predetermined axis; and output means for outputting the plurality of diagonal images on a single recording sheet while shifting at least one of the plurality of diagonal images so as to include all the plurality of diagonal images within the single recording sheet.

2. An image processing apparatus according to claim 1, wherein said output means determines the amount of shift for shifting at least one of the plurality of diagonal images.

3. An image processing apparatus according to claim 1, wherein said conversion means converts the plurality of images in accordance with an angle of inclination arbitrarily set.

4. An image processing apparatus according to claim 1, wherein said input means comprises reading means for reading the original image.

5. An image processing apparatus according to claim 1, wherein said output means comprises recording means for recording an image on the recording sheet.

6. An image processing apparatus comprising:

input means for inputting an original image;

determining means for determining an angle of inclination based on a size of the original image and a size of a recording sheet;

conversion means for converting the original image into a diagonal image by inclining the original image at the angle of inclination determined by said determining means; and output means for outputting the diagonal image on the recording sheet.

7. An image processing apparatus according to claim 6, further comprising division means for dividing the original image into a plurality of partial images.

8. An image processing apparatus according to claim 7, wherein said division means determines areas of the partial images.

9. An image processing apparatus according to claim 7, wherein said conversion means converts the plurality of partial images in accordance with the angle of inclination.

10. An image processing apparatus according to claim 6, wherein said input means comprises reading means for reading the original image.

11. An image processing apparatus according to claim 6, wherein said output means comprises recording means for recording an image on the recording sheet.

12. An image processing apparatus comprising:

input means for inputting an original image;

division means for dividing the original image into a plurality of partial images;

determining means for determining an angle of inclination based on a size of a partial image and a size of a recording sheet;

conversion means for converting the plurality of partial images into a plurality of diagonal images by inclining the plurality of partial images at the angle of inclination determined by said determining means; and output means for outputting the plurality of diagonal images on different recording sheets, respectively.

13. An image processing apparatus according to claim 12, wherein said division means determines the number of the partial images.

14. An image processing apparatus according to claim 12, wherein said division means determines areas of the partial images.

15. An image processing apparatus according to claim 12, wherein said input means comprises reading means for reading the original image.

16. An image processing apparatus according to claim 12, wherein said output means comprises recording means for recording an image on a recording sheet.

17. An image processing apparatus comprising:

input means for inputting an original image;

setting means for setting a plurality of arbitrary image regions in the original image;

conversion means for converting a plurality of images in the plurality of arbitrary image regions into a plurality of diagonal images with different inclination angles; and output means for outputting the plurality of diagonal images on different recording sheets, respectively.

18. An image processing apparatus according to claim 17, wherein said conversion means converts the plurality of images in accordance with angles of inclination arbitrarily set.

19. An image processing apparatus according to claim 17, wherein said input means comprises reading means for reading the original image.

20. An image processing apparatus according to claim 17, wherein said output means comprises recording means for recording an image on a recording sheet.

21. An image processing method comprising the steps of:

inputting an original image;

setting a plurality of arbitrary image regions in the original image, the plurality of arbitrary image regions being spaced apart from each other in the original image;

converting a plurality of images in the plurality of arbitrary image regions into a plurality of diagonal images, the converting step converting an image into a diagonal image by progressively increasing a distance between the image and a predetermined axis so that a resulting diagonal image is inclined at an angle with respect to the predetermined axis; and outputting the plurality of diagonal images on a single recording sheet while shifting at least one of the plurality of diagonal images so as to include all the plurality of diagonal images within the single recording sheet.

22. A method according to claim 21, wherein in said outputting step the amount of shift for shifting at least one of the plurality of diagonal images is determined.

23. A method according to claim 21, wherein in said converting step the plurality of images are converted in accordance with an angle of inclination arbitrarily set.

24. A method according to claim 21, wherein in said inputting step, the original image is read in by reading means.

25. A method according to claim 21, wherein in said outputting step an image is recorded on a recording sheet.

26. An image processing method comprising the steps of:

inputting an original image;

determining an angle of inclination based on a size of the original image and a size of a recording sheet;

converting the original image into a diagonal image by inclining the original image at the angle of inclination determined in said determining step; and outputting the diagonal image on the recording sheet.

27. A method according to claim 26, further comprising a step of dividing the original image into a plurality of partial images.

28. A method according to claim 27, wherein in said dividing step areas of the partial images are determined.

29. A method according to claim 27, wherein in said converting step the plurality of partial images are converted in accordance with the angle of inclination.

30. A method according to claim 26, wherein in said inputting step, the original image is read in by reading means.

31. A method according to claim 26, wherein in said outputting step an image is recorded on the recording sheet.

32. An image processing method comprising the steps of:

inputting an original image;

dividing the original image into a plurality of partial images;

determining an angle of inclination based on a size of a partial image and a size of a recording sheet;

converting the plurality of partial images into a plurality of diagonal images by inclining the plurality of partial images at the angle of inclination determined in said determining step; and outputting the plurality of diagonal images on different recording sheets, respectively.

33. A method according to claim 32, wherein in said dividing step the number of the partial images is determined.

34. A method according to claim 32, wherein in said dividing step areas of the partial images are determined.

35. A method according to claim 32, wherein in said inputting step, the original image is read in by reading means.

36. A method according to claim 32, wherein in said outputting step an image is recorded on a recording sheet.

37. An image processing method comprising the steps of:
   inputting an original image;
   setting a plurality of arbitrary image regions in the original image;
   converting a plurality of images in the plurality of arbitrary image regions into a plurality of diagonal images with different inclination angles; and
   outputting the plurality of diagonal images on different recording sheets, respectively.

38. A method according to claim 37, wherein in said converting step the plurality of images is converted in accordance with angles of inclination arbitrarily set.

39. A method according to claim 37, wherein in said inputting step, the original image is read in by reading means.

40. A method according to claim 37, wherein in said outputting step an image is recorded on a recording sheet.

* * * * *

UNITED STATES PATENT AND TRADEMARK OFFICE
CERTIFICATE OF CORRECTION

PATENT NO. : 5,608,541

DATED : March 4, 1997

INVENTOR : Masanori Yamada

It is certified that error appears in the above-identified patent and that said Letters Patent is hereby corrected as shown below:

COLUMN 13:

Line 47, "tank" should read --tan--; and
Line 51, "PX/tank" should read --PX/tan--.

COLUMN 20:

Line 8, "SY and SY" should read --SX and SY--.

COLUMN 25:

Line 40, "GO" should read --G0--; and
Line 44, "(((Xk-X0i)" should read --((Xk-X0i)--.

COLUMN 27:

Line 57, "on" should read --one--.

Signed and Sealed this

Ninth Day of September, 1997

Attest:

BRUCE LEHMAN

Attesting Officer

Commissioner of Patents and Trademarks